US012788180B2

(12) United States Patent
Rudy et al.

(10) Patent No.: US 12,788,180 B2
(45) Date of Patent: Nov. 10, 2026

(54) MODULAR GRIDDLE WITH SEARING DEVICE

(71) Applicant: AccuTemp Products, Inc., Fort Wayne, IN (US)

(72) Inventors: Raymond R. Rudy, Huntington, IN (US); Gary L. Seitz, Decatur, IN (US)

(73) Assignee: AccuTemp Products, Inc., Fort Wayne, IN (US)

(*) Notice: Subject to any disclaimer, the term of this patent is extended or adjusted under 35 U.S.C. 154(b) by 1295 days.

(21) Appl. No.: 17/534,807

(22) Filed: Nov. 24, 2021

(65) Prior Publication Data

US 2022/0079381 A1 Mar. 17, 2022

Related U.S. Application Data

(63) Continuation-in-part of application No. 16/410,677, filed on May 13, 2019, now Pat. No. 11,819,160, which is a continuation-in-part of application No. 16/047,918, filed on Jul. 27, 2018, now abandoned, which is a continuation-in-part of application No. 15/981,360, filed on May 16, 2018, now Pat. No. 10,881,245.

(60) Provisional application No. 63/118,469, filed on Nov. 25, 2020, provisional application No. 62/801,002, filed on Feb. 4, 2019, provisional application No. 62/647,958, filed on Mar. 26, 2018, provisional application No. 62/508,345, filed on May 18, 2017.

(51) Int. Cl.
*A47J 37/06* (2006.01)

(52) U.S. Cl.
CPC ....... *A47J 37/0676* (2013.01); *A47J 37/0611* (2013.01)

(58) Field of Classification Search
None
See application file for complete search history.

(56) References Cited

U.S. PATENT DOCUMENTS

| | | | |
|---|---|---|---|
| 2,039,218 | A | 4/1936 | Govoroff |
| 3,312,161 | A | 4/1967 | Nanna |
| 3,377,942 | A | 4/1968 | Carbon |
| 3,593,648 | A | 7/1971 | Walters |

(Continued)

FOREIGN PATENT DOCUMENTS

| | | | | | |
|---|---|---|---|---|---|
| CN | 104886196 | A | * | 9/2015 | .............. A47J 43/04 |
| EP | 1913853 | A2 | | 4/2008 | |

(Continued)

OTHER PUBLICATIONS

Translation of CN-104886196-A (Year: 2015).*

(Continued)

*Primary Examiner* — Elizabeth M Kerr
(74) *Attorney, Agent, or Firm* — Faegre Drinker Biddle & Reath LLP

(57) ABSTRACT

A griddle system includes one or more of a variety of performance-enhancing structures and functions. For example, an adjustable latching mechanism may provide for mechanical advantage when closing the griddle, particularly when the griddle is used to compress food items. An adjustable electromagnet and adjustable ferrous plate may cooperate to help hold the griddle in the closed position. The griddle may also feature a heated upper platen with efficient and robust cable routing features.

17 Claims, 79 Drawing Sheets

(56) References Cited

U.S. PATENT DOCUMENTS

| | | | | |
|---|---|---|---|---|
| 3,746,837 | A * | 7/1973 | Frey | A47J 47/14 219/453.11 |
| 4,498,695 | A | 2/1985 | Pardo | |
| 4,697,504 | A | 10/1987 | Keating | |
| 4,763,571 | A | 8/1988 | Bergling et al. | |
| 4,913,040 | A | 4/1990 | Sherman et al. | |
| 4,972,766 | A | 11/1990 | Anetsberger | |
| 4,987,827 | A | 1/1991 | Marquez | |
| 5,167,750 | A | 12/1992 | Myers | |
| 5,423,253 | A | 6/1995 | Olson et al. | |
| 5,619,907 | A | 4/1997 | Orgelmacher | |
| 5,642,658 | A | 7/1997 | Liebermann | |
| 5,758,568 | A | 6/1998 | Moravec | |
| 5,839,359 | A | 11/1998 | Gardner | |
| 5,890,419 | A | 4/1999 | Moravec | |
| 5,918,588 | A | 7/1999 | Gil Garcia | |
| 5,934,182 | A | 8/1999 | Harter et al. | |
| 6,012,380 | A | 1/2000 | Hermansson | |
| 6,079,321 | A | 6/2000 | Harter et al. | |
| 6,263,786 | B1 | 7/2001 | Raio et al. | |
| 6,327,968 | B1 | 12/2001 | Scannell | |
| 6,467,400 | B2 | 10/2002 | Raio et al. | |
| 6,772,681 | B1 | 8/2004 | Raio et al. | |
| 7,449,665 | B2 | 11/2008 | Fadelli et al. | |
| 7,472,645 | B2 | 1/2009 | Hill et al. | |
| 7,507,939 | B2 | 3/2009 | Baumann | |
| D605,467 | S | 12/2009 | Scholz et al. | |
| 7,878,109 | B2 | 2/2011 | Calzada et al. | |
| 8,100,051 | B2 | 1/2012 | Scholz et al. | |
| 8,359,970 | B2 | 1/2013 | Calzada et al. | |
| 8,516,950 | B2 | 8/2013 | Scholz et al. | |
| 8,530,797 | B2 | 9/2013 | Tassan-Mangina et al. | |
| 8,759,728 | B2 | 6/2014 | Tassan-Mang-Ina et al. | |
| 8,763,519 | B2 | 7/2014 | Ricchio et al. | |
| 8,807,020 | B2 | 8/2014 | Tahincioglu | |
| 8,863,652 | B2 | 10/2014 | Nevarez et al. | |
| 8,893,611 | B2 * | 11/2014 | Scholz | A47J 37/0611 99/425 |
| 8,915,178 | B2 | 12/2014 | Chen et al. | |
| 9,642,492 | B2 | 5/2017 | Wang et al. | |
| 9,782,038 | B2 | 10/2017 | Ogawa et al. | |
| 9,861,230 | B2 | 1/2018 | Freymiller et al. | |
| 9,930,990 | B1 * | 4/2018 | Gupta | A47J 36/02 |
| 10,143,335 | B2 | 12/2018 | Volatier et al. | |
| 10,154,761 | B2 | 12/2018 | Seitz | |
| 10,271,685 | B2 | 4/2019 | Gulkanat et al. | |
| 10,376,097 | B1 | 8/2019 | Seitz | |
| 10,390,655 | B2 | 8/2019 | Nelson | |
| 10,412,793 | B2 | 9/2019 | D'Andrea et al. | |
| 10,478,004 | B2 | 11/2019 | Tresser et al. | |
| 10,518,574 | B2 | 12/2019 | Robinson et al. | |
| 2001/0042448 | A1 | 11/2001 | Menektchiev et al. | |
| 2006/0213373 | A1 * | 9/2006 | Fernandez | A47J 37/0611 99/349 |
| 2007/0077338 | A1 | 4/2007 | Calzada et al. | |
| 2007/0102418 | A1 * | 5/2007 | Swank | A21B 3/02 219/400 |
| 2008/0142503 | A1 * | 6/2008 | Li | A47J 36/38 99/450 |
| 2009/0308260 | A1 | 12/2009 | Trost | |
| 2010/0107896 | A1 | 5/2010 | Scholz et al. | |
| 2010/0186601 | A1 | 7/2010 | Gulkanat | |
| 2011/0011277 | A1 | 1/2011 | Bond | |
| 2012/0244250 | A1 | 9/2012 | Bartolucci et al. | |
| 2013/0280397 | A1 | 10/2013 | Ryan et al. | |
| 2013/0319254 | A1 * | 12/2013 | Yu | A21B 7/005 99/348 |
| 2014/0026764 | A1 | 1/2014 | Sykes et al. | |
| 2014/0033931 | A1 | 2/2014 | Hui | |
| 2014/0123861 | A1 | 5/2014 | Cooper et al. | |
| 2014/0161953 | A1 | 6/2014 | Jones et al. | |
| 2015/0305554 | A1 | 10/2015 | Dorsten et al. | |
| 2016/0029838 | A1 | 2/2016 | Freymiller et al. | |
| 2016/0029845 | A1 | 2/2016 | Seitz | |
| 2016/0227963 | A1 | 8/2016 | Gulkanat et al. | |
| 2016/0250816 | A1 * | 9/2016 | Robinson | B30B 1/04 100/35 |
| 2016/0309941 | A1 | 10/2016 | Minard | |
| 2016/0381740 | A1 | 12/2016 | D'Andrea et al. | |
| 2017/0265672 | A1 | 9/2017 | Tresser et al. | |
| 2017/0325632 | A1 | 11/2017 | Volatier et al. | |
| 2018/0125297 | A1 | 5/2018 | Walker et al. | |
| 2018/0255970 | A1 | 9/2018 | Rudy et al. | |
| 2018/0368614 | A1 | 12/2018 | Rudy et al. | |
| 2019/0000266 | A1 | 1/2019 | Robles et al. | |
| 2019/0053662 | A1 | 2/2019 | Ko et al. | |
| 2019/0059645 | A1 | 2/2019 | Nelson et al. | |
| 2019/0104885 | A1 | 4/2019 | Pahnke et al. | |
| 2019/0231124 | A1 | 8/2019 | Jones | |
| 2019/0357727 | A1 | 11/2019 | Rudy et al. | |

FOREIGN PATENT DOCUMENTS

| | | | |
|---|---|---|---|
| EP | 2063686 | A1 | 5/2009 |
| EP | 2329751 | A1 | 6/2011 |
| GB | 2458897 | A | 10/2009 |

OTHER PUBLICATIONS

Star Manufacturing International Inc. product guide for Grill Express Sandwich Grills, Aug. 2017. 2 pages.

American Griddle product guide for 3ft Steam Griddle, May 2017. 1 page.

Keating of Chicago, Inc. product guide for Top-Side Cooker, Apr. 2017. 2 pages.

Vulcan product guide for VMCS Heavy Duty Electric Griddle Top, Nov. 2017. 2 pages.

Taylor United Technologies product guide for L812 Electric Two-Sided Grill, Jun. 2018. 2 pages.

Cutleryandmore.com, "Cuisinart Nonstick Frittata Set," Oct. 16, 2014, p. 1 (Year: 2014).

Non-Final Office action received for U.S. Appl. No. 16/047,918, mailed on Aug. 14, 2020, 71 pages.

YouTube video at https://www.youtube.com/watch?v=S30yEQOD_-A, Author: Tom Horsman, Title: Smash Burgers on the $100.00 Modified Blackstone 28" Griddle, Publication Date: Sep. 3, 2017. (Year: 2017).

* cited by examiner

MODULAR GRIDDLE WITH SEARING DEVICE

CROSS REFERENCE TO RELATED APPLICATIONS

This application claims the benefit under Title 35, U.S.C. § 119(e) of U.S. Provisional Patent Application Ser. No. 63/118,469 entitled MODULAR GRIDDLE WITH SEARING DEVICE and filed Nov. 25, 2020. This application is a continuation-in-part of U.S. application Ser. No. 16/410,677 entitled MODULAR GRIDDLE WITH SEARING DEVICE and filed May 13, 2019, which is a continuation-in-part of U.S. application Ser. No. 16/047,918, entitled MODULAR GRIDDLE WITH SEARING DEVICE and filed Jul. 27, 2018, now abandoned, which is a continuation-in-part of U.S. application Ser. No. 15/981,360, entitled MODULAR GRIDDLE WITH SEARING DEVICE and filed May 16, 2018, now U.S. Pat. No. 10,881,245, which claimed the benefit under Title 35, U.S.C. § 119(e) of U.S. Provisional Patent Application Ser. No. 62/508,345, entitled SEARING DEVICE FOR GRIDDLE COOKED FOOD and filed on May 18, 2017, and U.S. Provisional Patent Application Ser. No. 62/647,958, entitled MODULAR GRIDDLE WITH SEARING DEVICE and filed on Mar. 26, 2018. U.S. Application Ser. No. 16/410,677 also claimed the benefit under Title 35, U.S.C. § 119(e) of U.S. Provisional Patent Application Ser. No. 62/801,002, entitled MODULAR GRIDDLE WITH SEARING DEVICE and filed on Feb. 4, 2019. The entire disclosures of all of the above-identified applications are hereby expressly incorporated by reference herein.

BACKGROUND

1. Technical Field

The present disclosure is directed to a modular griddle and, in particular, to a griddle with selectively attachable searing, steaming or other cooking devices moveable relative to a griddle cooking device and sized to simultaneously process multiple food items placed on the cooking surface of the griddle cooking device.

2. Description of the Related Art

Cooking appliances designed for high throughput of foods prepared on a griddle are common in the restaurant industry. In many circumstances, the food items to be cooked on the griddle benefit from being seared. i.e., being compressed against the griddle cooking surface to eliminate voids in the food item abutting the cooking surface to create a uniform caramelized sear. For example, burgers of many types (e.g., ground or chopped beef, turkey, bison, etc.) benefit from being seared against the grilling surface to create a caramelized outer layer and seal in natural meat juices, thereby enhancing the flavor of the cooked burger. Additional food items, such as bacon, achieve more consistent and faster cooking when pressed.

In certain circumstances, a weighted searing implement having a contact surface just larger than an individual patty to be cooked is utilized to press food against the griddle surface and sear the same. Unfortunately, searing multiple food items with such a device cannot be done simultaneously, with the device requiring application to each individual food item. Furthermore, because such a searing device is not integral with the griddle, a convenient storage location must be provided.

Other griddle functions include steaming food items, cooking food items between two heated platens, and toasting food items (e.g., buns) on the heated griddle. These and other griddle functions may also utilize specialized griddle equipment.

SUMMARY

The present disclosure provides a griddle system having one or more of a variety of performance-enhancing structures and functions. For example, an adjustable latching mechanism may provide for mechanical advantage when closing the griddle, particularly when the griddle is used to compress food items. An adjustable electromagnet and adjustable ferrous plate may cooperate to help hold the griddle in the closed position. The griddle may also feature a heated upper platen with efficient and robust cable routing features.

In one form thereof, the present disclosure provides a griddle including a cooking surface, a base frame connected to the cooking surface and pivotable between a closed configuration and an open configuration, the base frame having at least one tubular member, an upper platen connected to the base frame and pivotable between the closed configuration and the open configuration, the upper platen comprising a heated upper platen including an electrically resistive heating element, a product press facing the cooking surface when the upper platen is in the closed configuration, the product press supported on the base frame, the product press spaced from the cooking surface in the open configuration such that food items can be placed upon and retrieved from the cooking surface by hand without contacting the product press, and the product press near the cooking surface in the closed configuration such that the product press can compress the food items against the cooking surface, and a power cable electrically connected to the electrically resistive heating element, the power cable passing through the tubular frame member of the base frame.

In another form thereof, the present disclosure provides a griddle assembly including a griddle having a cooking surface, a cooking attachment connected to the cooking surface and movable between an open configuration and a closed configuration, an electromagnet mounted to the griddle base, and a ferrous plate adjustably mounted to the cooking attachment, the ferrous plate positioned into a magnetic field of the electromagnet when the electromagnet is activated and the cooking attachment is in the closed configuration, whereby activation of the electromagnet in the presence of the ferrous plate establishes a magnetic field around the ferrous plate.

In yet another form thereof, the present disclosure provides a griddle assembly including a griddle having a cooking surface, a cooking attachment connected to the cooking surface and movable between an open configuration and a closed configuration, and a latch mechanism including a latch mounted to the cooking attachment and a latch receiver adjustably mounted to the griddle, the latch engageable with the latch receiver to lock the cooking attachment into the closed configuration.

In still another form thereof, the present disclosure provides a griddle assembly including a griddle having a cooking surface, a cooking attachment connected to the cooking surface and movable between an open configuration and a closed configuration, the cooking attachment including a frame assembly. The frame assembly includes a distal frame pivotably connected to the griddle at a distal frame pivot between the open configuration and the closed configuration, and a proximal frame pivotably connected to the distal frame at a proximal frame pivot, the proximal frame movable between a closed-locked configuration and a closed-unlocked configuration when the distal frame is in the closed configuration. The griddle assembly further includes a latch mechanism including a latch mounted to the proximal frame and a latch receiver adjustably mounted to the griddle, the latch engageable with the latch receiver when the proximal frame is pivoted into the closed-locked configuration to lock the cooking attachment into the closed configuration.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 51 is an exploded view of a cooking attachment adapted for use with the counterbalance pivot assembly of FIG. 48;

Figure 1:
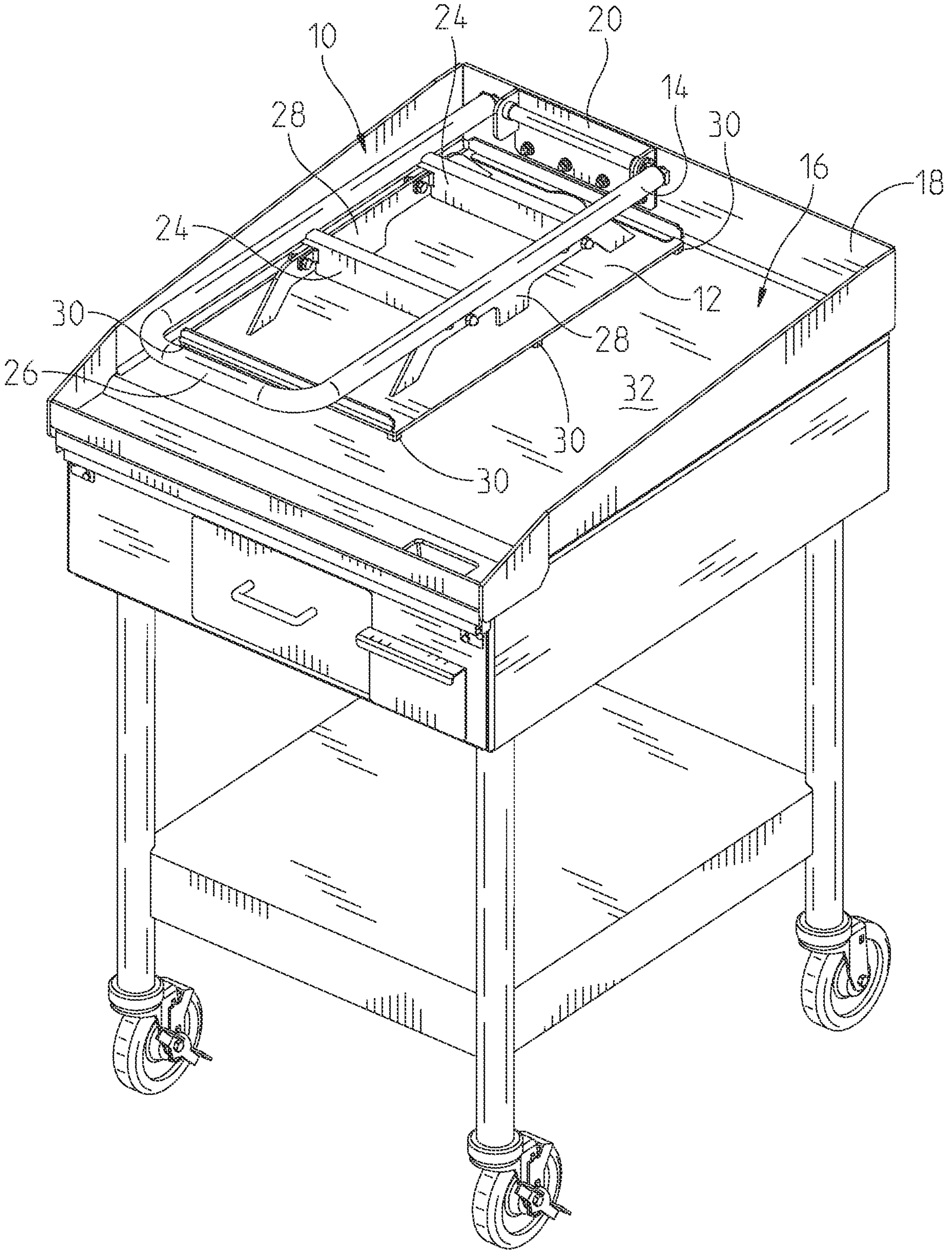
FIG. 1 is a perspective view of a griddle incorporating the searing mechanism of the present disclosure, with the searing mechanism shown in sear position.
Figure 2:
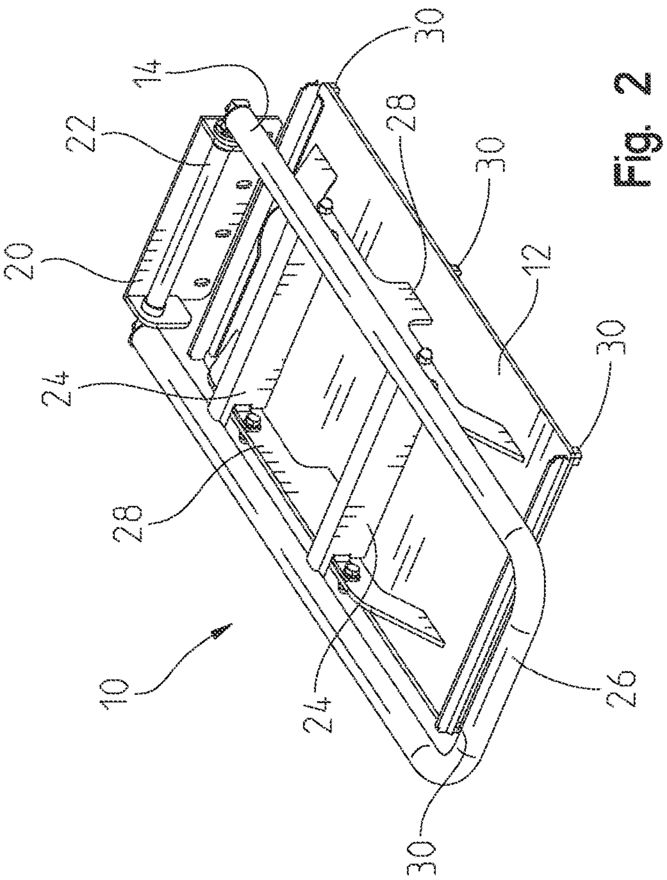
FIG. 2 is a perspective view of the searing mechanism of the present disclosure.
Figure 5:
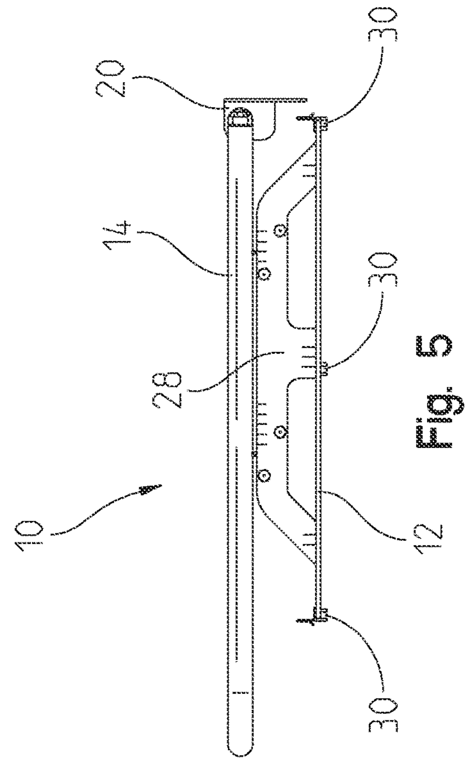
FIG. 5 is a side elevational view thereof.
Figure 3:
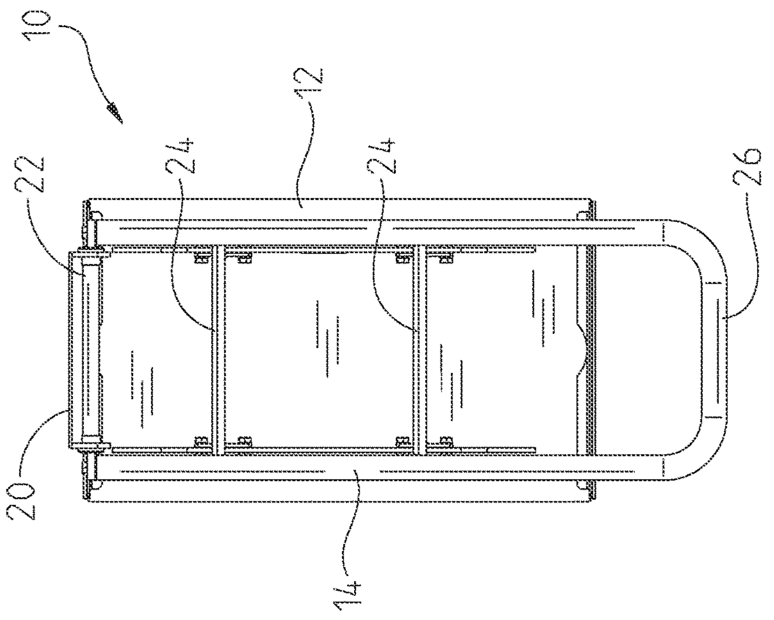
FIG. 3 is a plan view thereof.
Figure 4:
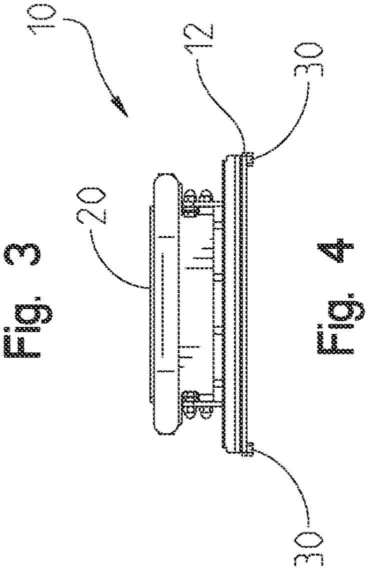
FIG. 4 is a front elevational view thereof.
Figure 6:
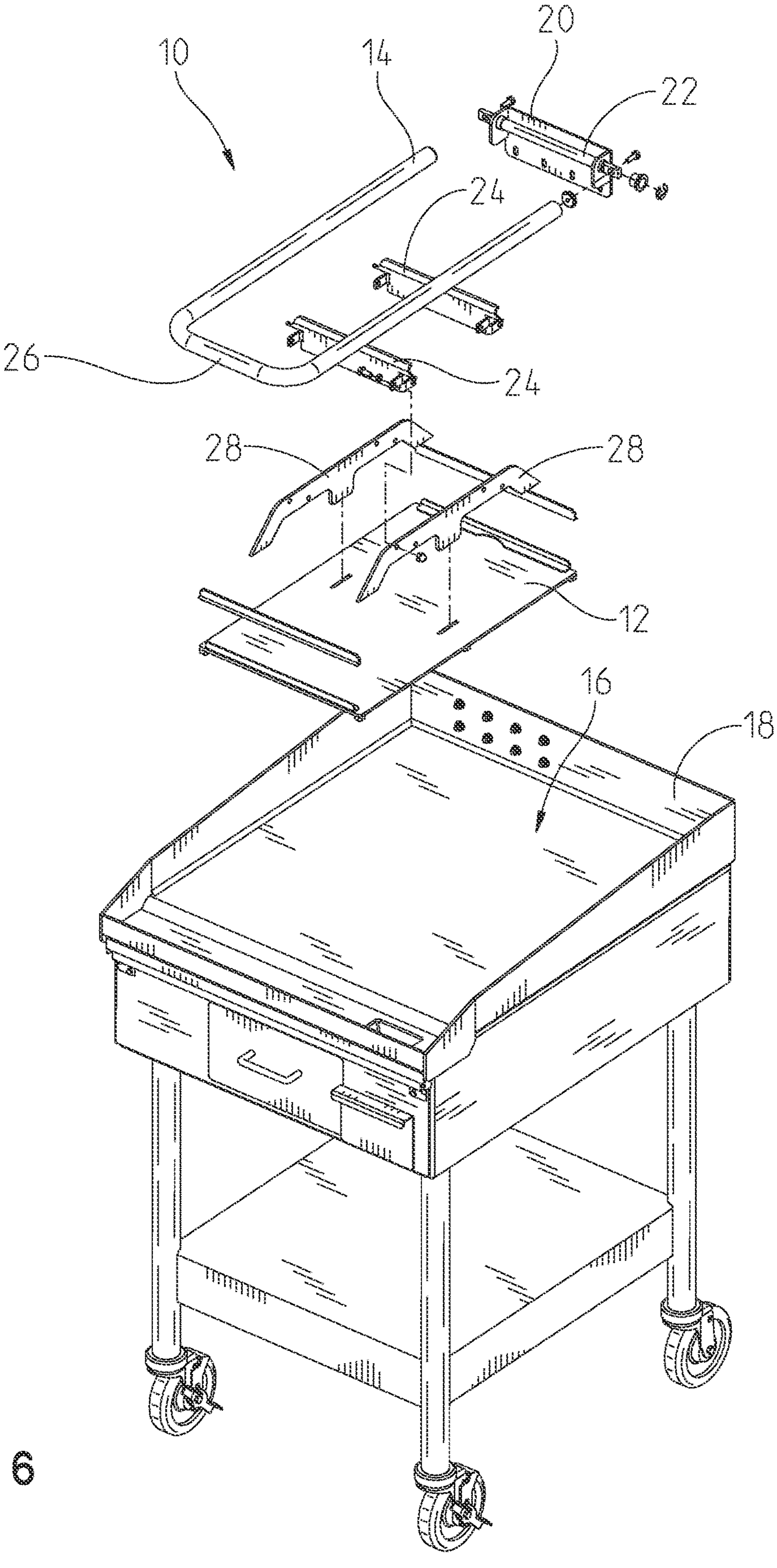
FIG. 6 is a perspective, exploded view of the griddle/searing mechanism of FIG. 1.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

Figure 9:
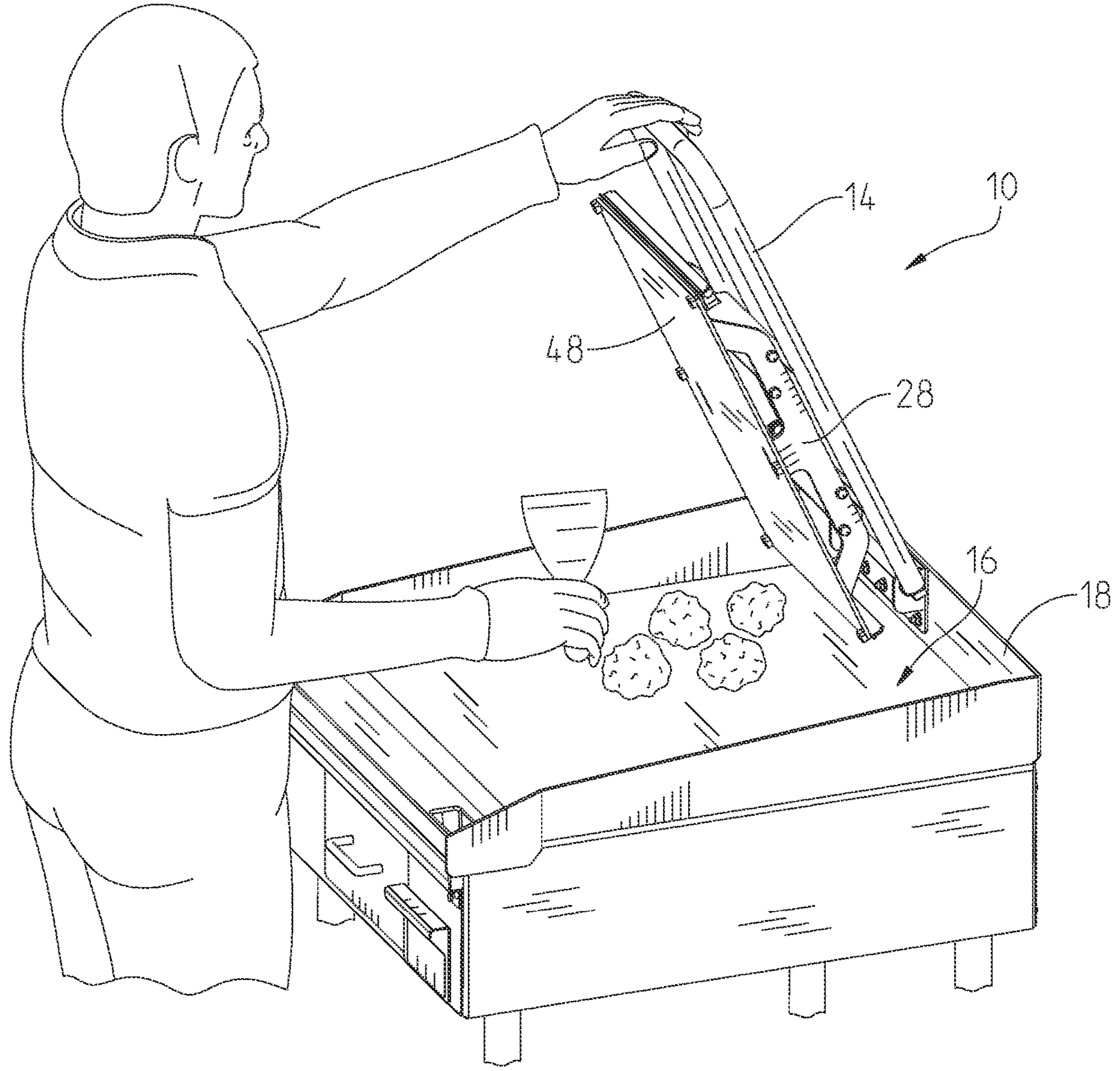
FIG. 9 is another perspective view of a griddle incorporating a searing mechanism of the present disclosure.

Referring to FIGS. 1 and 9, searing mechanism 10 of the present disclosure is fixed to griddle 16 to become an integral feature thereof. Specifically, yoke 20 of searing mechanism 10 is bolted to splash shield 18 to secure searing mechanism 10 to griddle 16. Searing mechanism 10 includes searing plate 12 presenting searing surface 34 (FIG. 7) facing cooking surface 32 on the base of griddle 16. Searing surface 34 presents a surface area of about 288 square inches (e.g., 12 inches by 24 inches) capable of searing multiple food items. For example, searing mechanism 10 may be used to simultaneously sear up to 12 quarter pound burger patties placed on cooking surface 32 of griddle 16.

In use, searing mechanism 10 can be rotated between the raised position illustrated in FIG. 9 to the sear position illustrated in FIG. 1. In the raised position, the portion of cooking surface 32 of griddle 16 can be accessed to place food items in the field of use of searing mechanism 10 or to manipulate food already placed in the field of use, e.g., to flip the food items. For the purposes of this document, the "field of use" of the searing mechanism is the area of the cooking surface 32 of the underlying griddle 16 that is covered by the searing plate 12 of searing mechanism 10 in the sear position illustrated in FIG. 1, whether or not searing mechanism 10 maintains the sear position, i.e., the "field of use" remains the same when the searing mechanism is raised to the raised position illustrated in FIG. 9.

1. Introduction

Figure 7:
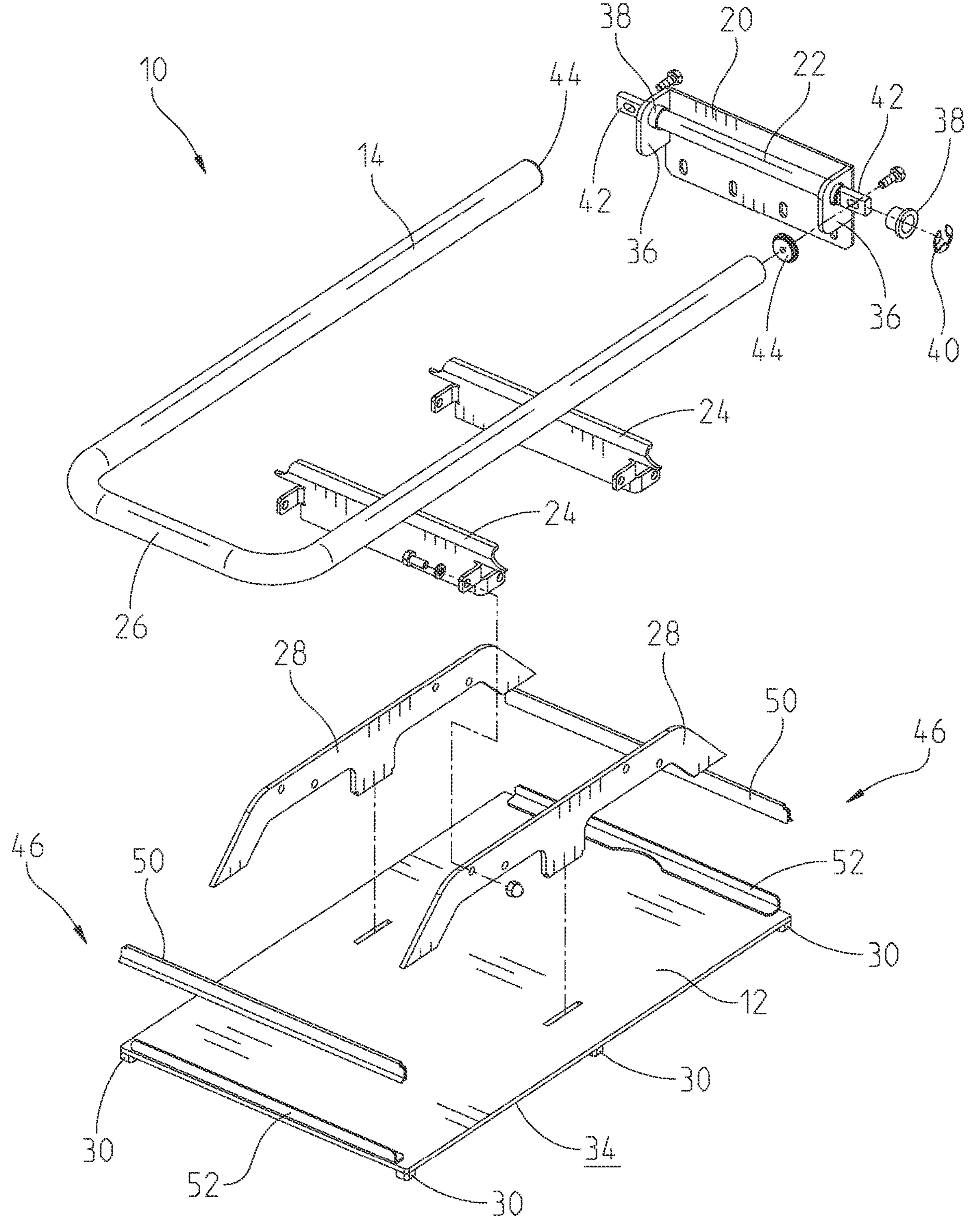
FIG. 7 is a partially exploded view of the searing mechanism of FIG. 2.

Referring to FIG. 7, yoke 20 presents a pair of arms 36, each having an aperture through which shaft 22 can be positioned to rotatably support searing plate 12 relative to griddle 16. Bushings 38 are interposed between the outer diameter of shaft 22 and the walls of arms 36 forming the apertures therethrough. A pair of snap rings 40 (only one of which is illustrated in FIG. 7) are respectively secured in annular grooves at the opposing ends of shaft 22 to secure the axial positions of bushings along the length of shaft 22. With snap rings 40 secured to shaft 22, the radially outward flanges of each bushing 38 substantially fills the axial space between the respective snap ring 40 and arm 36. In this context, "substantially fill" means that the radial flanges of bushings 38 cannot move axially a distance that would allow either of bushings 38 to move out of the aperture in arm 36 in which they are positioned, but still the radial flanges of the bushings 38 are sufficiently spaced from the corresponding arms 36 and snap rings 40 to allow for the rotation described in detail below.

With bushings 38 and snap rings 40 secured relative to yoke 20, as described above, extensions 42 from shaft 22 extend from either side of yoke 20. As illustrated in FIG. 7, each extension 42 presents a flat nominally defining a plane parallel to the longitudinal axis of shaft 22 and an aperture defining a longitudinal axis nominally orthogonal to the flat. U-shaped frame 14 is constructed of tubular stainless steel and presents open ends adjacent to yoke 20. The open ends of U-shaped frame 14 have plugs 44 secured therein. e.g., via welding. Each plug 44 includes a central, threaded aperture. A pair of bolts (only one of which is shown in FIG. 7) respectively traverse the apertures in extensions 42 and are threaded into plugs 44 to secure U-shaped frame 14 to shaft 22. The flats at each extension 42 are thereby pressed against flat end surfaces of plugs 44 to key U-shaped frame 14 relative to shaft 22. The remaining structure of searing mechanism 10 depends from, e.g., is suspended by, U-shaped frame 14 such that the above-described securement of U-shaped frame 14 to shaft 22 rotatably connects searing plate 12 to griddle 16.

Spanning the arms of U-shaped frames are cross frames 24. As illustrated in FIG. 7, each opposing end of cross frames 24 presents a rounded void, into which each arm of U-shaped frame is positioned and subsequently welded thereto. Each cross frame 24 is bolted to an upright 28 at each end thereof. Each upright 28 includes a central riser with a laterally recessed downward extension fit into a correspondingly sized slot in searing plate 12, such that each upright 28 is configured to evenly distribute a downward force on handle 26 throughout the area of searing plate 12. With the central risers of uprights 28 positioned in the respective slots in searing plate 12, uprights 28 are secured to searing plate 12. e.g., via welds. In this way, searing plate 12 is rotatably connected to yoke 20 and thereby to griddle 16.

Welded to the front and back of searing plate 12 are securement features 46. Each securement feature 46 includes an upright 52 extending upward from the top of searing plate 12 opposite searing surface 34. Uprights 52 may be welded to searing plate 12. A sheet 48, made of or coated with polytetrafluorethylene (PTFE) such as TEFLON® available from DuPont (FIGS. 8 and 9) is positioned over top of searing surface to provide a non-stick surface for contacting food. Sheet 48 includes opposing front and back ends that are draped over uprights 52. Connectors 50 comprise U-shaped spring steel components having a groove formed between the upstanding arms of the "U" formed thereby. After draping sheet 48 over uprights 52, connectors 50 are positioned over sheet 48 and in frictional engagement with upright 52 (and the sheet positioned overtop) to hold sheet 48 in place over top of searing surface 34.

Figure 43:
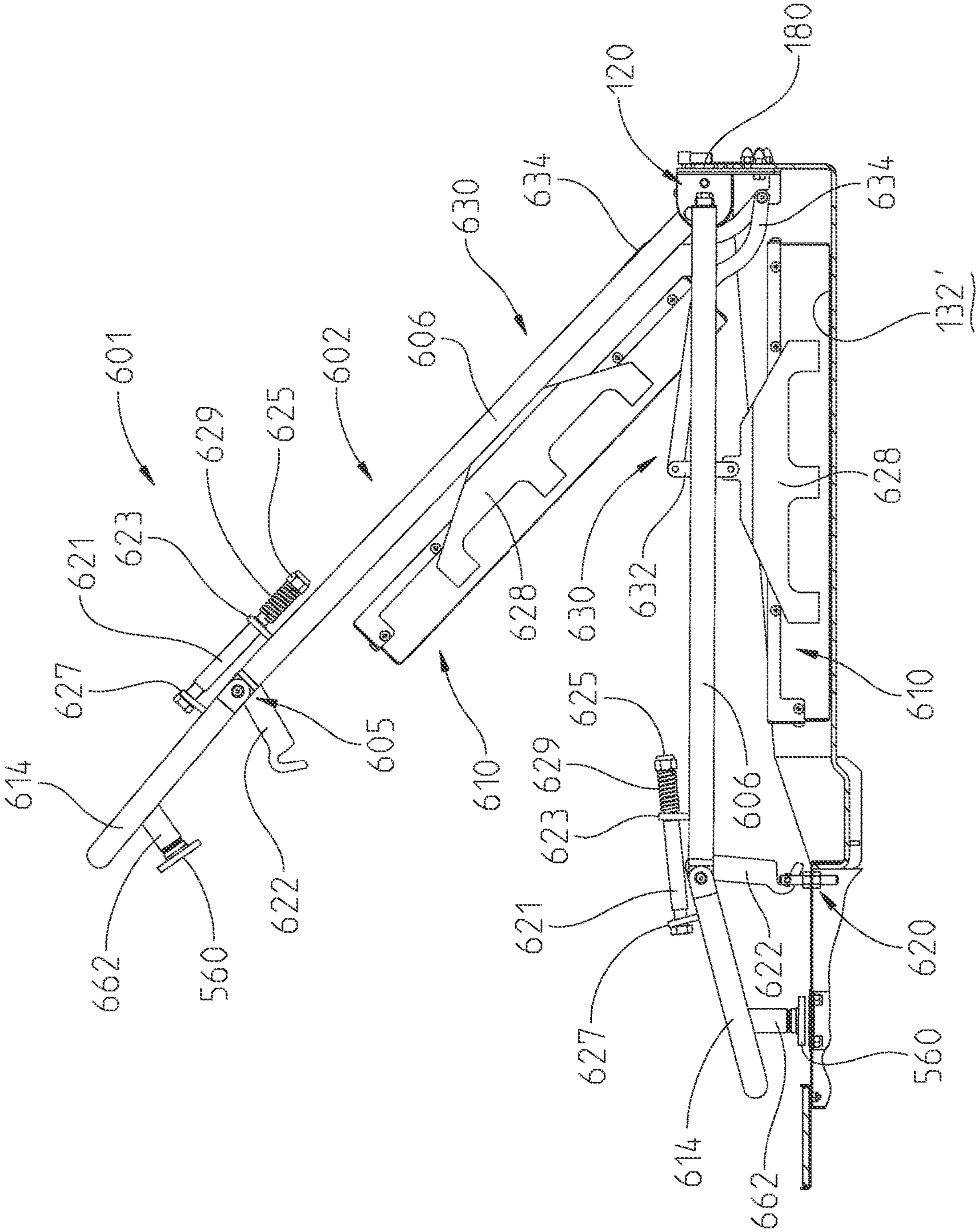
FIG. 43 is a side elevation, section view of the pair of latching cooking mechanisms shown in FIG. 42.
Figure 43A:
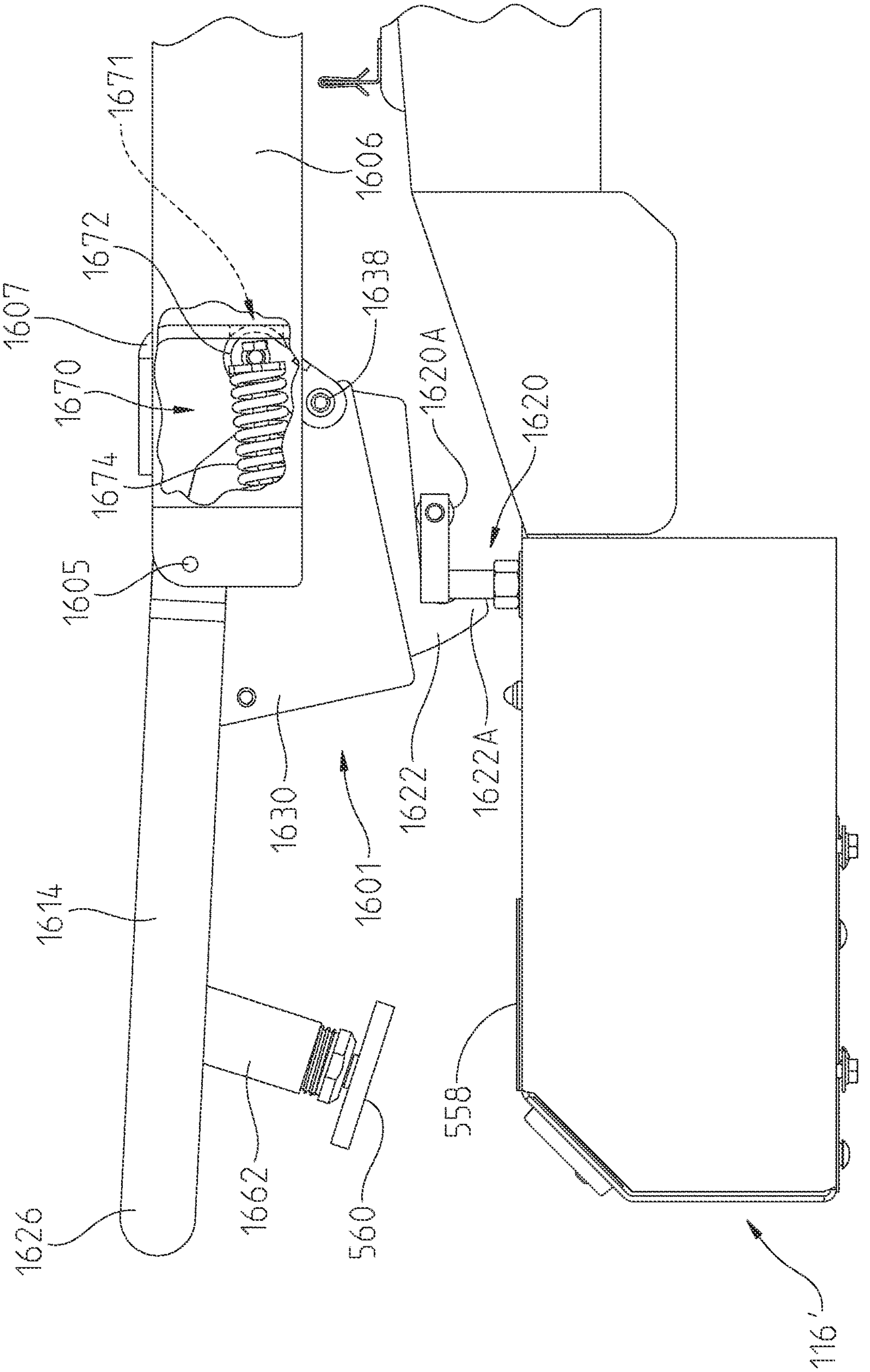
FIG. 43A is a side elevation, partial breakaway view of a proximal portion of a latching cooking mechanism made in accordance with the present disclosure, shown in an open and unlatched configuration.
Figure 43B:
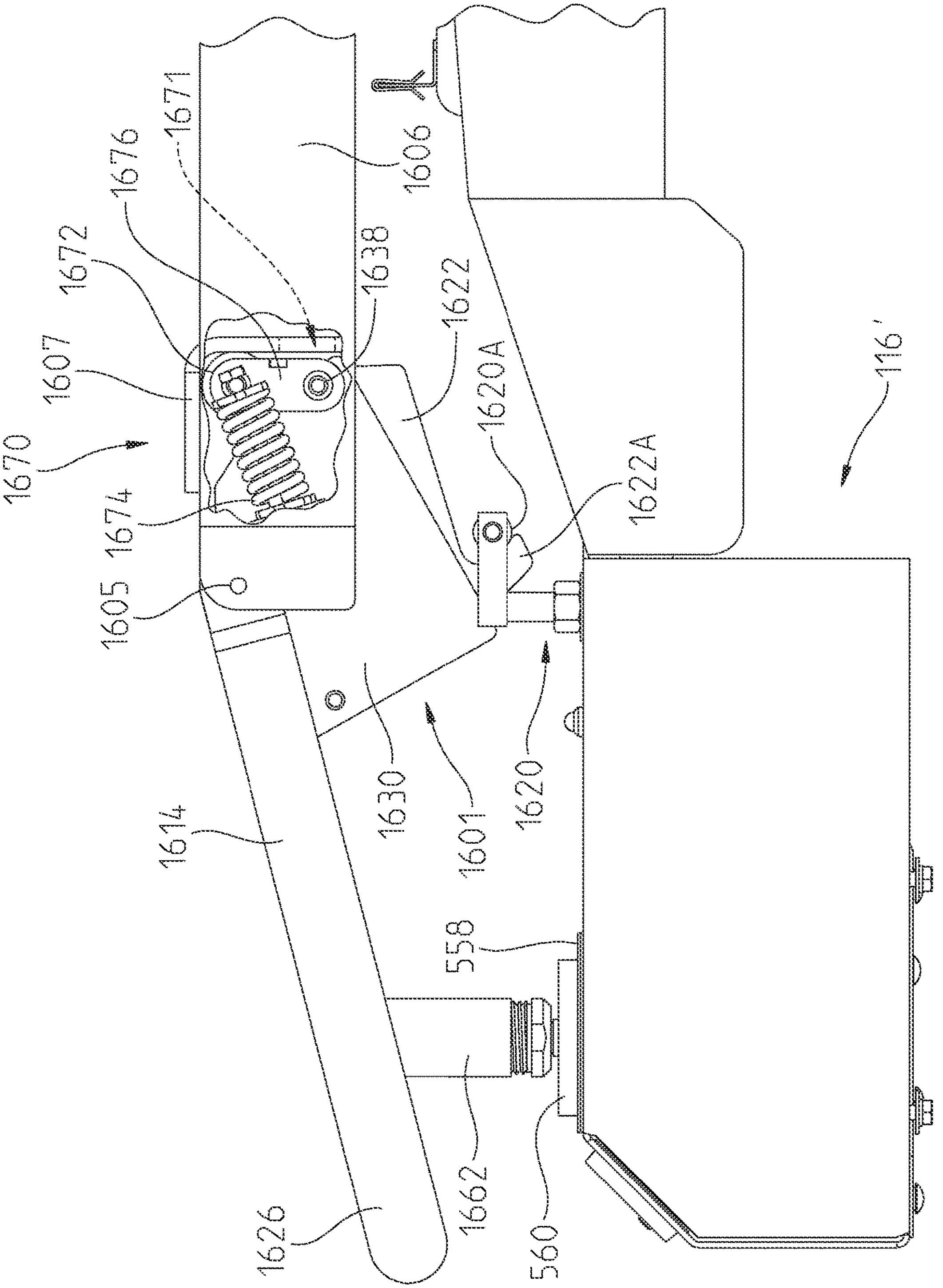
FIG. 43B is a side elevation, partial breakaway view of the latching cooking mechanism shown in FIG. 43A, shown in a closed and latched configuration.
Figure 43C:
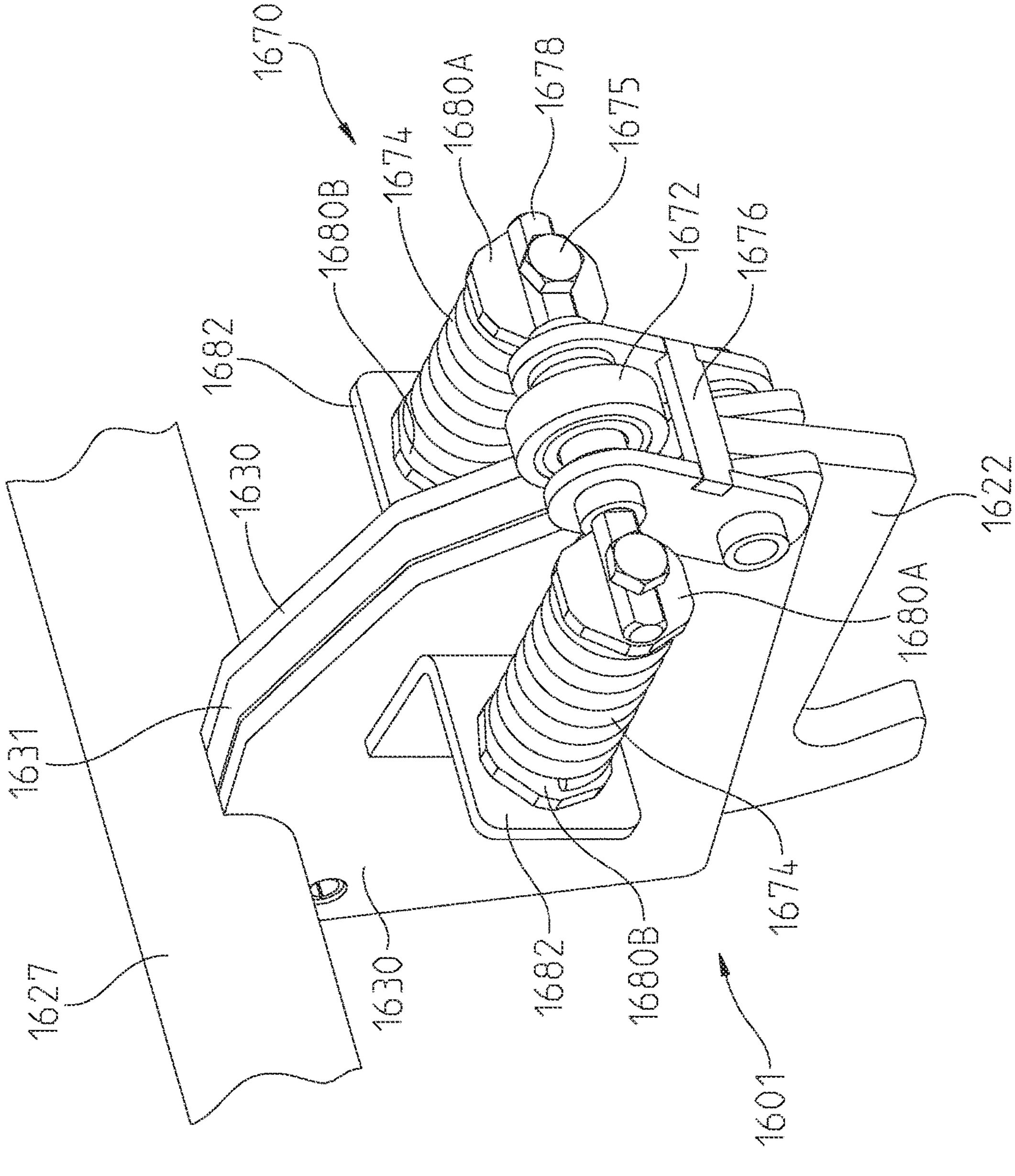
FIG. 43C is a perspective view of a latch assembly and handle retention assembly used in the latching cooking mechanism shown in FIG. 43A.

In one exemplary embodiment shown in FIGS. 43F and 43G, product press attachment 610 is shown connected to latching cooking mechanism 1600, described in further detail below. Press attachment 610 includes connectors 652A and clips 652B configured to affix sheet 48 in the same manner as described above with respect to connector 50 and upright 52. However, press attachment 610 is configured to be rotated from a cooking position, shown in FIG. 43F, to a maintenance position, shown in FIG. 43G, which facilitates easy access to both the proximal and distal connectors and clips 652A, 652B for easy cleaning, replacement of sheet 48, and other maintenance tasks.

Product press attachment 610 is pivotably connected to frame 1602 via pullback assembly 630, described in further detail below. As best seen in FIG. 43F, pivot link 632 of pullback assembly 630 is connected to frame 1602 via stanchion 1636, which is elevated above the profile of distal bar 1606. When latching cooking mechanism 1600 is pivoted to the open position illustrated in FIG. 43G, pivot link 632 is drawn into a substantially parallel configuration with distal bar 1606 of frame 1602 by the linkages of assembly 630. This parallel configuration limits the downward pivoting of the distal portion of press attachment 610, as described in further detail below with respect to pullback assembly 630. Stanchion 1636 cooperates with pivot link 632 to position product press attachment 610 such that it can be rotated more than 90 degrees relative to frame 1602, as shown in FIG. 43G. This rotation brings the distal connector and clip 652A, 652B around to an easily accessible proximal location, and generally exposes the distal portion of product press attachment 610 at a location that is closer to the user and comfortably above the cooking surface 132'. Thus, a user of cooking mechanism 1600 can easily swing attachment 610 around to facilitate cleaning, removal and or replacement of sheet 48 (FIGS. 8 and 9) and any other required maintenance or cleaning tasks.

Feet 30 extend downwardly from searing surface 34 and are positioned about the perimeter of searing plate 12. In the exemplary embodiment illustrated, six feet 30 are spaced about the perimeter of searing plate 12. Sheet 48 includes cutouts accommodating feet 30. Feet 30 extend a distance from searing surface 34 equal to the desired thickness of the food item to be seared.

After placing food items in the field of use of searing mechanism 10, searing mechanism 10 can be moved from the open position illustrated in FIG. 9 to the closed or cooking position illustrated in FIG. 1. Handle 26, which is the base of U-shaped frame 14, can be manipulated by hand to effect such movement. Advantageously, the force to compress the food items can be applied by the operator through handle 26 at the front of the griddle, as opposed to prior searing devices, which required application of force to individual food items and, therefore, necessitated leaning over the griddle to access all of the food items. In this way, the present invention provides a searing mechanism with improved ergonomics relative to the prior art, which reduces the risk of wrist injury from smashing hundreds of food items such as hamburgers individually each hour at a high throughput restaurant. The user can grasp handle 26 in the raised position of searing mechanism 10 (FIG. 9) and apply a downward force to rotate searing plate 12 about the longitudinal axis of shaft 22, which acts as a hinge pin for searing mechanism 10. As sheet 48 makes contact with the food items placed in the field of use, compressive force can be applied to the food items by pressing downwardly on handle 26. This downward force is transmitted as a pressure across the area of searing surface 34. Frame 14, 24 and uprights 28 are designed to facilitate even force distribution from handle 26 to searing surface 34.

As searing mechanism 10 approaches the position illustrated in FIG. 1, feet 30 contact cooking surface 32 of griddle 16. Shaft 22 is positioned relative to yoke 20, and; therefore, griddle 16 such that all six feet 30 will achieve flush contact with cooking surface 32 of griddle 16 when searing mechanism 10 is positioned as illustrated in FIG. 1, in the searing position. In this position, additional downward compression of the food items placed on cooking surface 32 of griddle 16 cannot be effected by searing mechanism 10. Feet 30 create a uniform spacing, thereby producing consistent food thickness, which improves quality and consistency of food items cooked or otherwise processed using mechanism 10. Additionally, the device of the present disclosure advantageously decreases cook times by holding expelled juices under searing plate 12. Juices under searing plate 12 are vaporized into steam to decrease the cook time.

In additional embodiments of the present disclosure, adjustable feet 30 are utilized in conjunction with a floating or adjustable hinge (in lieu of fixed yoke 20 and shaft 22) so that different food thickness can be accommodated. Specifically, feet 30 may be extended or retracted to establish an alternative food thickness with a complementary adjustment made to the hinge structure. Consistent thickness also increases food safety, as cooking times can be precisely controlled to achieve a desired food temperature.

In one exemplary embodiment shown in FIG. 8A, feet 30A provide an alternative arrangement for providing leveling and spacing of the cooking surface of cooking mechanism 110 (shown in FIGS. 10-12 and described in further detail below). Each foot 30A is formed as a threaded rod which threadably engages an adjacent nut 33A. In the illustrated embodiment, nuts 33A are disposed at three spaced apart locations of searing attachment 110, such that a proximal foot 30A is positioned at the center of searing attachment 110 along the proximal edge thereof, while two distal feet 30A are positioned at each distal corner thereof. However, it is contemplated that any spatial arrangement of feet 30A may be used as required or desired for a particular application. In one embodiment, nuts 33A are welded or otherwise affixed to searing attachment 110 at the desired positions for each foot 30A.

In order to increase or decrease the spacing within the cooking volume between searing attachment 110 and the adjacent cooking surface (such as cooking surface 132 shown in FIG. 10 and described herein), respective feet 30A may be rotated to advance the lower end of each foot 30A downwardly or upwardly as needed. Such adjustment may be facilitated by knobs 31A fixed to an upper end of each foot 30A as illustrated.

In further alternative embodiment of the present disclosure, an over-center or cam mechanism may be utilized to automatically press searing mechanism 10 into the sear position illustrated in FIG. 1 and/or to facilitate moving the searing mechanism to the raised position illustrated in FIG. 9. One exemplary embodiment of a cam mechanism is discussed below with respect to modular cooking mechanism 500.

Additionally, a torsion spring and/or compression spring may be utilized to hold searing mechanism 10 in the raised position, after overcoming, e.g., an over-center or cam mechanism holding searing mechanism 10 in the sear position. One exemplary embodiment of a spring-biased arrangement is discussed below with respect to modular cooking mechanism 100.

In further yet alternative embodiments, a multiple zone griddle with a plurality of searing mechanisms can be provided, such as the three-zone griddle 116 shown in FIG. 10 and described in further detail below.

2. Modularly Interchangeable Cooking Devices and Platen Designs

For example, an alternatively arranged searing device and its components is shown in FIGS. 10-22C as searing attachment 110 and described in further detail below. Searing attachment 110 is substantially similar to searing mechanism 10 described above, with reference numerals of attachment 110 analogous to the reference numerals used in mechanism 10, except with 100 added thereto. Elements of attachment 110 correspond to similar elements denoted by corresponding reference numerals of mechanism 10, except as otherwise noted.

Moreover. FIGS. 10-22C illustrate a modular arrangement in which searing device may be used interchangeably with various other cooking attachments, by operation of a modular attachment feature on each base frame 102 which can be engaged with a corresponding attachment feature on each attachment for tool-less installation and removal. Base frame 402, shown in FIGS. 23-25 and 28, may also be used interchangeably with base frame 102, and all references to base frame 102 may also be considered references to base frame 402 except as otherwise explicitly noted.

Figure 10:
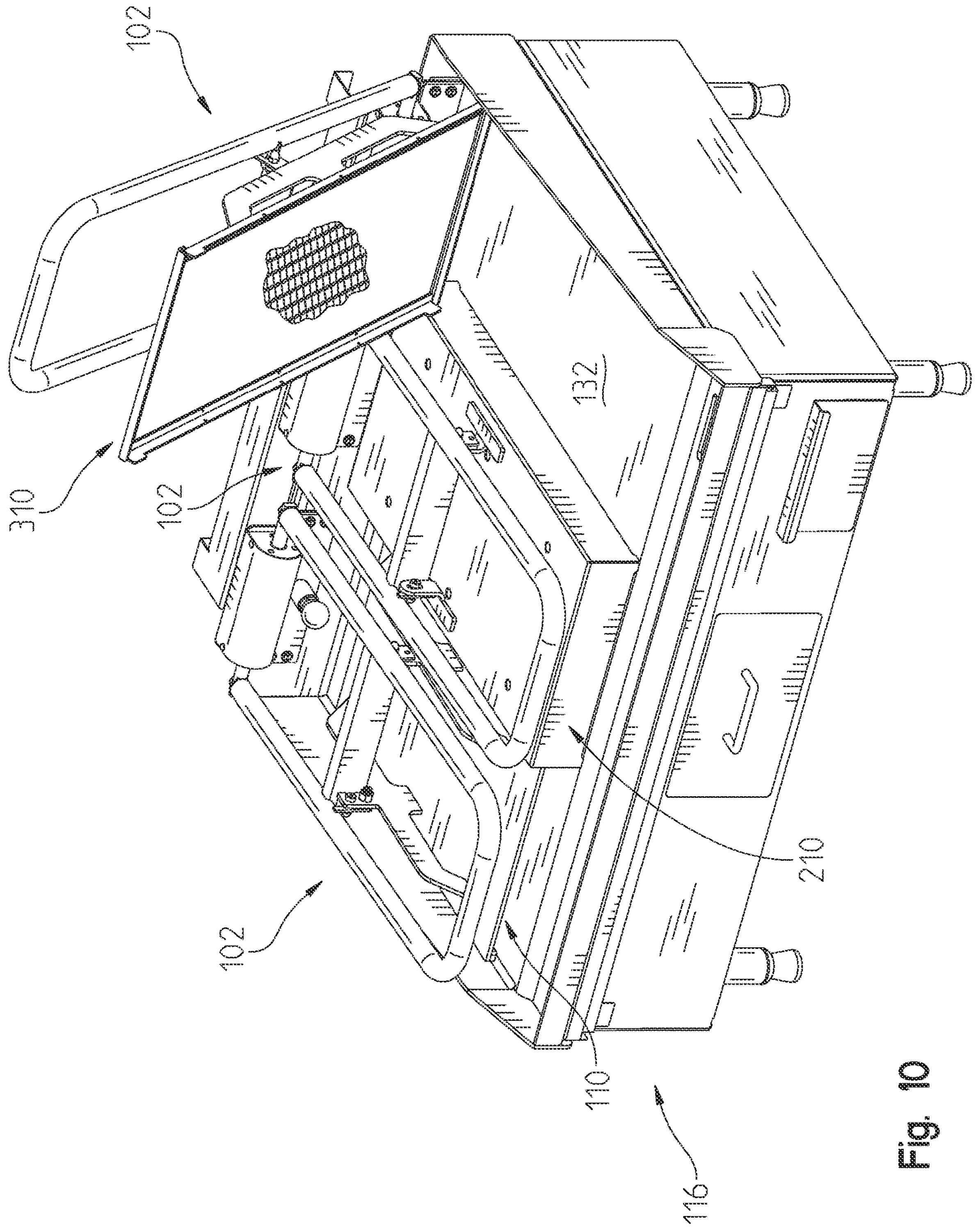
FIG. 10 is a perspective view of a griddle with modular cooking mechanisms of the present disclosure attached thereto.
Figure 26:
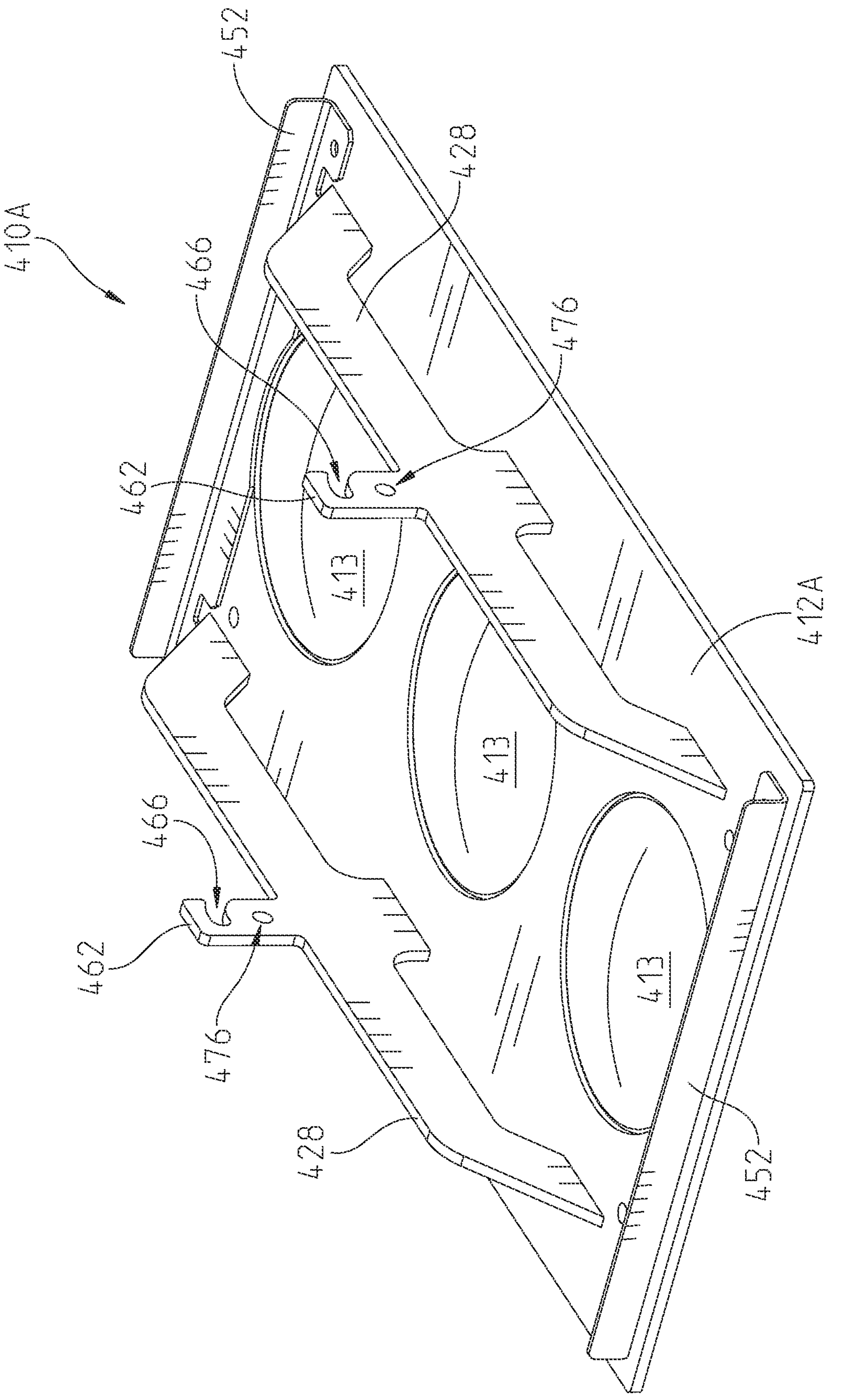
FIG. 26 is a perspective view of a cooking attachment of the present disclosure, having three domed press plates.
Figure 34:
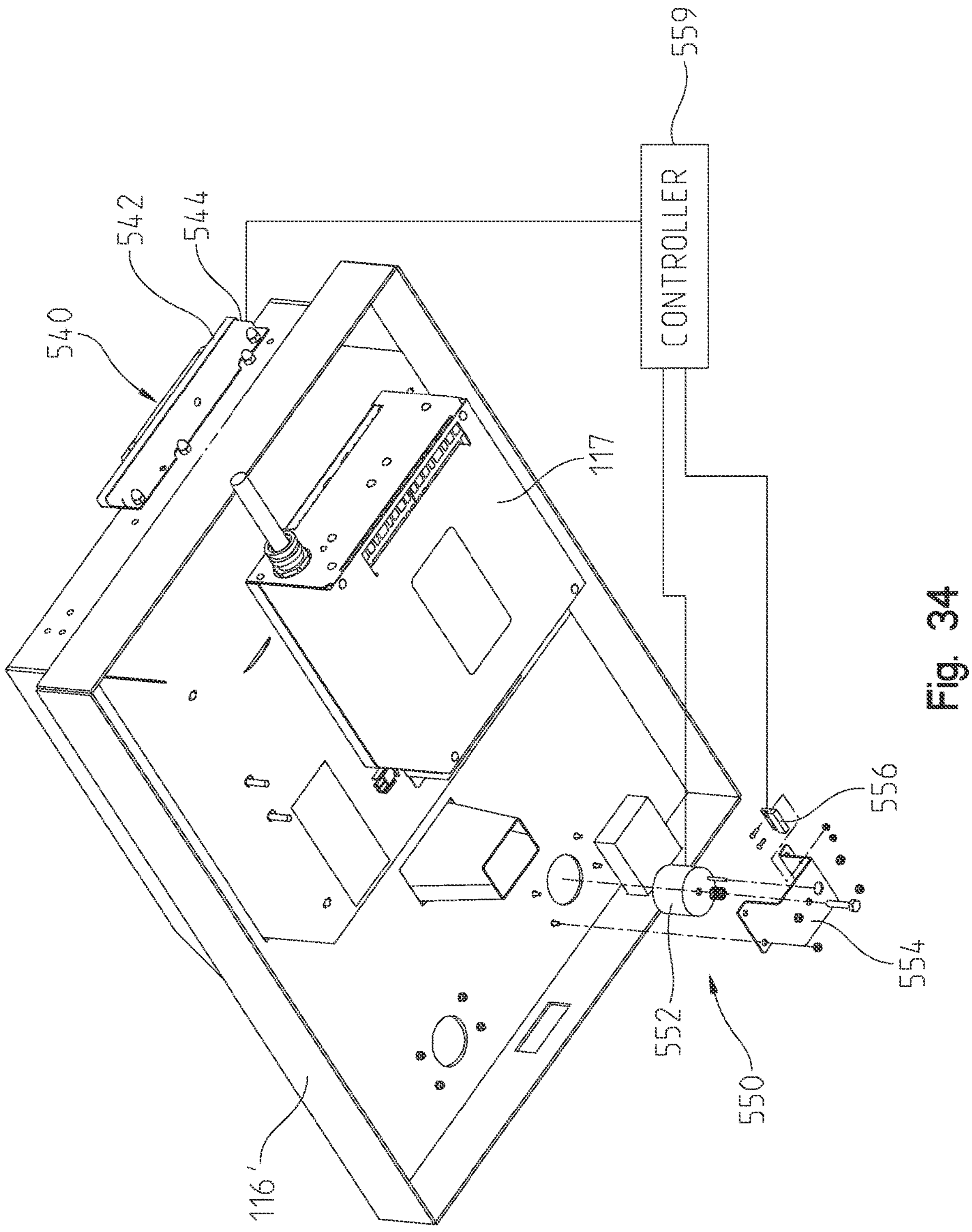
FIG. 34 is a bottom perspective view of the griddle shown in FIG. 30, illustrating a timing sensor assembly via an exploded view of the sensor assembly components.

Turning now to FIG. 10, griddle 116 is shown with three cooking stations, each served by an individual base frame 102. Three different cooking attachments 110, 210, 310 are removably attached to respective frames 102. As described in further detail below, each cooking attachment 110, 210, 310 may serve individual cooking functions in conjunction with cooking surface 132 of griddle 116 (heated by a heater 117, as shown in FIG. 34 with respect to griddle 116'), such as searing attachment 110 for use in cooking seared food products as described above, steaming attachment 210 for the encapsulation of steam for cooking food products, and toasting attachment 310 for toasting buns or other bread products. Moreover, as shown in FIG. 11, these and other attachments may be provided as a kit in the form of modular cooking mechanism 100, which may include one or more base frames 102 and one or more attachments depending on the cooking needs of the griddle operator. Other attachments suitable for use with base frames 102 include product press attachment 410A shown in FIG. 26 and product press attachment 410B shown in FIG. 27, both of which are adapted for use with puck-shaped meat products F (FIG. 29) as further described in detail below.

Figure 11:
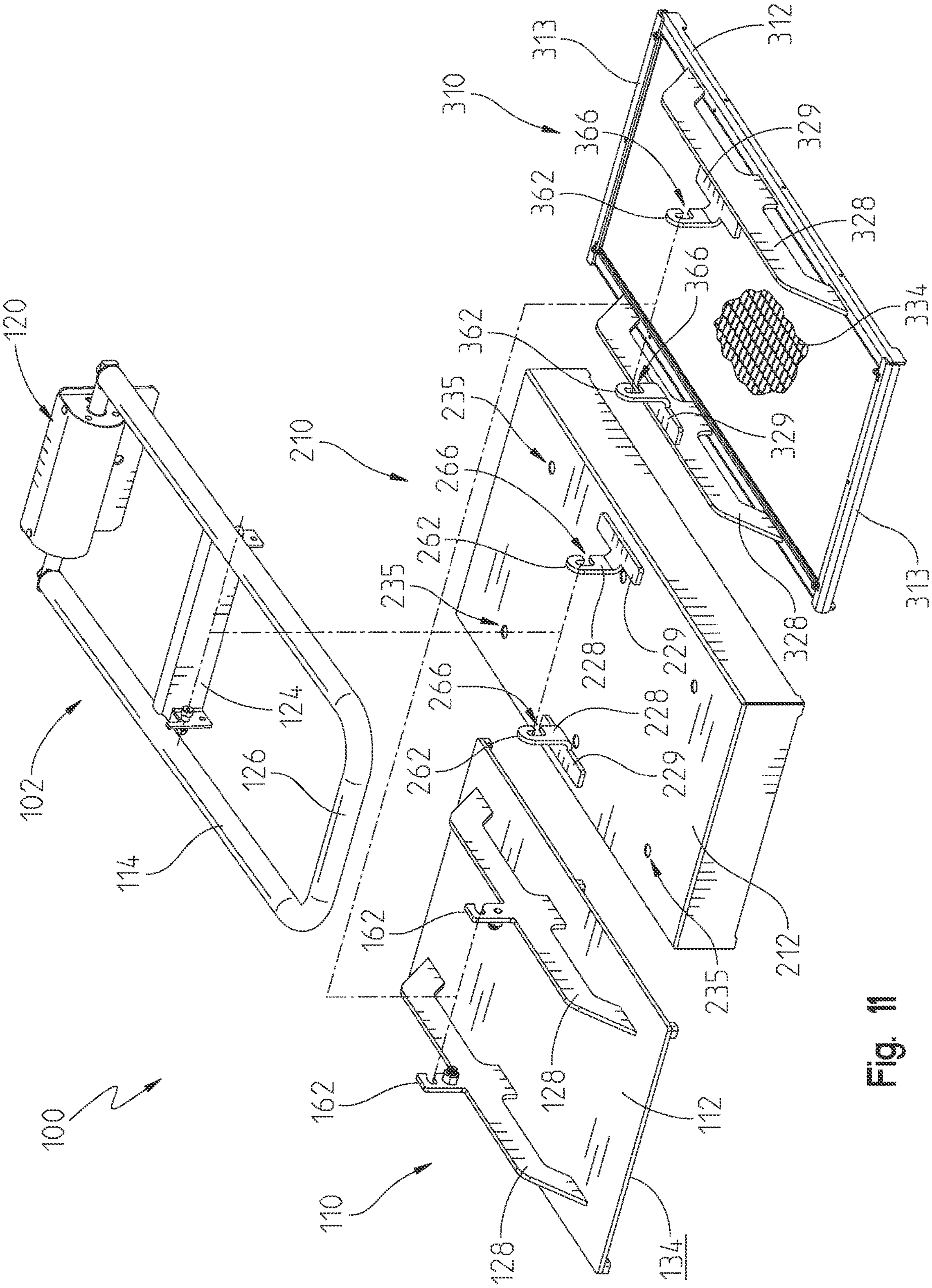
FIG. 11 is a perspective view of a modular cooking mechanism of the present disclosure with various cooking attachments.

Base frame 102, shown in FIG. 11, provides a modular platform for the attachment of any of a variety of cooking attachments via a quick release mechanism 160, shown in FIG. 12 and described in further detail below. Base frame 102 includes U-shaped frame 114 having handle 126 at a proximal portion thereof, similar to frame 14 described above. At a distal portion of frame 114, yoke assembly 120 provides a pivotable attachment between base frame 102 and griddle 116, also described further below. Handle 126 is configured and positioned for manipulation by an operator of griddle 116, who generally stands at the front of griddle 116 opposite the pivotable attachment at yoke assembly 120. Cross frame 124 is fixed to U-shaped frame 114 at a mid position between the proximal handle 126 and the distal yoke assembly 120, approximately equidistant from each.

Figure 30:
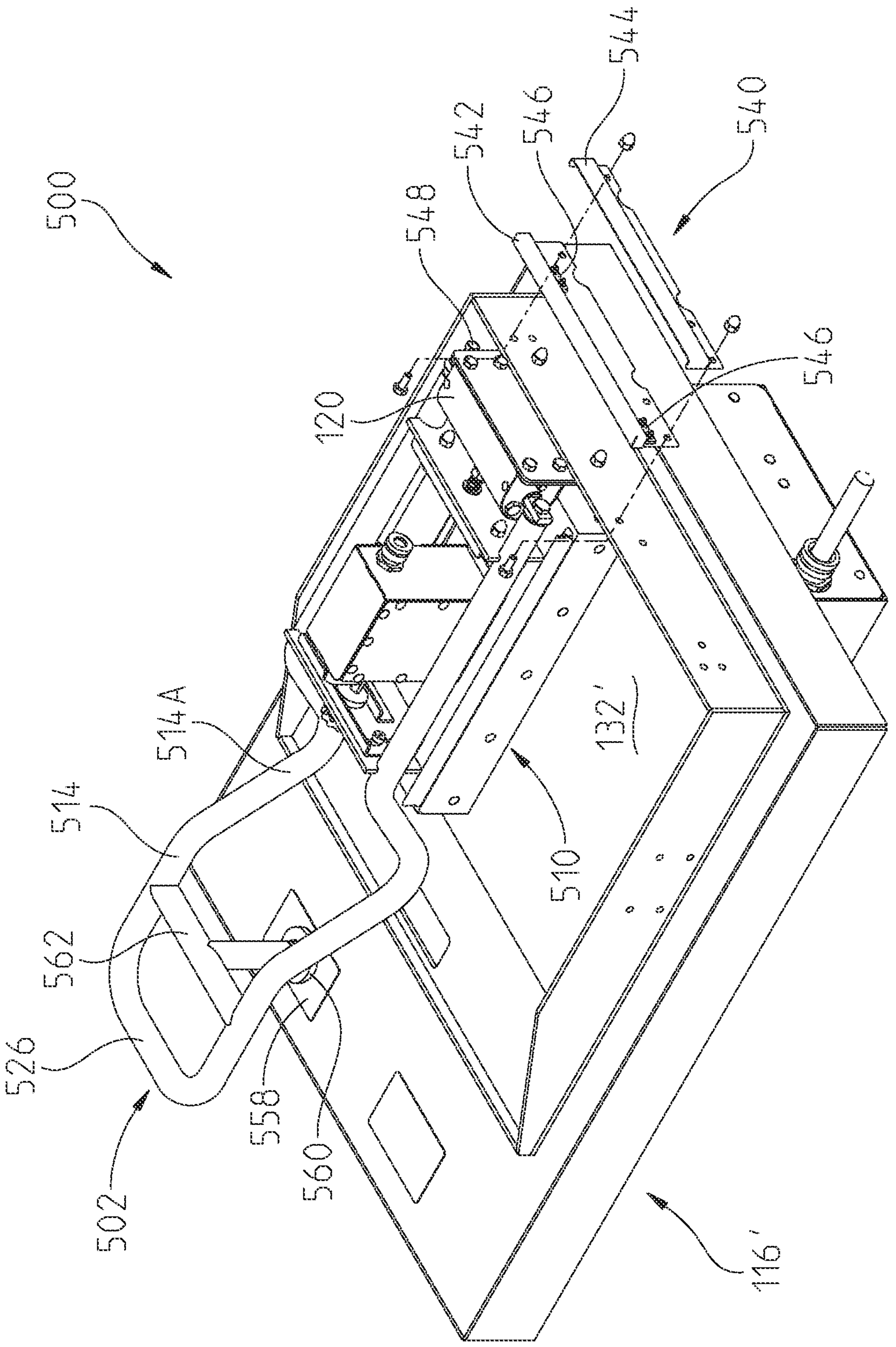
FIG. 30 is a rear perspective view of another griddle with a movable cooking mechanism of the present disclosure attached thereto.
Figure 31:
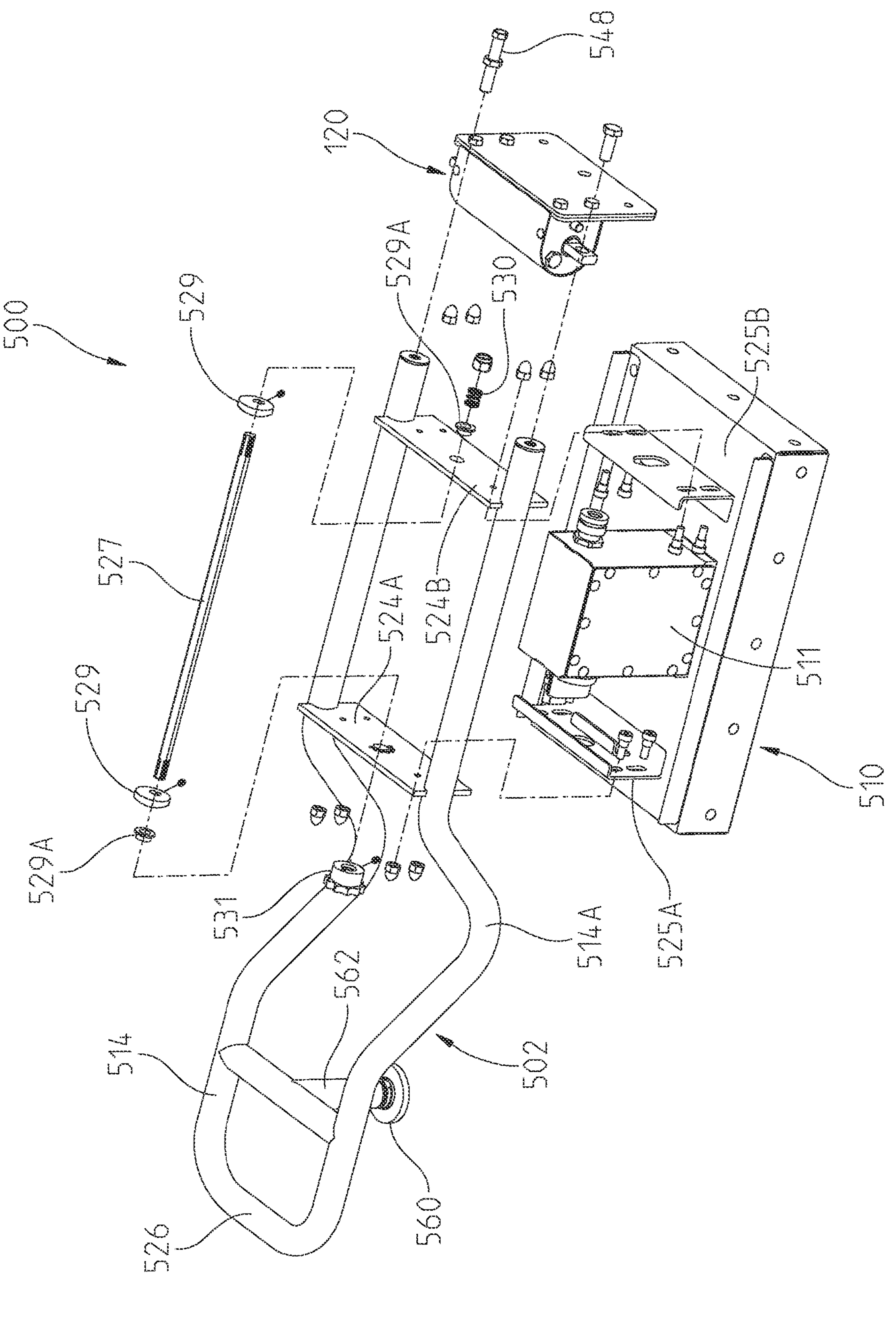
FIG. 31 is an exploded, perspective view of the movable cooking mechanism shown in FIG. 30.

FIGS. 30 and 31 illustrate cooking mechanism 500 having base frame 502 with alternative handle 514. Handle 514 may be interchangeably used with other designs of cooking mechanisms described herein in any combination or permutation, including as a component of base frame 102. Frame 514 is U-shaped and similar in overall structure and function to frame 114 described above in connection with base frame 102, but further includes clearance bends 514A which create a V-shape as viewed in side profile.

Clearance bends 514A may be positioned at a desired location along the proximal-to-distal extent of frame 514, in order to provide spatial clearance for any structures which may otherwise create spatial interference when base frame 502 is pivoted to the open position. For example. FIGS. 30 and 31 illustrate clearance bends 514A in a position which provides clearance for an overhead shelf or other feature (not shown) which may be positioned above griddle 116'. The specific geometry and proximal-to-distal location of clearance bends 514A may be modified as required or desired for a particular application.

Figure 12:
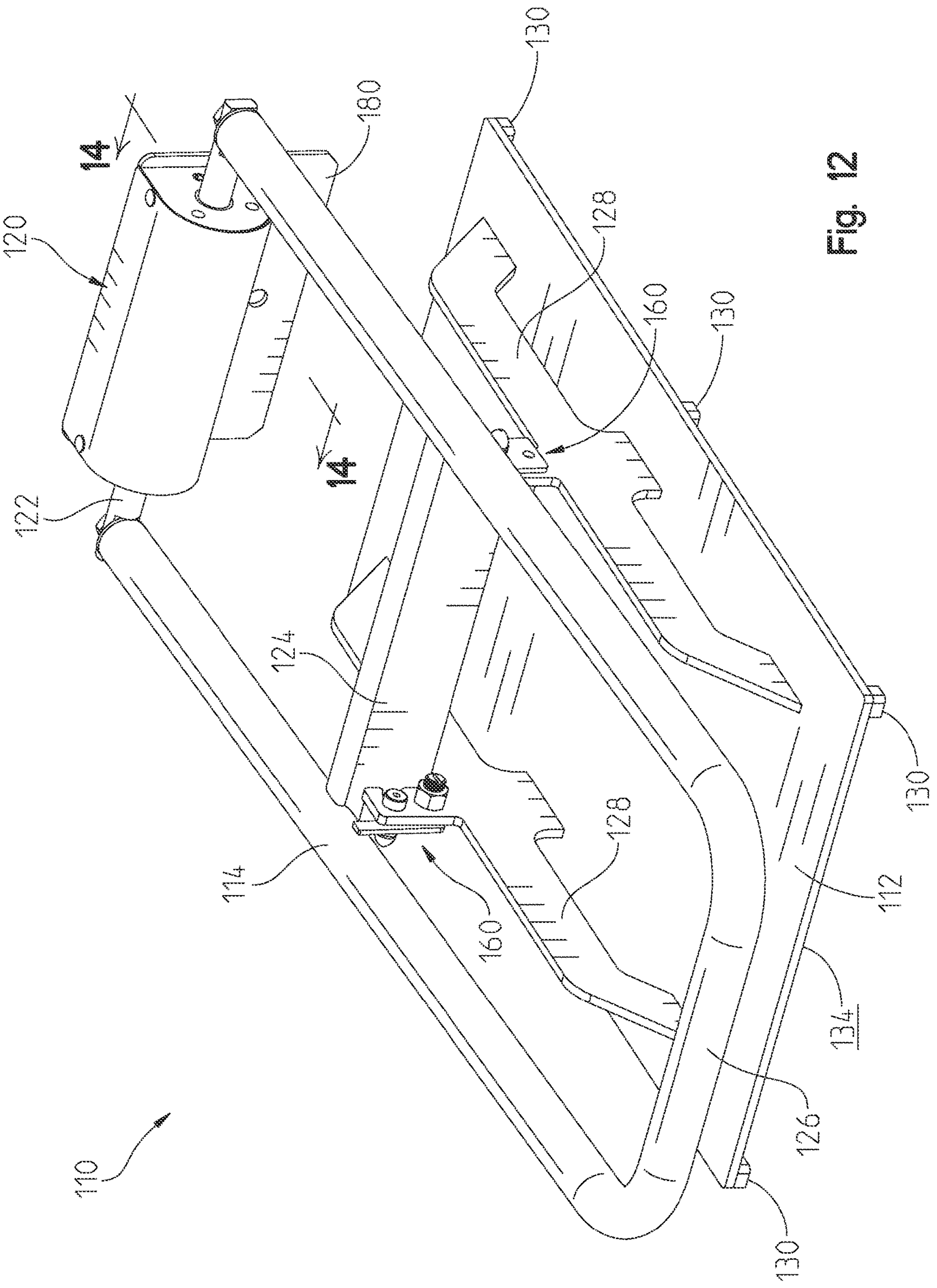
FIG. 12 is a perspective view of a searing attachment of the present disclosure.
Figure 13:
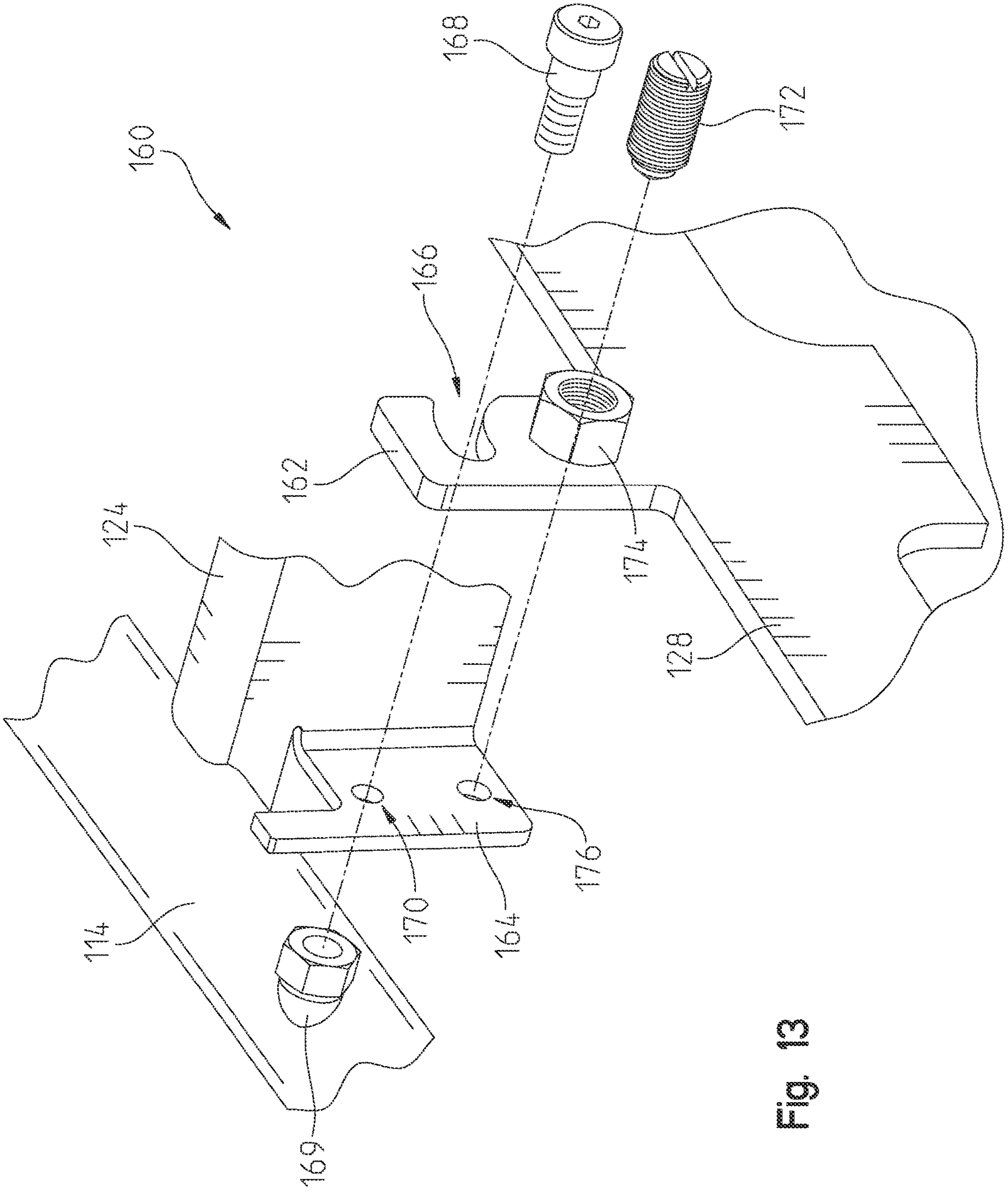
FIG. 13 is an enlarged, perspective view of a portion of the searing attachment of FIG. 12, illustrating a quick-release mechanism of the present disclosure.

As best shown in FIG. 13, cross frame 124 includes a mounting flange 164 extending substantially perpendicularly to the longitudinal extent of cross frame 124. Flange 164 cooperates with a corresponding feature on a selected cooking attachment, such as pivot arm 162 formed on upright frame member 128 of searing attachment 110 (FIG. 12), to form quick-release mechanism 160 in conjunction with one or more bolts or other attachment structures, such as pivot bolt 168 and detent mechanism 172. In the exemplary embodiment of FIG. 13, pivot bolt 168 is received through pivot aperture 170 formed in flange 164 and secured by pivot nut 169. In the illustrated embodiment, pivot bolt 168 is a shoulder bolt having a cylindrical surface between the bolt head and bolt thread, and the pair of pivot bolts 168 at the left and right sides of cross frame are coaxial such that the two shoulders together form a cylindrical mounting surface for attachments 110, 210, 310, 410A and 410B. Because flange 164 is generally perpendicular to the longitudinal extent of cross frame 124, which in turn is substantially parallel to the pivot axis defined by yoke assembly 120, the longitudinal axis of the cylindrical mounting surface formed on pivot bolts 168 defines a pivot axis for attachments 110, 210, 310, 410A and 410B which is substantially parallel to the pivot axis of base frame 102.

In the illustrated embodiment, the head of each pivot bolts 168 forms a shoulder adjacent the cylindrical mounting surface, which restrains lateral movement of a pivot arm (e.g., one of pivot arms 162, 262 or 362) when a respective attachment 110, 210.310, 410A or 410B is mounted to cross frame 124. This restraint of lateral movement ensures that the respective attachment 110, 210, 310, 410A or 410B is free to rotate while also being prevented from any side to side shifting that might otherwise allow attachment 110, 210, 310, 410A or 410B to disengage from the cylindrical mounting surface of pivot bolts 168. Of course, it is also contemplated that a retention shoulder may be formed in other ways or using other structures. For example, flanges 164 may themselves be considered retention shoulders if pivot arms 162 are spaced sufficiently far apart laterally to ensure that lateral movement of attachment 110 cannot traverse the cylindrical surface of bolt 168 on either side. Similar spacing may also be used to retain pivot arms 262, 362 of attachments 210, 310 respectively on the cylindrical surfaces of bolts 168.

In the case of searing attachment 110 shown in FIGS. 12 and 13, pivot arms 162, includes an arcuate pivot slot 166 which is received over the exposed cylindrical mounting surface of pivot bolt 168. Arcuate slot 166 defines a center of rotation about the longitudinal axis of detent mechanism 172, which is threadably received through pivot arm 162 and locked into position by detent retainer 174. In the illustrated embodiment, detent retainer is a hex nut welded to pivot arm 162. A spring loaded detent ball protrudes from detent mechanism 172 and engages detent aperture 176 formed in flange 164 when searing attachment 110 is mounted to base frame 102, as shown in FIG. 12. When so mounted, searing attachment 110 is free to rotate within a limited range of motion about the longitudinal axis of detent mechanism 172 and guided by the abutting interaction between the cylindrical mounting surface of pivot bolt 168 and arcuate slot 166. In this way, the longitudinal axis of pivot bolts 168 defines the attachment pivot axis insofar as it acts as a guide for the pivoting action, working in conjunction with arcuate slot 166 and detent mechanism 172.

Figure 22A:
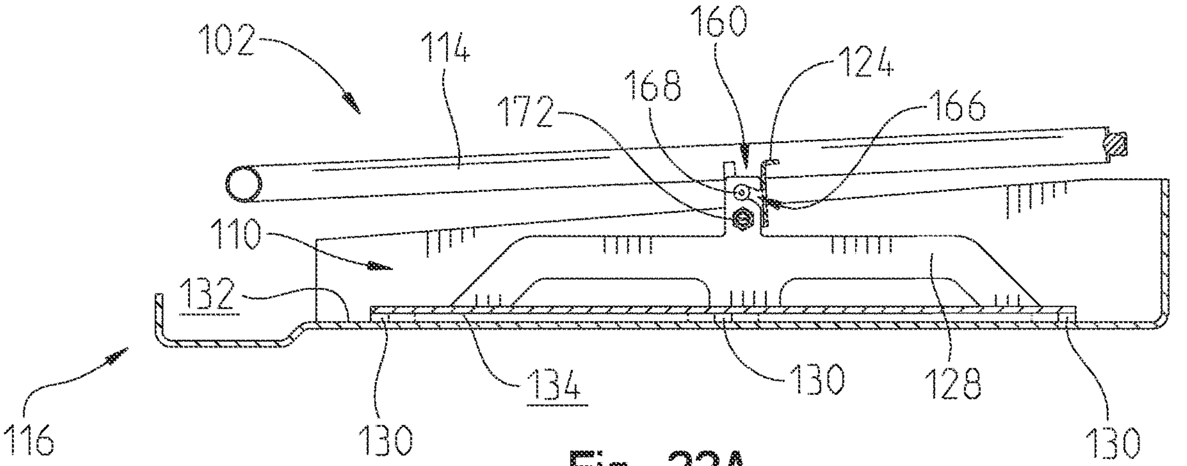
FIGS. 22A-22C are schematic, side elevation views of the scaring attachment of FIG. 12 attached to the griddle of FIG. 10, illustrating various stages between closed and open positions of the searing attachment.
Figure 22B:
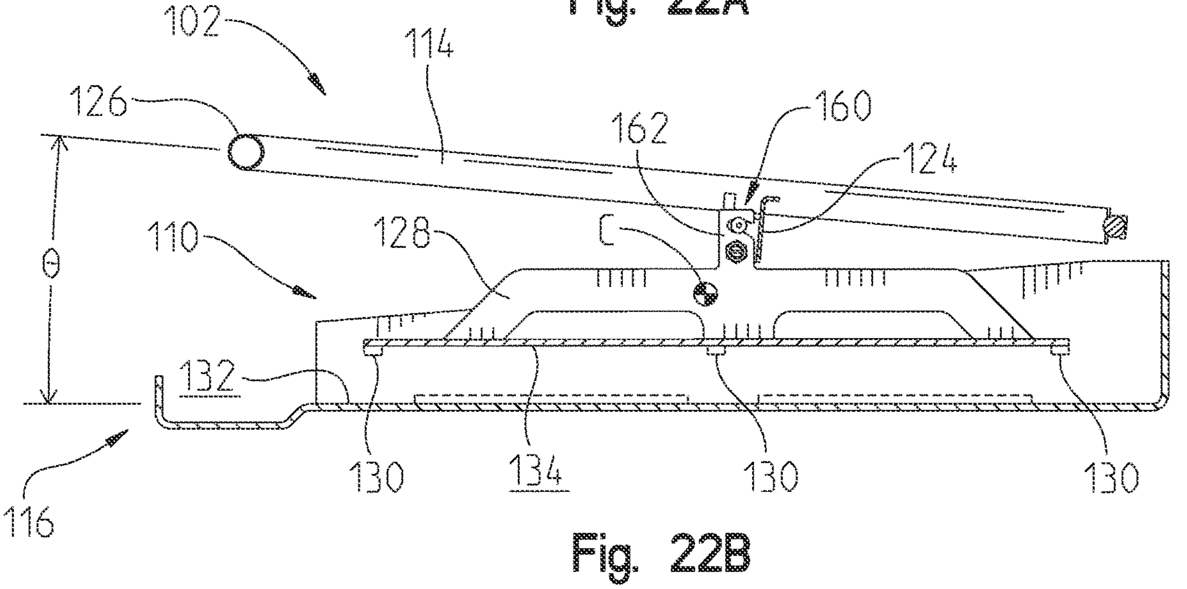
Figure 22C:
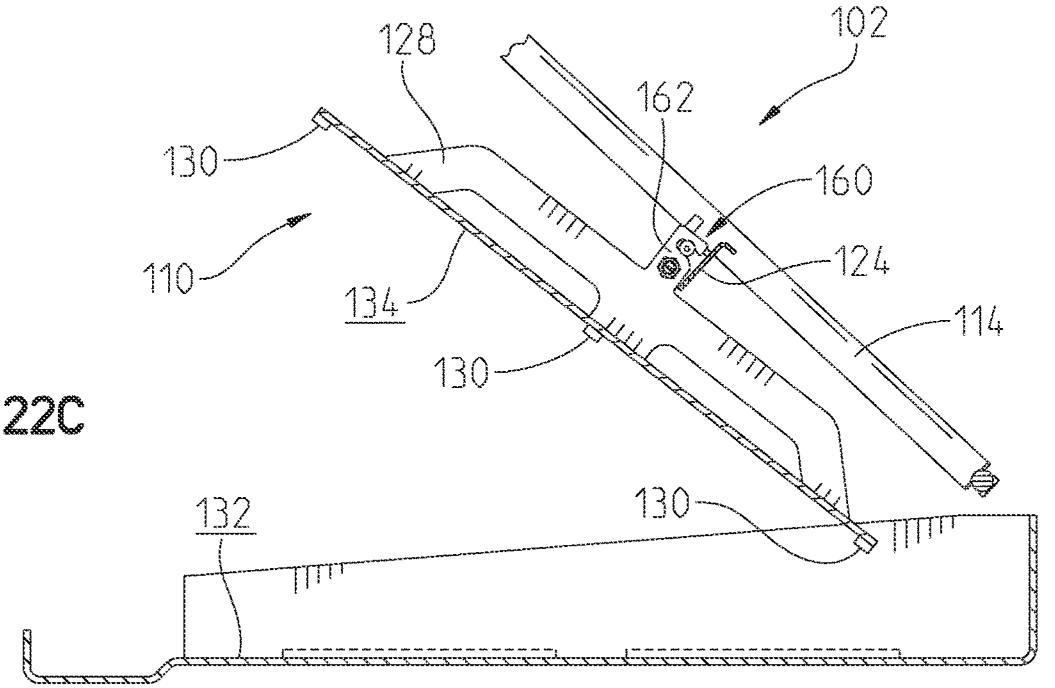

Searing attachment 110 may be installed and removed from base frame 102 by a single operator, by hand and without tools. To do this, searing attachment 110 is first brought into proximity with base frame 102 such that the left and right arcuate slots 166 are aligned with the corresponding left and right pivot bolts 168. The operator then securely seats pivot bolts 168 within their respective slots 166, and then simply releases searing attachment 110. This allows the weight of searing attachment 110 to compress the spring loaded detent ball of mechanism 172 such that it slides over flange 164 and into alignment with a respective aperture 176. When so aligned, the detent ball springs into engagement aperture 176. At this point, searing attachment 110 is in its operable position and free to rotate through its defined range motion pivoting about the longitudinal axis of detent mechanism 172 (including the axis through the springs which bias the detent ball into engagement), as illustrated in FIGS. 22A through 22C and described below. To remove searing attachment 110, the operator can simply apply sufficient force to disengage the detent mechanism 172 from the corresponding apertures 176, and then disengage arcuate slots 166 from pivot bolts 168.

Turning now to FIG. 22A, base frame 102 and griddle attachment 110 are shown in a fully closed position in which an upper cooking surface 134, in this case a searing surface 134, is substantially parallel to the adjacent lower cooking surface 132 of the griddle 116, which is planar or substantially planar as shown. Corresponding surfaces of steam enclosure 212 and maille 334 (FIG. 11) can also be considered "upper cooking surfaces" within the present disclosure. As noted above with respect to searing mechanism 10, feet 130 may be provided to define a desired spacing between cooking surfaces 132 and 134. In this configuration, quick release mechanism 160 is fully engaged and seated, i.e., pivot bolt 168 is fully seated within arcuate slot 166 and detent mechanism 172 is engaged and operational as a pivot point.

FIG. 22B illustrates base frame 102 having been slightly elevated, such as after an operator-applied upward pressure to handle 126. Center of gravity C of searing mechanism 110 is designed to be slightly forward of quick release mechanism 160, that is, center of gravity C is positioned between handle 126 and the attachment pivot axis defined by mechanism 160. Thus, as handle 126 is lifted and angle θ is formed between cooking surface 132 and the longitudinal axis of the proximal-to-distal portions of U-shaped frame 114, searing surface 134 pivots with respect to base frame 102 to remain substantially parallel to cooking surface 132. In some exemplary embodiments, the forward bias of center of gravity of C may be such that the distal portion of searing surface 134 raises first, such that the proximal portion of searing surface 134 is angled downwardly relative to the distal portion, thereby allowing any trapped steam to vent at the rear of searing attachment 110 and away from the operator standing near the proximal portion of searing surface 134 and to prevent moving food items longitudinally across the cooking surface when lifting or lowering the searing attachment (or any other cooking attachment as described herein).

As the initial lifting procedure depicted in FIG. 22B progresses toward a fully or substantially open configuration, quick release mechanism 160 reaches its maximum forward pivot when pivot arm 162 abuts the adjacent lower edge of cross frame 124, as best shown in FIG. 22C. Thus, the amount of traversal of pivot bolt 168 through arcuate slot 166 is limited to ensure that searing attachment 110 remains securely attached to base frame 102 as they are pivoted away from cooking surface 132 toward the fully open position. In an exemplary embodiment, a "fully open" position is one in which the longitudinal axis of the proximal-to-distal portions of frame 114 are perpendicular or nearly perpendicular to cooking surface 132, such as about 80 degrees. For example, the right-most base frame 102 shown in FIG. 10 may be considered fully open.

Figure 23:
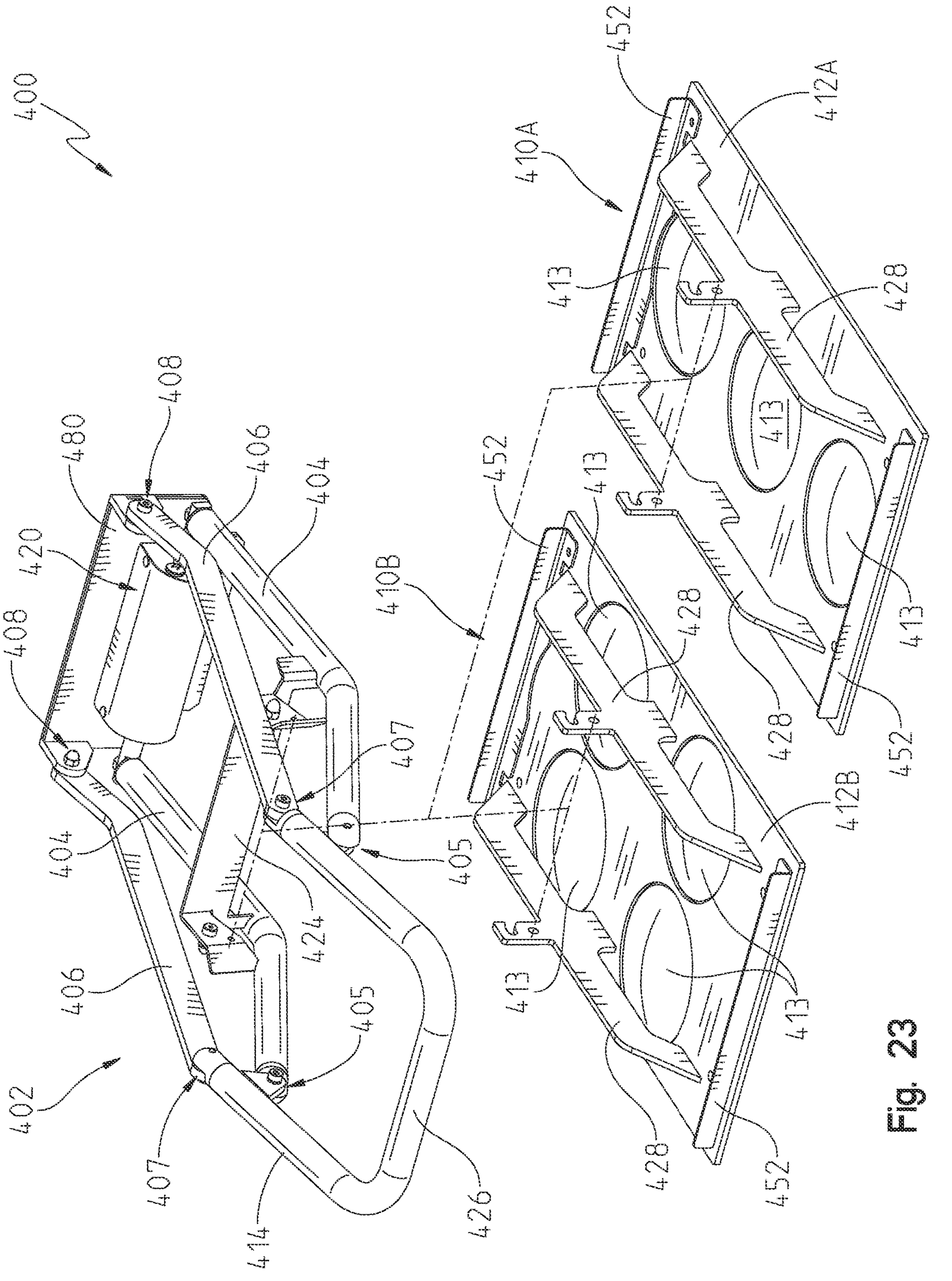
FIG. 23 is a perspective view of an alternative modular cooking mechanism of the present disclosure, showing an articulated base frame and a pair of cooking attachments.
Figure 24:
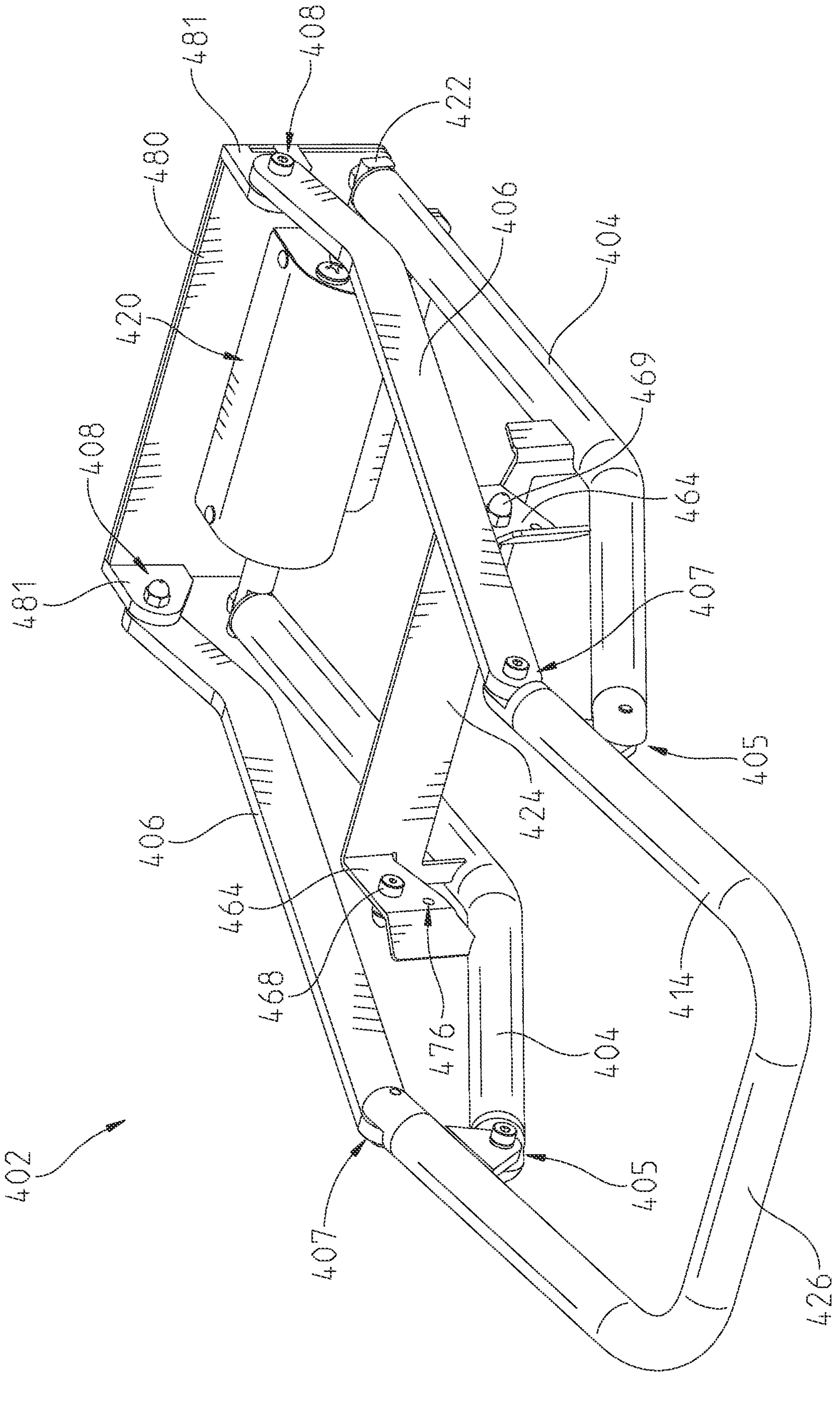
FIG. 24 is a perspective view of the articulated base frame shown in FIG. 23.
Figure 25:
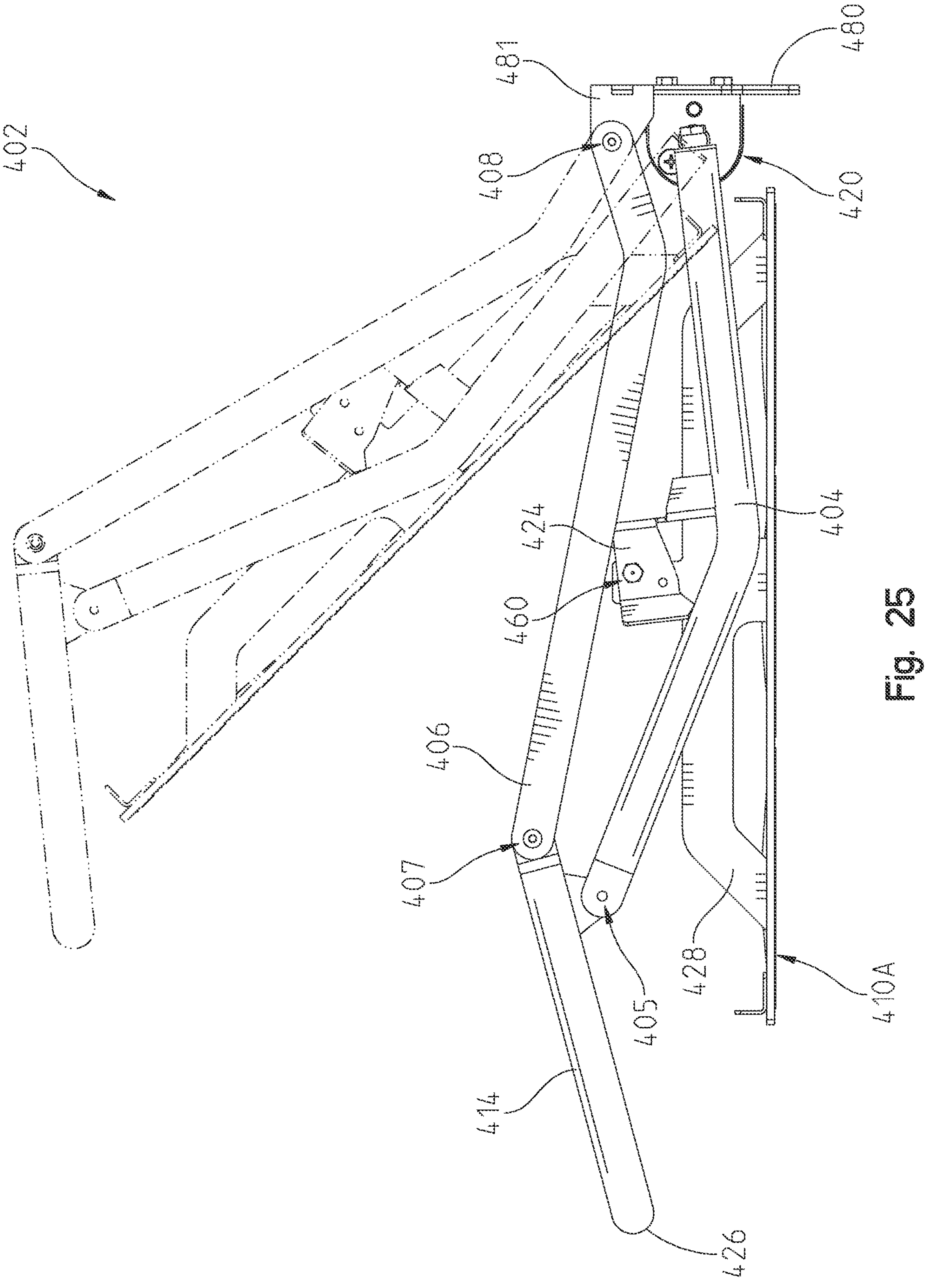
FIG. 25 is a side elevation view of the articulated base frame shown in FIG. 24, showing a lowered configuration in solid lines and a raised configuration in broken lines.

FIGS. 23-25 illustrate an articulated base frame 402 which can be used in place of base frame 102 for any given cooking station on griddle 116. Base frame 402 is substantially similar to base frame 102 described above, with reference numerals of base frame 402 analogous to the reference numerals used for base frame 102, except with 300 added thereto. Elements of base frame 402 correspond to similar elements denoted by corresponding reference numerals of base frame 102, except as otherwise noted.

Moreover, articulated base frame 402 includes base plate 480 capable of attachment to griddle 116 (FIG. 10) in the same manner as base plate 180. As shown in FIGS. 23-25, base frame 402 also includes yoke assembly 420, which provides spring assistance to lifting handle 426 in the same fashion as yoke assembly 120 described in detail above. Further, cross frame 424 includes the same pivot bolts 468, detent aperture 476, and other features which cooperate to facilitate modular attachment of various cooking apparatus (e.g., cooking attachments 110, 210, 310, 410A or 410B) in the same way as cross frame 124 and its related structures and features.

However, articulated base frame 402 includes lower and upper linkages 404 and 406 which cooperate with surrounding structures to create a four-bar linkage functionally interposed between handle 426 and a distal portion of frame 402, e.g., base plate 480. This linkage facilitates the lifting and lowering of base frame 402 and its associated cooking attachment (such as product press attachment 410A, shown in FIG. 25 and further described below) by pivoting handle 426 downwardly as frame 402 moves upwardly.

Referring to FIG. 25, linkages 404 and 406 cooperate with their respective proximal and distal attachment points to substantially maintain the spatial orientation of frame 414 as articulated base frame 402 is moved between the lowered and raised positions. In particular, each lower linkage 404 forms a lower-proximal pivot joint 405 with frame 414, and extends distally to attach to shaft 422 of yoke assembly 420 (FIG. 24), thereby creating a lower-distal pivot joint. Similarly, upper linkage 406 forms an upper-proximal pivot joint 407 with frame 414, and extends distally to an upper-distal pivot joint 408 in cooperation with pivot extension 481 extending from base plate 480 as shown.

The upper-distal pivot joint 408 has about the same fore/aft position as the lower-distal pivot joint formed at the pivot axis of yoke assembly 420. In one exemplary embodiment, the fore/aft separation (i.e., the separation measured along a distance parallel to cooking surface 132) is less than 0.25 inches, though of course other separation distances may be used as required or desired for a particular application. On the other hand, the upper-proximal pivot joint 407 is positioned substantially aft (i.e., distal) of lower-proximal pivot joint 405 as viewed in the lowered configuration of articulated base frame 402. This arrangement causes frame 414 to pivot relative to linkages 404 and 406 as articulated base frame 402 is lifted and lowered. In particular, handle 426 of frame 414 moves downwardly as articulated base frame 402 is lifted from the closed or cooking position (shown in solid lines in FIG. 25) toward the open or raised position (shown in broken lines in FIG. 25). This downward pivot of handle 426 reduces the overall amount of movement required by the operator in order to reposition base frame 402 between the open and closed positions, thereby maintaining an ergonomically preferred reach for repeated operation of base frame 402. e.g., in a high throughput restaurant setting.

In an exemplary embodiment, the upper proximal pivot joint 407 is positioned sufficiently aft of the lower proximal pivot point 405, relative to their vertical separation, in order to substantially maintain the angular orientation of frame 414 relative to cooking surface 132 of griddle 116 (FIG. 10) throughout the lifting and lowering operations. In the illustrated embodiment, this fore/aft separation is about 1.4 inches relative to a vertical separation of about 1.63 inches.

As noted above, various cooking attachments may be employed and interchanged with base frames 102 and/or 402. In one embodiment, searing attachment 110 may include securement feature 46, TEFLON sheet 48, connectors 50 and upright 52 in order to provide a non-stick searing surface 134 in the same manner as described in detail above with respect to searing mechanism 10. Moreover, as noted herein, the features and components of searing mechanism 10 and searing attachment 110 are interchangeable and may be combined as required or desired for a particular application.

Figure 21:
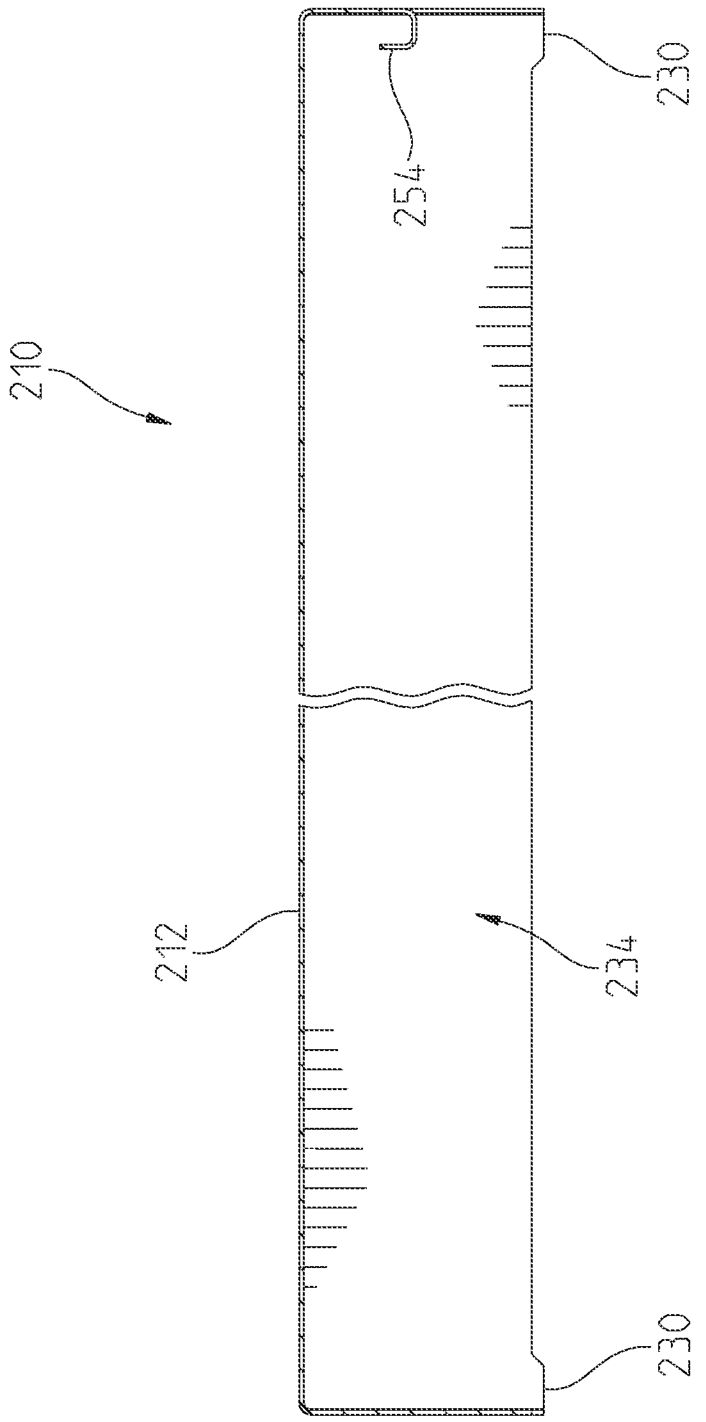
FIG. 21 is a cross-section, elevation view of the steaming attachment of FIG. 20.

As noted above, searing attachment 110 is part of modular cooking mechanism 100, shown in FIG. 11, which may include additional cooking attachments each designed for a particular type of cooking task. In the illustrated embodiment of FIG. 11, such additional attachments may include steaming attachment 210 and toasting attachment 310. Steaming attachment 210 includes steam enclosure 212, formed as a long and wide five-sided box with an open bottom. Steaming attachment includes a pair of flanges 229 fixed (e.g., welded) to the top surface of steam enclosure 212. Steam enclosure 212 may include a number of steam vents 235 formed in the top surface thereof, such as six vents 235 as illustrated, to allow for controlled release of steam during a cooking operation. The four lower corners of enclosure 212 form feet 230, as shown best in FIG. 20, which respectively rest upon cooking surface 132 when base frame 102 (or base frame 402) and steaming attachment 210 are in the closed position. When in such closed position, steam cavity 234 (FIG. 20) defined by steam enclosure 212 traps steam created by moisture released from food items and/or added to cooking surface 132. This steam cooks the food items contained within cavity 234. To the extent that condensing steam forms droplets on the generally horizontal upper surface of steam enclosure 212 within cavity 234 during a cooking operation, such moisture tends to run distally when steaming assembly 210 is opened. This distally-running moisture is channeled in a drip catch 254, as best shown in FIG. 21 as a U-shaped fluid channel. The moisture in drip catch 254 is laterally diverted to the left and/or right side of cavity 234, thereby avoiding excess moisture in the vicinity of yoke assembly 120.

Steaming attachment 210 has a forward-biased center of gravity C, similar to searing attachment 110 shown in FIG. 22B. In an exemplary embodiment, a distal portion of steam enclosure 212 is the first portion to rise when base frame 102 (or base frame 402) is lifted. In this way, escaping steam from within steam cavity 234 is vented at the distal end of steaming attachment 210, away from the operator positioned at the proximal end near handle 126. The forward-biased center of gravity also minimizes the application of shear forces on food items as base frame 102 is initially lifted or finally closed, preventing the movement of such food items longitudinally across the cooking surface when lift or lowering a cooking attachment.

Flanges 229 of steaming attachment 210 each include uprights 228, an upper portion of which form pivot arms 262, which are analogous in general structure and function to pivot arms 162 of uprights 128 described above with respect to searing attachment 110. However, rather than providing arcuate slots 166 centered upon the longitudinal axis of detent mechanism 172 to define the attachment pivot axis (as shown in FIG. 13 and described above), interaction between pivot arms 262 and the cylindrical mounting surface of pivot bolt 168 directly defines the attachment pivot axis. In particular, each pivot arm 262 defines a hook-shaped pivot slot 266 (FIG. 11) which can receive the cylindrical mounting surface of pivot bolt 168 along a lateral direction, then "hook on" to the cylindrical mounting surface under the weight of steaming attachment 210. Steaming attachment 210 can then pivot directly about the axis of pivot bolt 168.

Yet another cooking attachment which may be used in conjunction with base frames 102, 402 is toasting attachment 310, shown in FIG. 11. Toasting attachment 310 may include a pair of side frame members 312 with uprights 328 attached thereto e.g., by welding. Flanges 329 may be respectively welded to uprights 328, with pivot arms 362 extending upwardly from flanges 329 in the same manner as described above with respect to pivot arms 262 of steaming attachment 210. At the proximal and distal ends of frame members 312, maille support frame members 313 may be fixed (e.g., by welding) to respective frame members 312. Maille support frame members 313 have a sheet of maille 334 attached thereto, which forms a pliable and weighted biasing force to gently press food items, such as buns, against cooking surface 132 when base frame 102 (or base frame 402) and toasting attachment 310 are in a closed position. Similar to attachments 110 and 210 described above, toasting attachment 310 may have a forwardly biased center of gravity such that maille 334 remains level or slightly tilted forwardly as handle 126 is raised from the closed position over the open position, thereby protecting the rear food items from becoming flattened or crushed. The forward-biased center of gravity also prevents moving food products longitudinally across cooking surface 134 when lifting or lowering the toasting attachment.

Further details of maille 334 and its application in the context of griddle 116 may be found in U.S. Patent Application Publication No. 2016/0029845, filed Apr. 23, 2015 and entitled COVER FOR FOOD ITEMS PLACED ON A COOKING SURFACE, the entire disclosure of which is hereby expressly incorporated herein by reference.

Still other cooking attachments compatible with base frames 102, 402 include product press attachments 410A and 410B, shown in FIG. 23. Attachments 410A, 410B are substantially similar to searing attachment 110 described in detail above, with reference numerals of attachments 410A, 410B substantially similar to searing attachment 110 described above, with reference numerals of attachments 410A. 410B analogous to the reference numerals used in attachment 110, except with 300 and an "A" or "B" identifier added thereto. Elements of attachments 410A. 410B correspond to similar elements denoted by corresponding reference numerals of attachment 110, expect as otherwise noted.

For example, attachments 410A. 410B both include uprights 428 having pivot arms 462 which function the same as uprights 128 and pivot arms 162. Therefore, attachments 410A. 410B may be employed with base frames 102 or 402 to form quick-release mechanism 460 (FIG. 28) which functions identically to quick-release mechanism 160 described in detail above. In addition, attachments 410A and 410B both include uprights 52 which can be used in conjunction with connectors 50 (FIG. 7) to form securement feature 46 as described herein.

Figure 28:
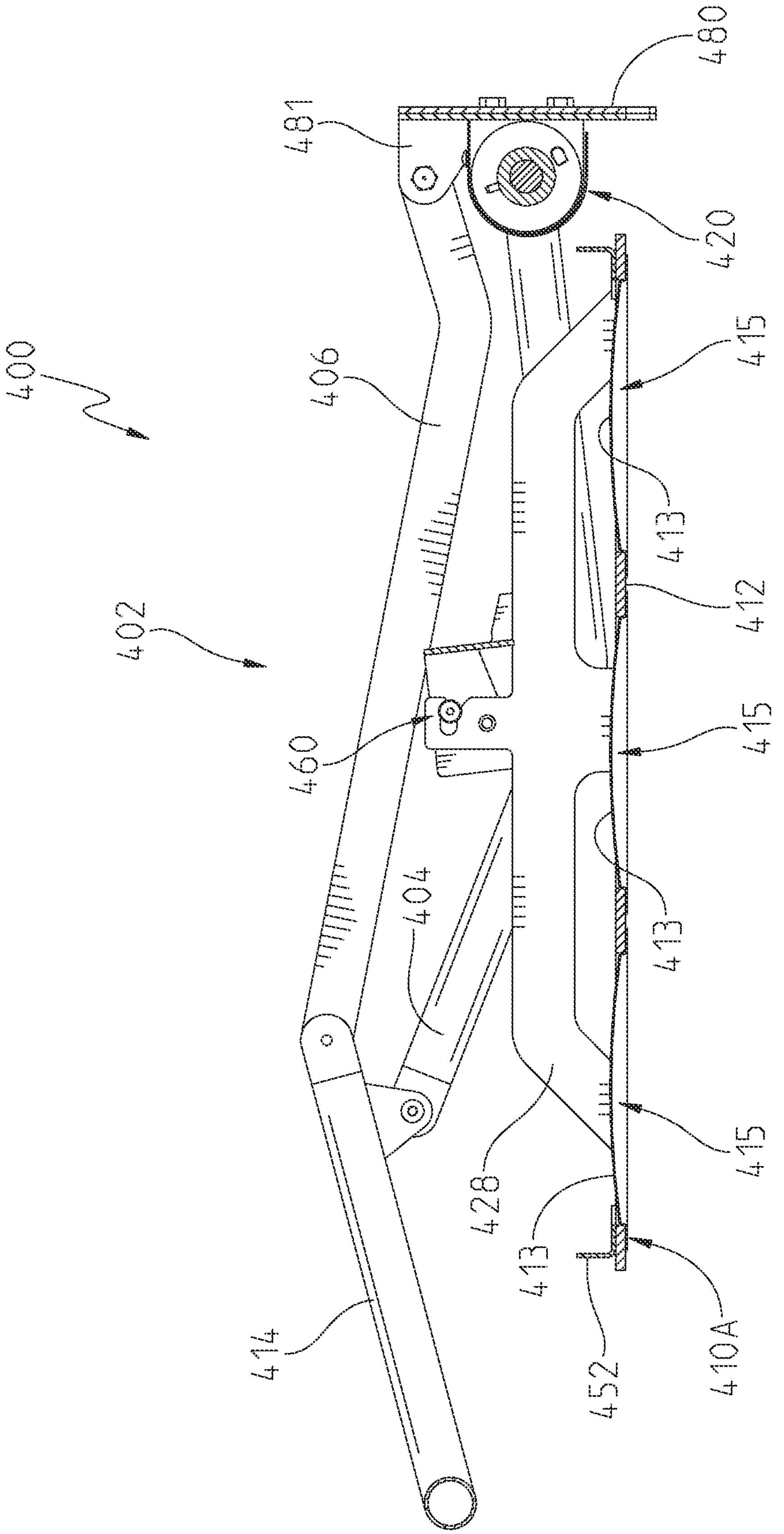
FIG. 28 is a side elevation, section view of the articulated base frame shown in FIG. 24, having the cooking attachment shown in FIG. 26 attached thereto.
Figure 29:
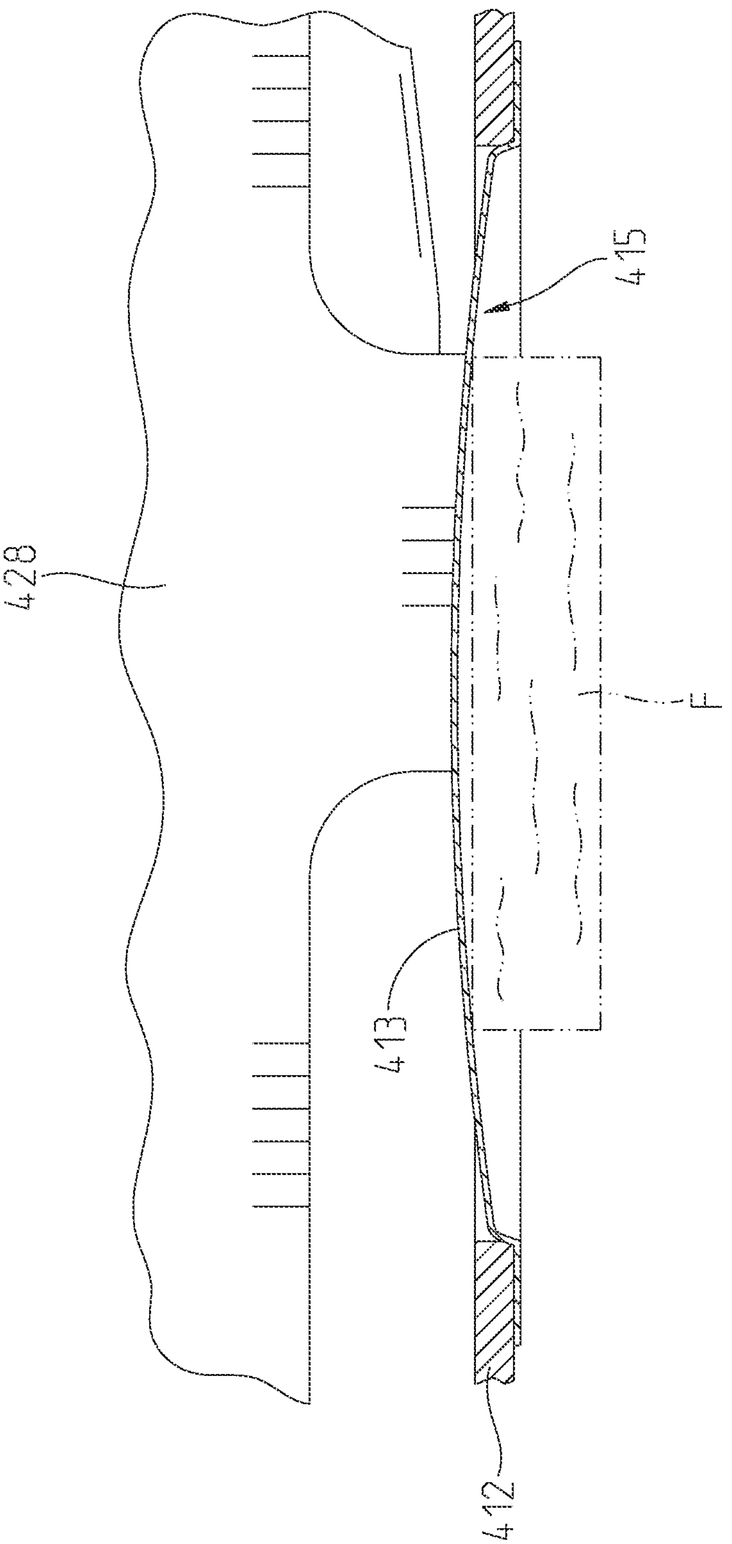
FIG. 29 is an enlarged, section view of a portion of FIG. 28, illustrating a concave press cavity formed by the domed press plate.

However, press plate 412A (FIG. 26) of cooking attachment 410A includes three circular cutouts arranged side-by-side, each of which receives a domed press plate 413 having a convex upper surface and a concave lower surface forming a downward-facing domed cavity 415, as best shown if FIGS. 28 and 29. In the illustrated embodiment, the three press plates 413 are arranged in a linear pattern along a proximal-to-distal direction such that the operator may cook three food items F (FIG. 29) simultaneously along a front-to-back line on cooking surface 132 of griddle 116 (FIG. 10).

Figure 27:
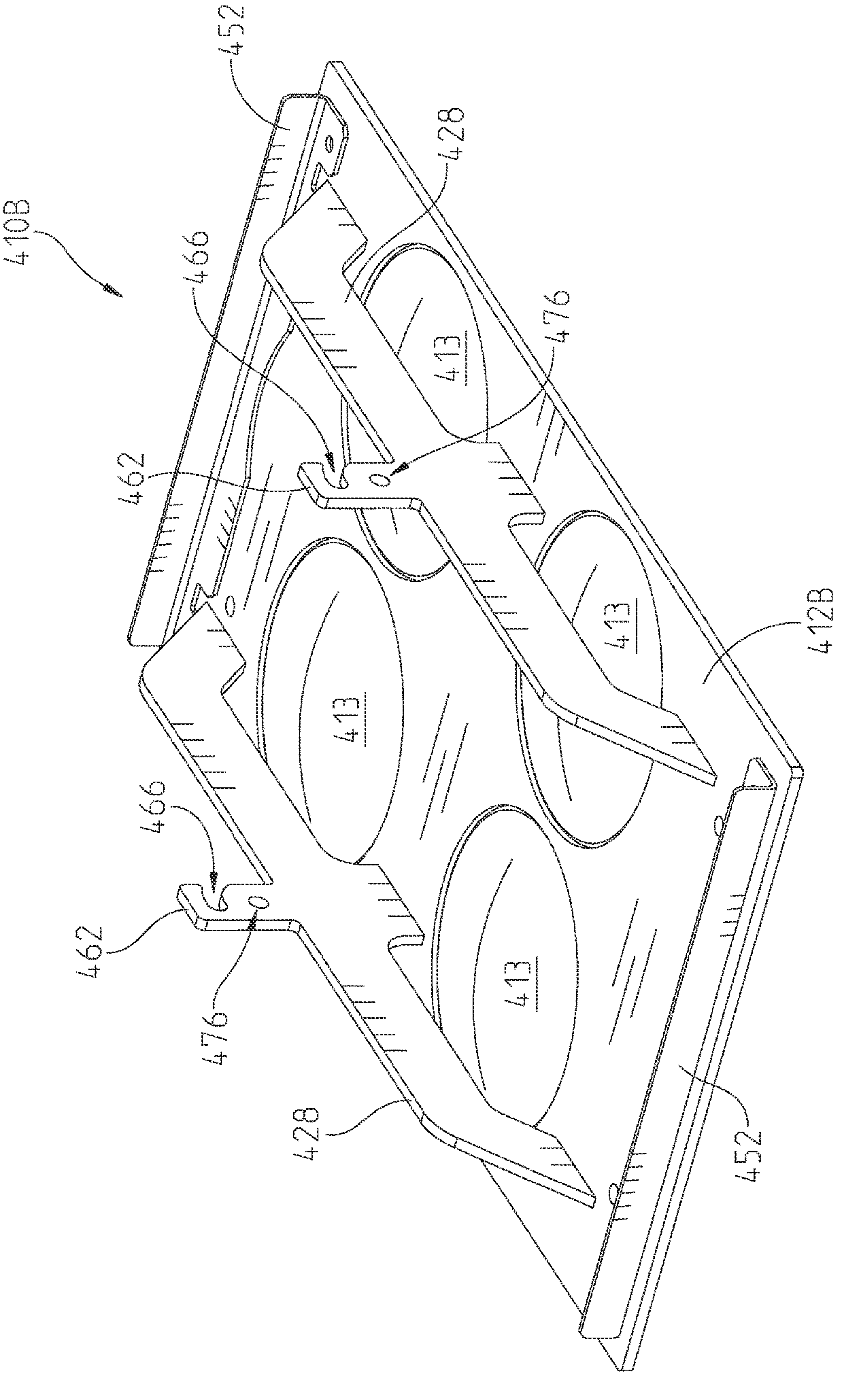
FIG. 27 is a perspective view of a cooking attachment of the present disclosure, having four domed press plates.

Press plate 412B (FIG. 27) of cooking attachment 410A includes four circular cutouts arranged side-by-side which, like press plate 412A, each receives domed press plate 413. However, the four circular cutouts of press plate 412B are arranged in a square pattern with two laterally spaced proximal-to-distally spaced pairs as shown in FIG. 27. Thus, the operator may cook four food items F (FIG. 29) simultaneously in a square-shaped arrangement (i.e., a 2×2 matrix of food items F) on cooking surface 132 of griddle 116 (FIG. 10).

Each of domed press plates 413 defines a relatively large radius at the concave inner surface, such as a radius between 5 inches and 100 inches for a disc-shaped product (such as a traditional hamburger). The specific radius may be adjusted to suit the pre-pressing shape of food product F (FIG. 29) and the desired final shape and configuration thereof. This gently curved, concave inner surface is configured to engage a puck-shaped patty of meat or similar food product F (FIG. 29), such as commercially produced hamburger patties made from extruded beef and the like. When so engaged, the concave inner surface of press plate 413 engages the meat in a manner functionally similar to the action of a hand and spatula manually pressing down and "rolling" the food item upon the cooking surface 132.

In particular, as shown in FIG. 29, the concave curved inner surface of domed press plate 413 is sized and configured to contact the upper outer edge of a generally cylindrical puck-shaped food item F received within cavity 415 upon initial contact. This edge based contact will tend to "roll" the upper outer edge of food item F outwardly and downwardly in the same fashion that is typically achieved by hand/spatula pressing. In the case of, e.g., beef or other extruded meat products, this "rolling" changes the grain structure in the food product F in a manner similar to a manual press operation, as compared to the distinct and different grain structure modification resulting from mechanically pressing down with a flat surface of the type used in searing attachment 110 or certain predicate food press devices. In this way, press plate 413 effectively mimics the rocking action typically employed by a manual flattening operation in which the user holds the spatula with one hand and uses the other to rock the spatula in order to flatten the food item on the cooking surface 132.

In the illustrated embodiment, the concave shape of cavity 415 is generally symmetrical about a central pivot point to create a "crowned" or domed shape as best seen in FIG. 29. This crowned shape is well suited to meat products such as hamburgers. However, it is contemplated that the principles of the present disclosure pertaining to domed press plate 413 may also be applied to other domed shapes, such that unique designs could be imparted to the meat or other food product F after the flattening operation is complete. For example, domed press plates in accordance with the present disclosure may also produce square- or triangle-shaped food products, or any other geodesic shape that may be required or desired for a particular application. Non-geodesic shapes, such as animal profiles or other non-symmetrical shapes, may also be chosen for some applications. Any such shape may take a domed configuration such that an internal cooking volume is defined by the periphery of the shape, as described herein. The shape of the domed configuration is imparted to the food product by placing the food product on the planar cooking surface 132. As shown in the drawings, cooking surface 132 defines an uninterrupted plane both under and around the domed press plate, such as press plate 413 described above and press plate 613 described below. This plane therefore extends beyond the periphery of the dome, such that the interior space above the planar cooking surface 132 and within the cavity of the press plate is substantially or entirely enclosed.

Figure 29A:
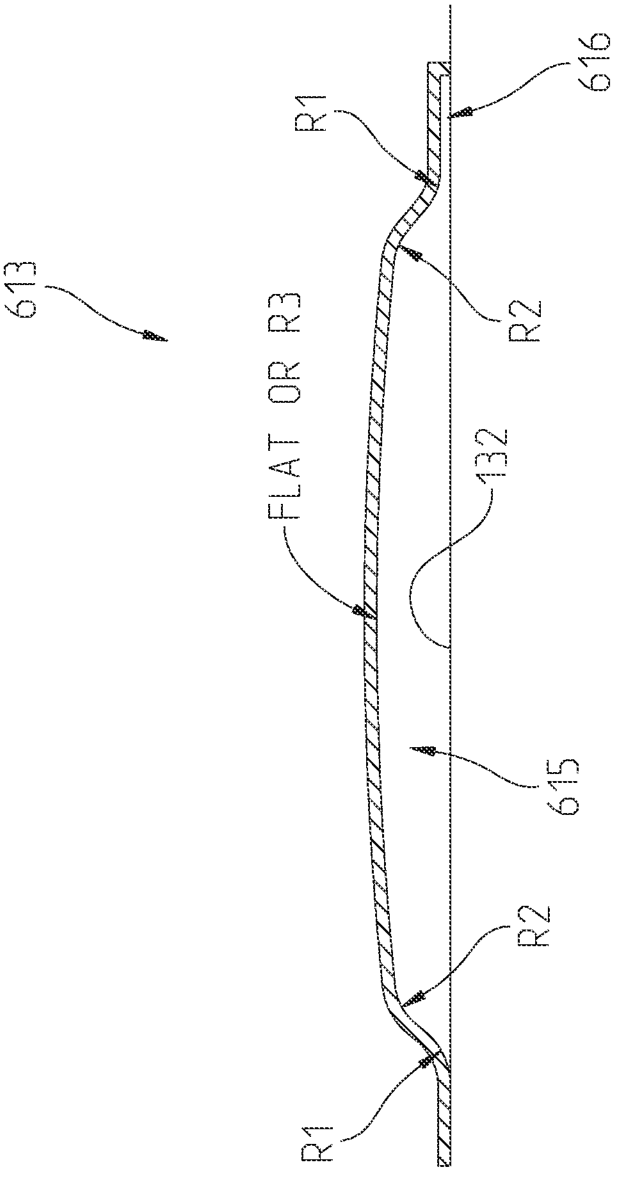
FIG. 29A is a section view of an alternative domed press plate.

In one particular embodiment shown in FIG. 29A, an alternative domed press 613 may be provided with a multi-radius domed cavity 615 which is a more complex shape compared to cavity 415, which is primarily defined by a single radius as shown and described with respect to FIG. 29. Press plate 612 (shown, e.g., in FIGS. 37 and 38) includes three domed presses 613, though other configurations are contemplated and domed presses 613 may be used with any other structures described herein. Moreover, press plate 612 and its associated structures may have all the same features and functions as press plate 412 (inclusive of plates 412A and 412B) described herein, and press plates 412 and 612 are interchangeable in any combination and permutation with the other structures of the various cooking apparatuses described herein. Moreover, reference numbers for structures of press plate 612 are identical or analogous to corresponding structures of press plate 412, except with "200" added thereto.

However, cavity 615 of press plate 613 is defined by multiple radii R1, R2 and R3 as shown in FIG. 29A. A large central radius R3, which may also be flat, is flanked by a concave transition area defined by radius R2. This concave area is, in turn, flanked at its exterior by a convex outer area defined by radius R1. As shown in FIG. 29A, radii R1 and R2 are much smaller than radius R3, such as between one and four orders of magnitude smaller, and may have a nominal value between 0.005 inches and 0.050 inches, for example. By contrast, the central radius R3 may be between 5.0 inches and 10.0 inches, for example. In one exemplary embodiment, the volume defined by cavity 615 (i.e., between the undersurface of press plate 613 and cooking surface 132) may be an exact match to the food product to be cooked within cavity 615, such as a meat puck for a hamburger. This volume match can be used in conjunction with radii R2 and R3 to produce a repeatable shape and texture for the edge of the food product. Alternatively, the volume of cavity 615 may be set larger than the volume of the food product to be cooked, such that the edges of the cooked product are "loose" and allowed to cook with less control over shape.

In a typical embodiment used for burger patties, food product F is a ground meat puck having a volume of between about 5-15 cubic inches, with the volume of cavity 415 or 615 being about equal to (or in some cases, slightly less than) this range. The overall diameter of the food product F after cooking, which is defined by and commensurate with the interior diameter of cavity 415 or 615, may be between about 3-6 inches. Therefore, the thickness of food product F after cooking may be between about 0.20 inches and 2.0 inches, such that the ratio of the diameter of the cooked food product F (and therefore, of cavity 415 or 615) to the thickness of food product F (and therefore, of the overall height of cavity 415 or 615 above the adjacent cooking surface, 132 or 132') can range from about 1.5 to 30, for example, with a more typical range of such ratios between 10 and 20 for, e.g., hamburger patties.

Referring still to FIG. 29A, cavity 615 may include extension 616, which is a step-shaped void extending radially outside of the areas defined by radii R1. R2 and R3. Extension 616 can be used for steam venting, if it is open to the atmosphere around press plate 613, or it may be an enclosed space (as shown) to retain steam for cooking of the food product in cavity 615. Enclosing extension 616 (and by extension, cavity 615) to retain steam allow food to be cooked faster, but in some cases, texture or other considerations may dictate the release of steam. For example, some meats should not be steamed to avoid chewiness and/or toughness, and to provide crispy edges favored by some consumers. In these cases, venting of the steam may be achieved by opening extension 616 or providing feet or other spacers between the bottom of press plate 613 and the adjacent cooking surface 132.

The final thickness of the food product F after the flattening process may be controlled by the depth of cavity 415 and/or by feet, such as feet 30 shown in FIG. 7, attached to the lower surface of press plate 412. Such feet may optionally be adjustable to adjust the thickness of food product F after pressing by attachments 410A or 410B. This final thickness, while potentially uniform around the edge of food product F, will be nonuniform across its lateral extent due to the concavity of domed cavity 415.

In an exemplary embodiment, domed press plate 413 may be formed from a substantially rigid material, such as stainless steel having a thickness of about 0.03 inches.

In addition to attachments 110, 210, 310, 410A and 410B, other attachments may be employed in conjunction with base frames 102 or 402 as a part of modular cooking mechanism 100. For example, "active" type attachments engageable with base frames 102, 402 may include heated upper platens, radiant platens, steam injected platens, and the like. Such attachments may be raised and lowered via base frames 102, 402 in the same manner as described above with respect to the illustrated attachments 110, 210, 310, 410A and 410B. Other "passive" type attachments may include press attachments adapted for use with bacon and or quesadillas, chicken presses, and attachments for slicing and/or dicing food items contained upon cooking surface 132.

In one exemplary embodiment shown in FIGS. 30 and 31, an "active" type attachment is shown in the form of heated product press attachment 510. As best shown in FIG. 31, attachment 510 includes temperature controller 511 mounted thereto which receives electrical power from an external source and meters the delivery of such electrical power to a heating element (such as heating element 654 shown in FIGS. 37 and 38 and described in further detail below, or another suitable heating element). In the illustrative embodiment of FIGS. 30 and 31, temperature controller 511 may be manually switched on or off and may include manual controls for setting a temperature set point for the upper cooking surface of product press attachment 510. In one embodiment, product press attachment 510 may include internal construction similar to heated product press attachment 610, shown in FIGS. 36-38 and described further below.

Figure 36:
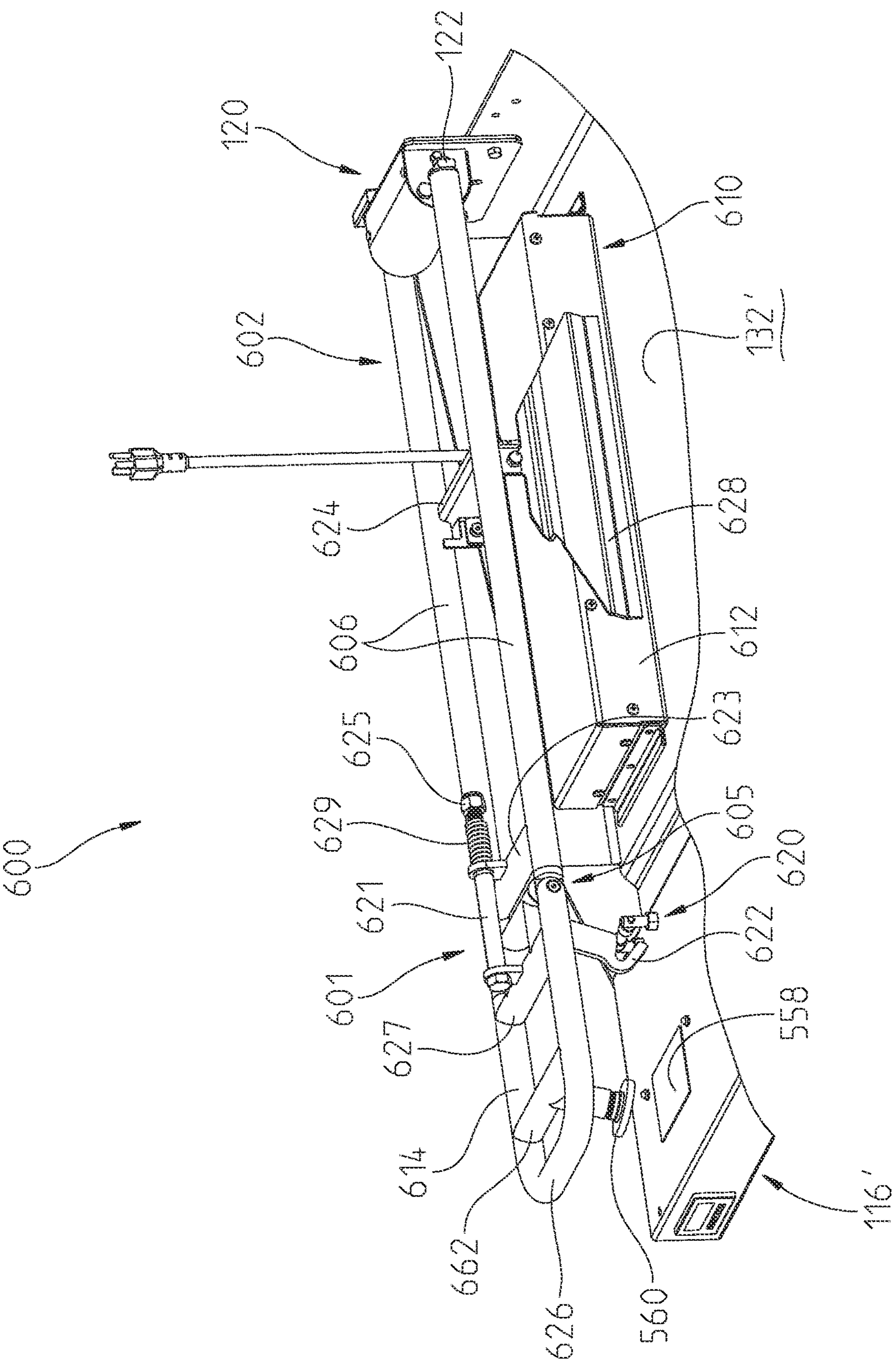
FIG. 36 is a perspective view of a latching cooking mechanism of the present disclosure, having a heated product press attachment connected thereto.
Figure 37:
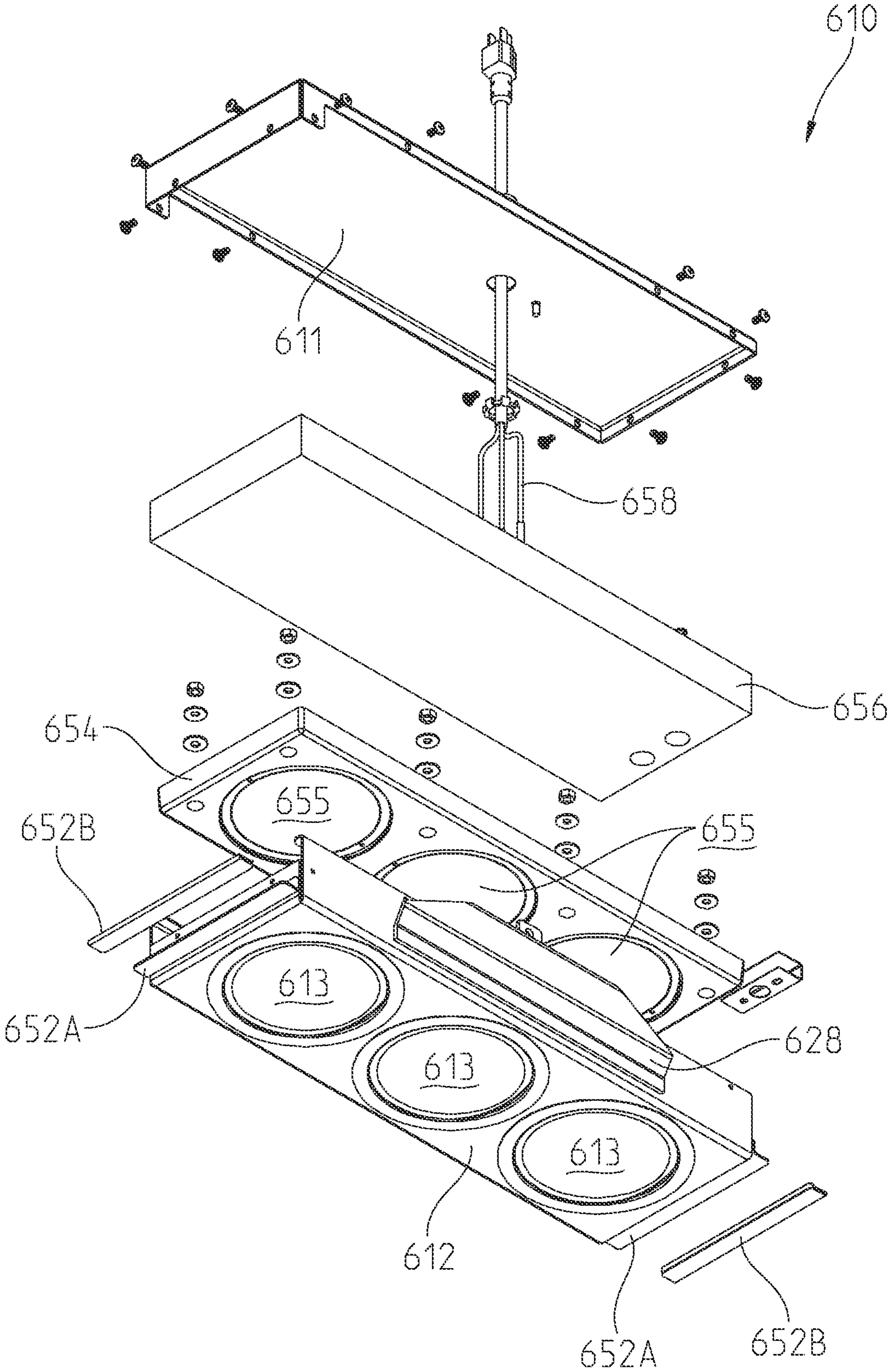
FIG. 37 is a bottom perspective, exploded view of the heated product press attachment shown in FIG. 36.
Figure 38:
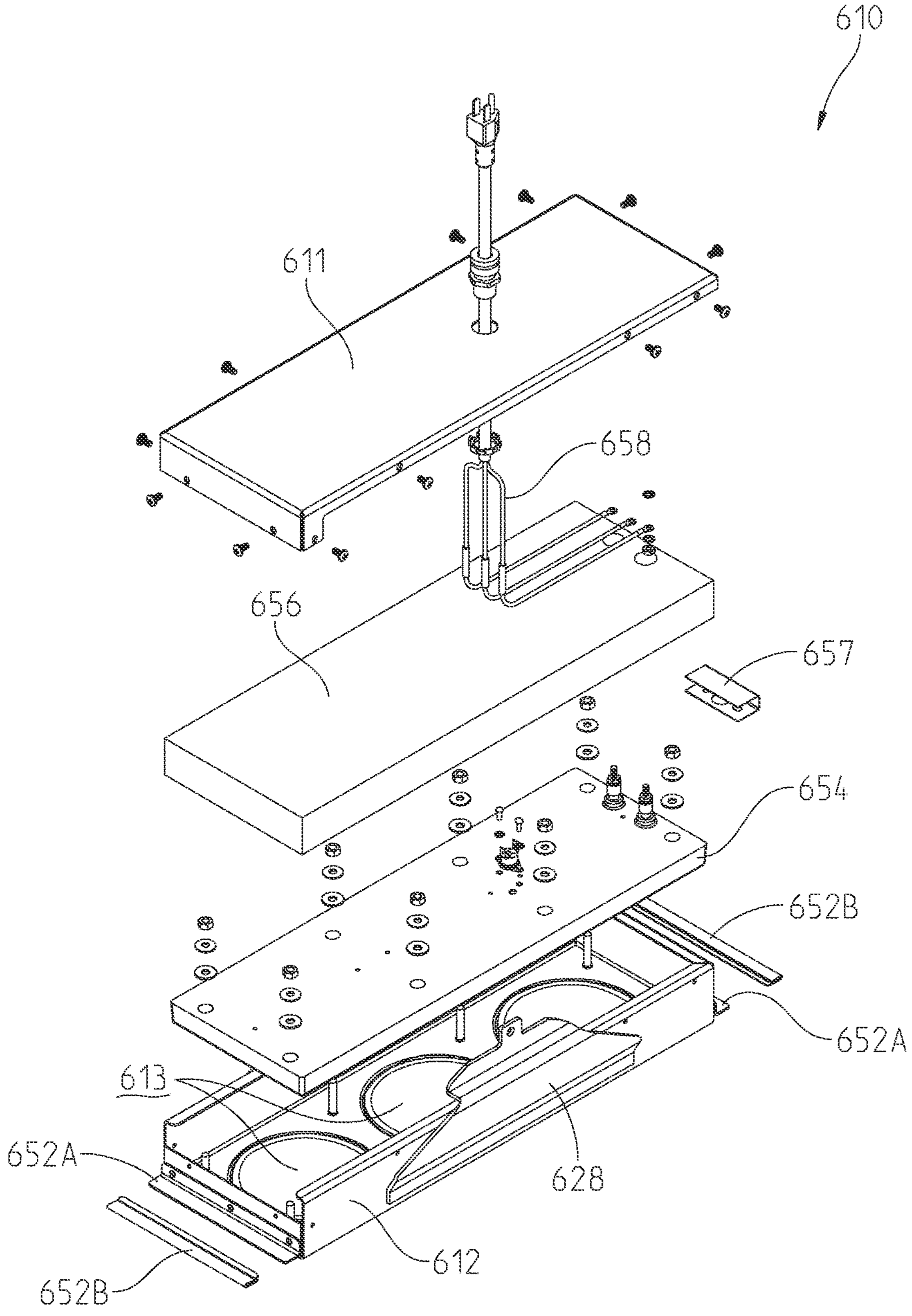
FIG. 38 is a top perspective, exploded view of the heated product press attachment shown in FIG. 36.

Another heated product press attachment 610 is shown in FIGS. 36-38. As best seen in FIGS. 37 and 38, attachment 610 includes a lower press plate 612 having uprights 628 welded or otherwise affixed to the sidewalls thereof. In the illustrated embodiment, press plate 612 includes domed presses 613 attached or otherwise integrated to its lower surface. Domed presses 613 are discussed in detail above. Alternatively, heated product press attachment 610 may have any other cooking surface as described herein, or any other suitable cooking surface as required or desired for a particular application.

Press plate 612 contains cast heat plate 654, which in the illustrated embodiment is a resistive heating element operable to convert electrical current into thermal heat in a traditional manner. In addition, heat plate 654 includes cast-in heat plate domes 655, shown in FIG. 37, which are sized and configured to snugly receive domed presses 613. In this way, cast heat plate 654 provides continuous surface contact between the heating element of heat plate 654 and the upper surface of domed presses 613, such that heat plate 654 provides an even and consistent heat transfer to domed cavities 615 (FIG. 29A).

Heated product press attachment 610 further includes insulation 656 disposed over the top surface of cast heat plate 654, such that heat generated within heat plate 654 is generally directed downwardly toward the cooking surfaces of domed press 613 and press plate 612, while mitigating heat transfer to press plate cover 611 which forms the top surface of attachment 610. Electrical wires 658 run between insulation 656 and cover 611 to the electrical attachment nodes of heat plate 654, which in turn pass through apertures formed in insulation 656 as shown. This arrangement protects electrical wires 658 from the high heat which may be generated by heat plate 654. Bracket 657 may also be provided to strengthen and protect the junction between electrical wires 658 and the electrical terminals formed on cast heat plate 654. In one exemplary embodiment, heat plate 654 may be capable of heating the lower cooking surface(s) of press attachment 610 to any temperature between ambient temperature (e.g., about 70° F.) to 450° F.

Figure 8:
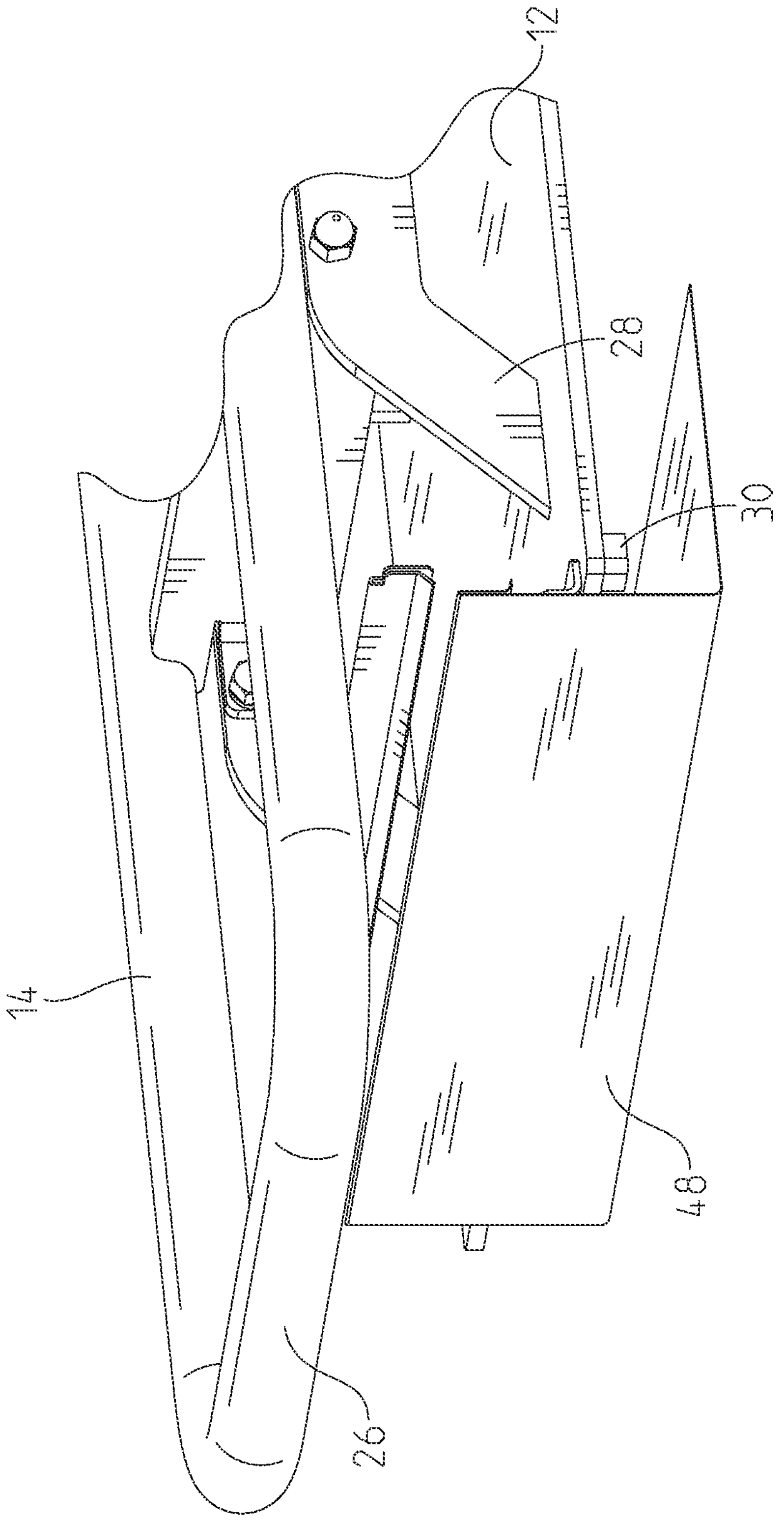
FIG. 8 is a partial perspective view of the searing mechanism of FIG. 2.
Figure 8A:
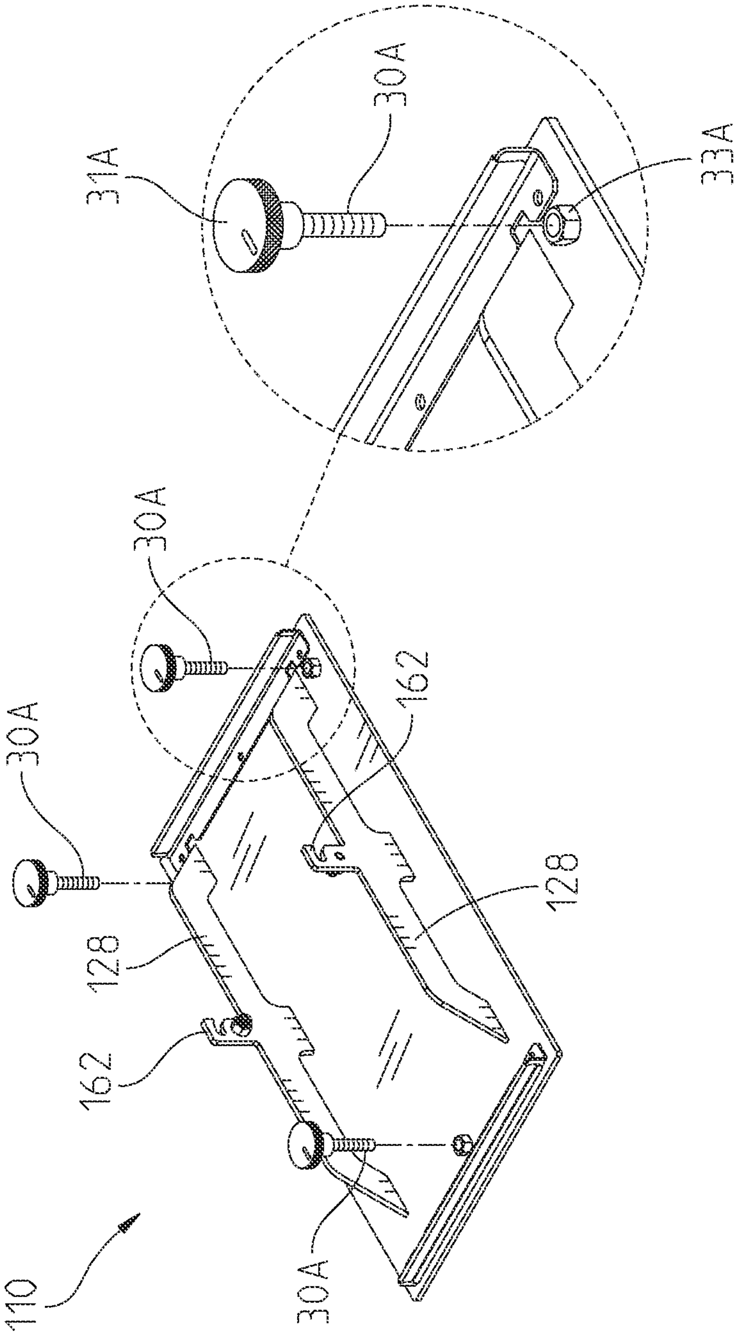
FIG. 8A is a perspective view of the searing attachment shown in FIG. 12, illustrating leveling and spacing feet attached thereto.

In the illustrated embodiment of FIGS. 37 and 38, heated product press attachment 610 further includes connectors 652A which may be used in conjunction with clips 652B to affix a sheet, such as sheet 48 shown in FIG. 8, to the lower or cooking surface of attachment 610. Further details of sheet 48 and its connection to a lower cooking surface are described above with respect to searing mechanism 10.

Figure 52:
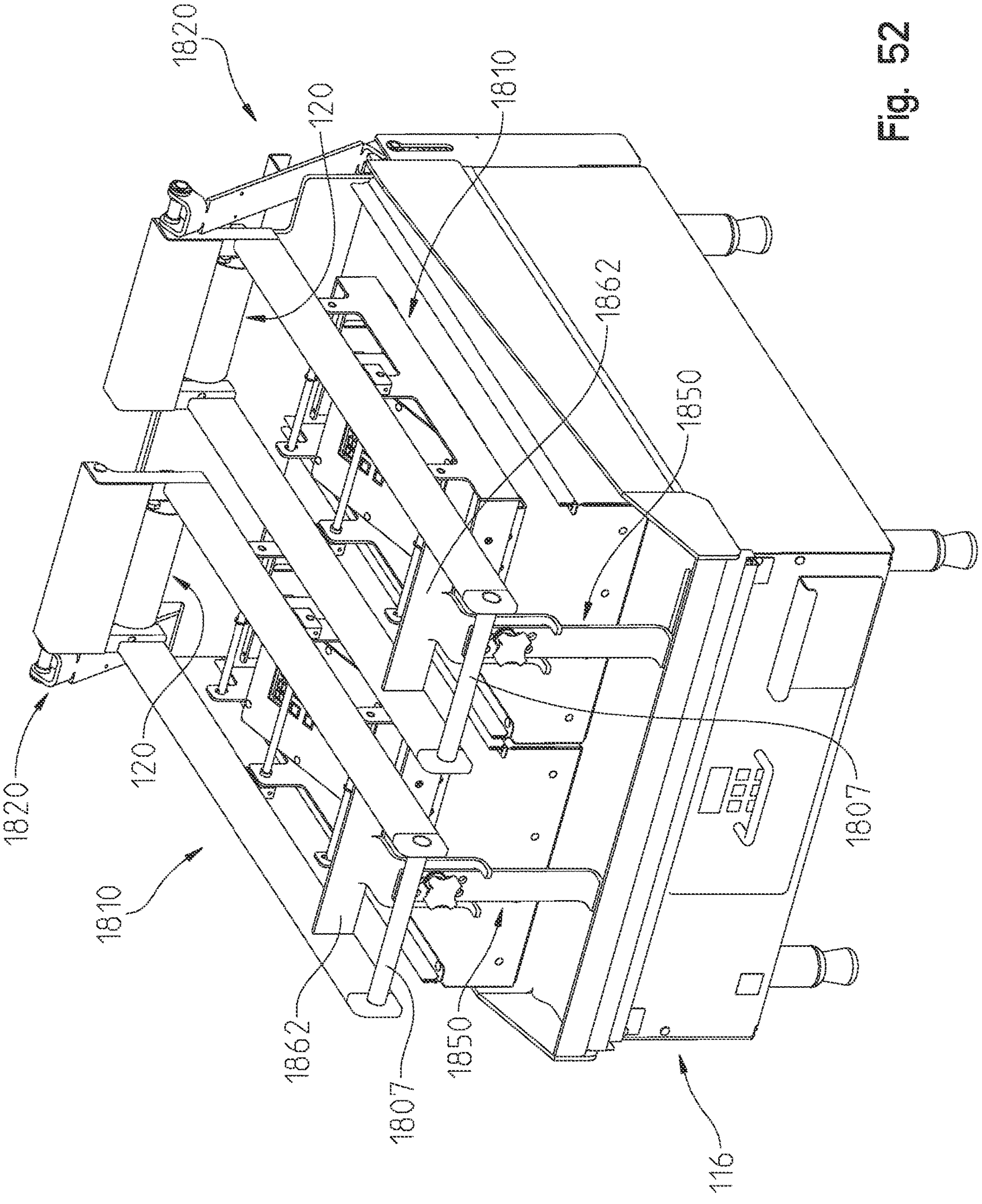
FIG. 52 is a perspective view of a griddle with a self-leveling, counterbalanced cooking mechanism of the present disclosure attached thereto.
Figure 53:
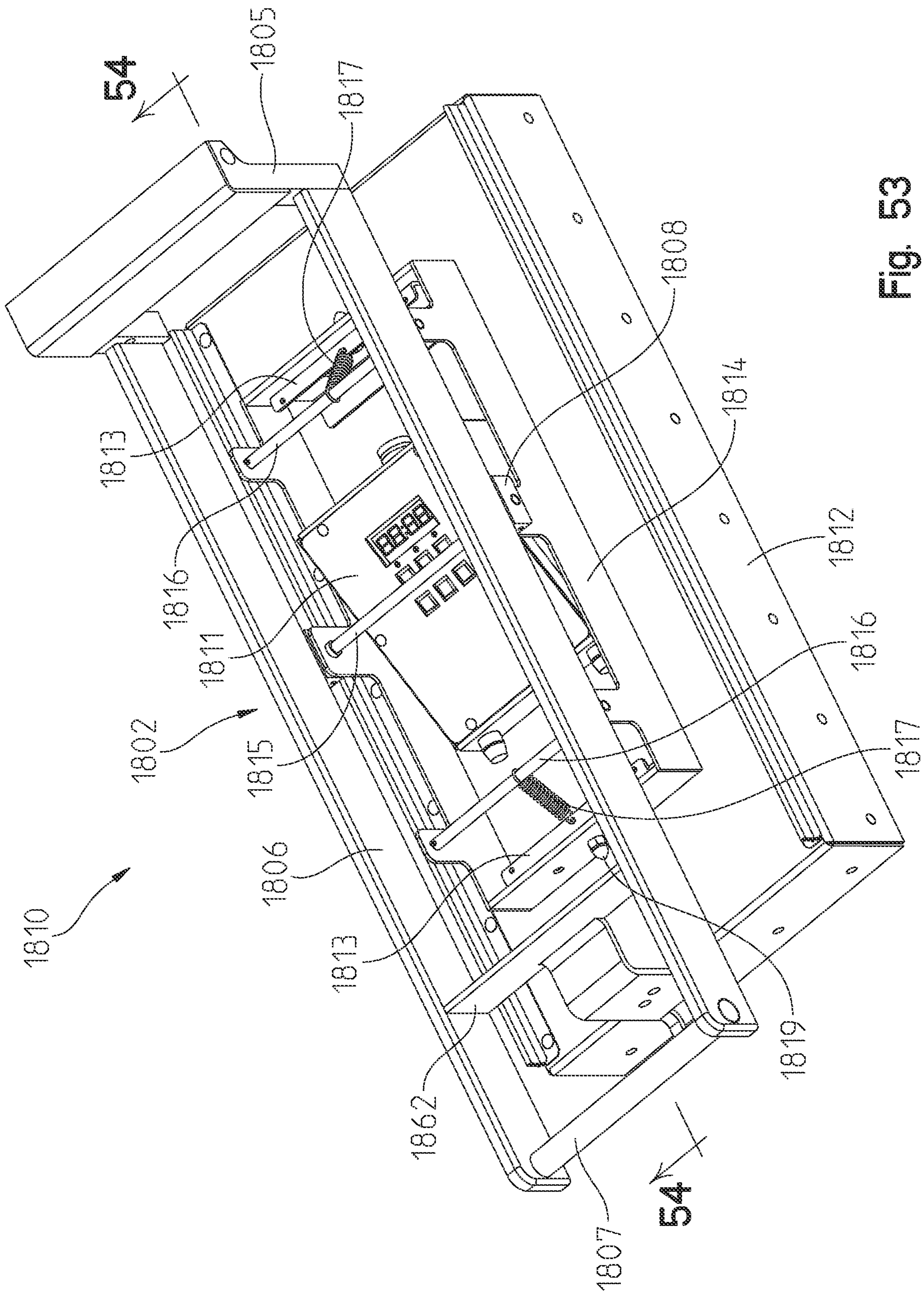
FIG. 53 is a perspective view of the self-leveling cooking mechanism shown in FIG. 52.
Figure 54:
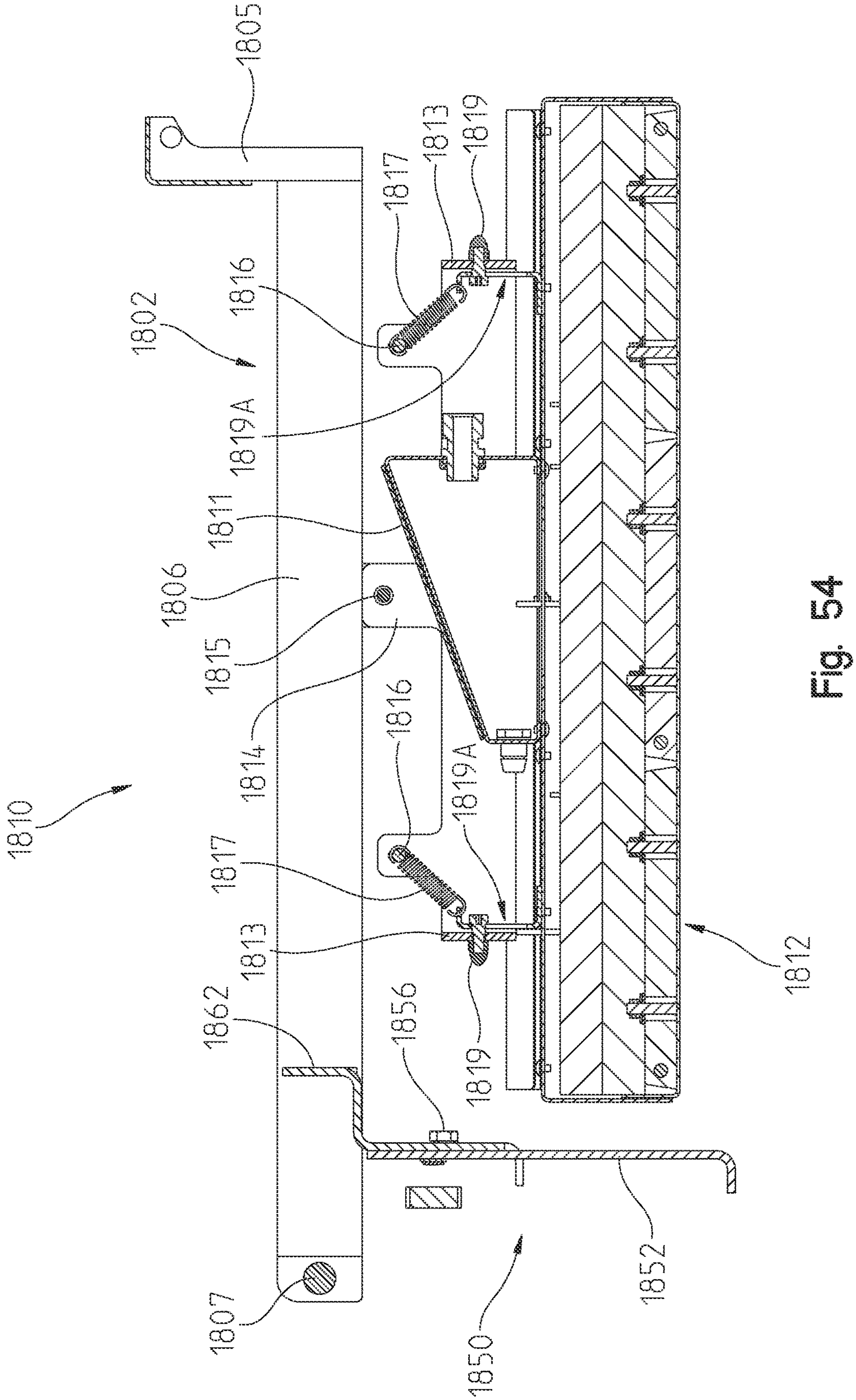
FIG. 54 is a side elevation, section view of the cooking mechanism shown in FIG. 53, taken along the line 54-54.

Turning now to FIGS. 52-54, heated platen 1810 is shown mounted to griddle 116. Platen 1810 may be similarly constructed to other heated platens disclosed herein, and includes press plate 1812 including provisions for generating heat via heater controller 1811 in the same manner as discussed above with respect to other heated cooking attachments disclosed herein, such has heated product press attachment 610.

However, cooking attachment 1810 is movably suspended from frame assembly 1802 via pivot frame 1814 which allows for a "self leveling" of cooking attachment 1810 when cooking attachment 1810 is in the closed configuration. Frame 1814 includes main pivot bar 1815, about which both frame 1814 and press plate 1812 are allowed to pivot within a defined range of motion in a similar fashion to other pivoting platen designs disclosed herein, such as 110, 210, 310 or 410. As with the other pivoting attachments described herein, the defined range of motion of cooking attachment 1810 is controlled by physical abutment between press plate 1812 and a structure of frame 1802.

In addition to the overall pivoting of cooking attachment 1810 about pivot bar 1815, a pair of spring support bars 1816 are provided at proximal and distal locations relative to main pivot bar 1815. Leveling springs 1817 are anchored to frame 1814 via each support bar 1816, with the opposite, movable ends of leveling springs 1817 connected to attachment braces 1813 located at distal and proximal portions of press plate 1812, respectively.

As best seen in FIG. 54, attachment braces 1813 are fixed to an upper surface of press plate 1812 and movably connected to pivot frame 1814 via retainer bolts 1819. In this arrangement, both the proximal and distal portions of press plate 1812 may move up and down independently of one another and independently of pivot frame 1814, as retainer bolts 1819 move within a defined range of motion set by slots 1819A formed in each brace 1813, and through which bolts 1819 extend. Springs 1817 urge press plate 1812 upwardly, but allow press plate 1812 to rest in the downward position (i.e., with retainer bolts 1819 positioned at the top of slots 1819A) in the absence of any other external forces, as shown in FIG. 54.

However, springs 1817 are calibrated to counteract most of the weight of press plate 1812, such that a low threshold of upward force applied to press plate 1812, (e.g., by food contained upon the cooking surface of griddle 116), will advance press plate 1812 upwardly without any corresponding movement from pivot frame 1814. In one exemplary embodiment, for example, a total force application to the undersurface of cooking attachment 1810 of less than 5 lb. will move cooking attachment upwardly. Thus, the presence of a thick piece of food product contained on cooking surface 132 (FIG. 10), such as a thick piece of chicken, can push the abutting portion of press plate 1812 upwardly without experiencing undue "flattening" forces that might otherwise impair the quality of the food product.

For example, a thick piece of chicken might be placed under the proximal portion of press plate 1812 while a thinner piece of chicken might be placed under the distal portion of press plate 1812. Both pieces of chicken may advance the abutting portion upwardly, and both would consequently experience a gentle but firm downward pressure from the relatively low amount of unsuspended weight of press plate 1812. However, the distal piece of chicken will advance the distal portion of plate 1812 upwardly by less the proximal piece's upward advancement of the proximal portion of plate 1812. In this way, springs 1817 providing a "self-leveling" effect in which substantially constant pressure is applied to nonuniform food thickness across the proximal-to-distal dimension of press plate 1812. This "self-leveling" design can be applied to any platen, whether heated or non-heated, by adjusting the spring constant of springs 1817 to counteract a desired amount of weight of the upper platen, leaving the rest of the weight for a desired amount of compressive force reserved for food items to be cooked under the platen.

Figure 61:
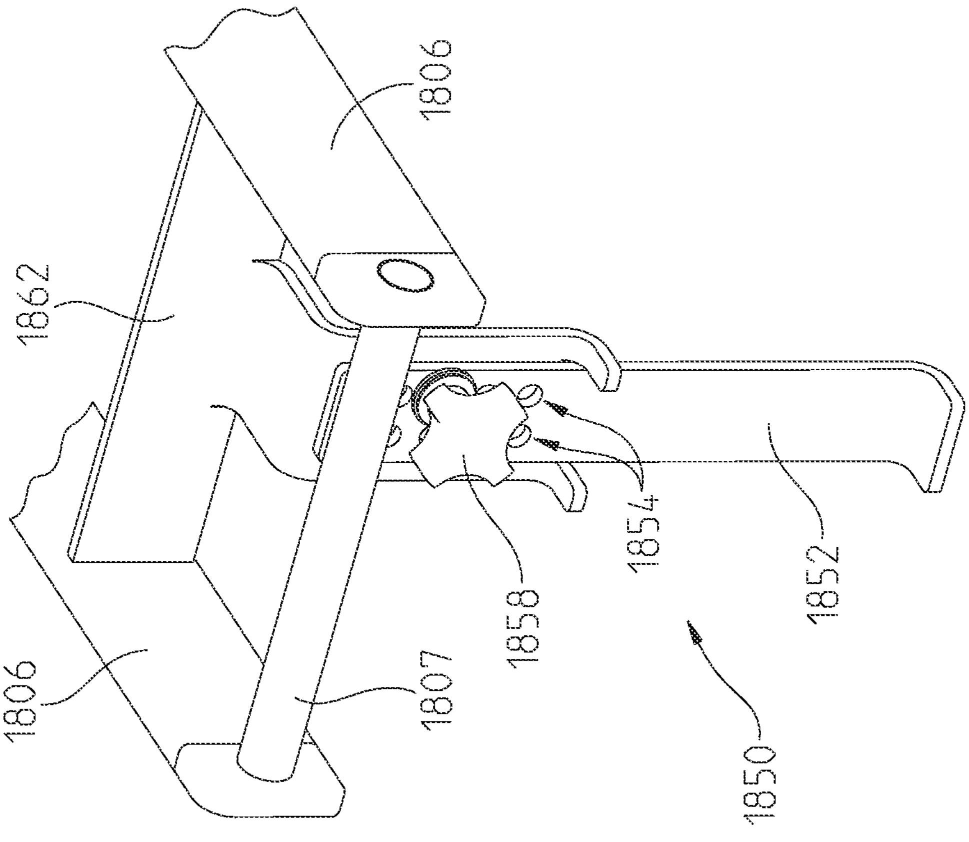
FIG. 61 is a perspective view of a height adjuster assembly in accordance with the present disclosure.
Figure 63:
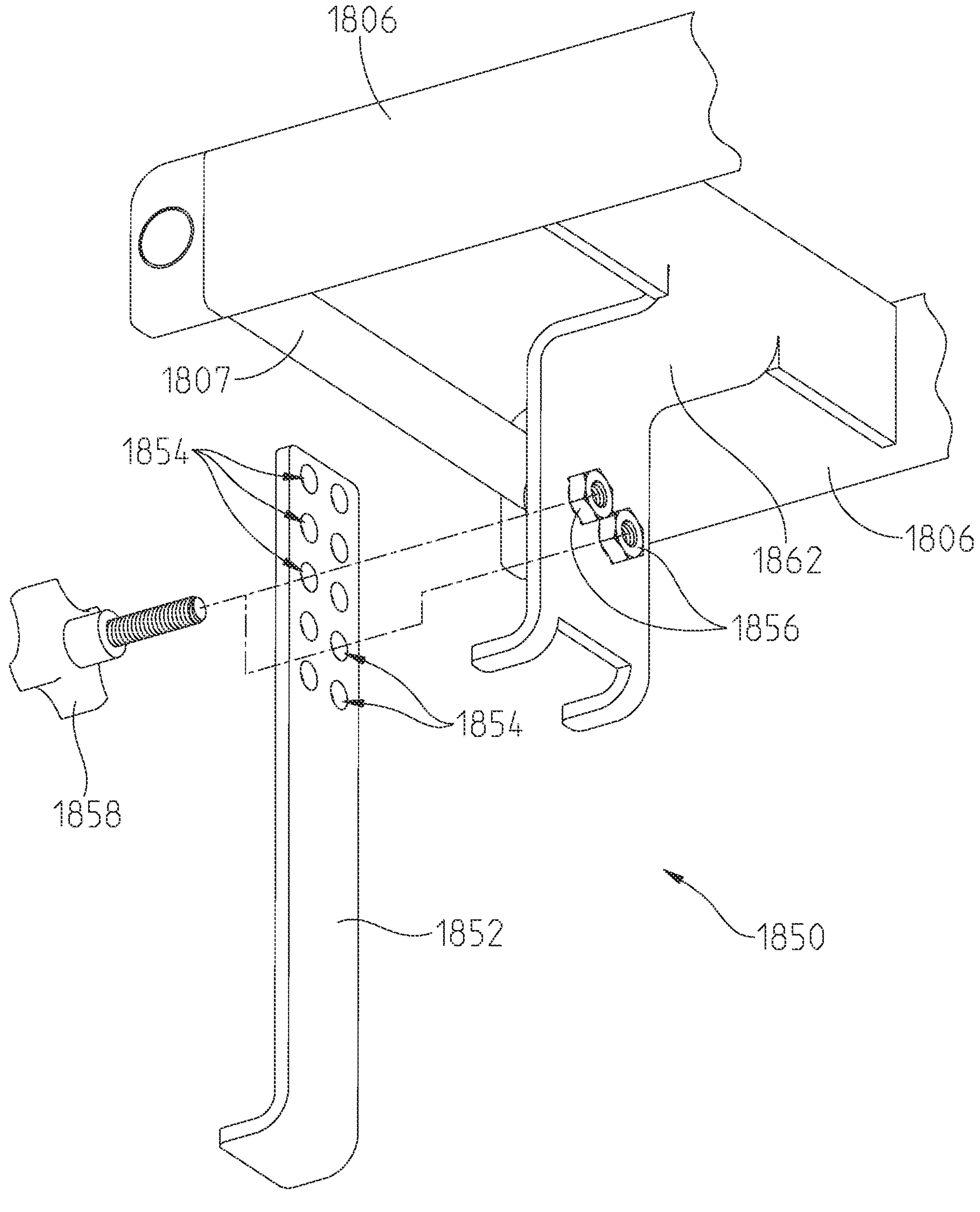
FIG. 63 is a perspective, exploded view of the height adjuster assembly shown in FIG. 61.

To set the nominal minimum food thickness for contact with cooking attachment 1810 in the closed configuration, height adjuster assembly 1850 may be provided as shown in FIGS. 52 and 61-63. Turning to FIG. 61, height adjuster assembly 1850 includes subframe 1862 which spans the lateral distance between frame bars 1806. A downwardly extending portion of subframe 1862 includes a pair of vertically offset holes having nuts 1856 welded to the back (i.e., distal) side thereof. Movable bar 1852 mates to the opposing front (i.e., proximal) side of the downwardly extending portion of subframe 1862, and includes its own series of adjuster holes 1854 (FIG. 63), including a left series of holes which may align with the left weld nut 1856, and a right series of holes 1854 which may align with the corresponding right weld nut 1856. The vertical distance between a neighboring pair of adjuster holes 1854 is greater than the vertical distance between weld nuts 1856, such that a left or right hole alignment can be selected to provide a greater granularity of adjustment than would otherwise be possible using a single row of adjuster holes 1854. Knob 1858 may then be passed through a selected adjuster hole 1854 and threadably connected to the corresponding weld nut 1856, then tightened to fix movable bar 1852 to subframe 1862. In this way, the illustrated embodiment provides 12 vertical positions of adjustment for the height of press plate 1812 relative to griddle 116 (FIG. 52), with a need for only 6 vertically-arranged holes in movable bar 1852.

Heated upper platens made in accordance with the present disclosure, including product press attachments 510, 610 and 1810 described above, may be controlled manually (e.g., with temperature controller 511 shown in FIGS. 30 and 31), or by an automated electronic controller. In one exemplary embodiment, heated attachments 510 or 610 may be kept merely warm, such as above 140° F. 145° F., or 150° F. in order to mitigate or prevent any growth of bacteria in the cooking volume while avoiding any significant cooking effect coming from the upper cooking surface. Alternatively, heated attachments 510, 610 may be made hot, such as any temperature up to about 450° F. in order to provide a cooking action from above for food contained within the cooking volume (e.g., food F shown in FIG. 29). This upper heated surface may be complementary to the lower heated cooking surface, such as the planar cooking surface 132' shown in FIG. 36, which may also be heated via heater 117 shown in FIG. 34. As described in further detail below, an automated controller may also regulate cooking time in addition to cooking temperature from both the upper and lower cooking surfaces, such as through the use of a cook time switch assembly 550 shown and described with respect to FIG. 34.

The modular attachability and detachability of various cooking attachments, such as attachments 110, 210, 310, 410A and 410B, allows griddle 116 to be readily and easily used for a wide variety of cooking tasks. Because base frames 102, 402 need not be removed in order to switch from one attachment to another, the weight handled by an operator to facilitate a change in cooking function is minimized. Moreover, the physical space of the various attachments is also reduced by separation of base frames 102, 402 from the attachments.

Although the attachments 110, 210, 310, 410A and 410B described herein are configured to pivot through a defined range of motion, either by the use of detent mechanism 172 and arcuate slot 166 (FIG. 13) or through the use of hook-shaped pivot slot 266 (FIG. 11), it is contemplated that non-pivoting configurations may also be employed. In particular, both the slot-and-detent and hook-shaped slot arrangements can be spatially configured to prevent any pivoting of the attachment with respect to base frames 102 or 402, e.g., by designing an always-abutting fit between pivot arm 162 and cross frame 124, rather than only using such abutment to delimit rotation as shown in FIG. 22C. Further, the behavior of any respective attachment as it pivots may be controlled through strategic placement of center of gravity C (FIG. 22B) relative to quick release mechanism 160 as required or desired for particular application.

3. Counterbalanced Cooking Mechanisms

In an exemplary embodiment, base frames 102 is counterbalanced by yoke assembly 120 such that minimal force applied to handle 126 is sufficient to raise base frame 102 and any associated attachment from the closed position toward the open position. As noted above, the same type of assembly 420 may be used in connection with base frame 402. All discussion of yoke assembly 120 herein applies equally to yoke assembly 420 and base frame 402.

Figure 17:
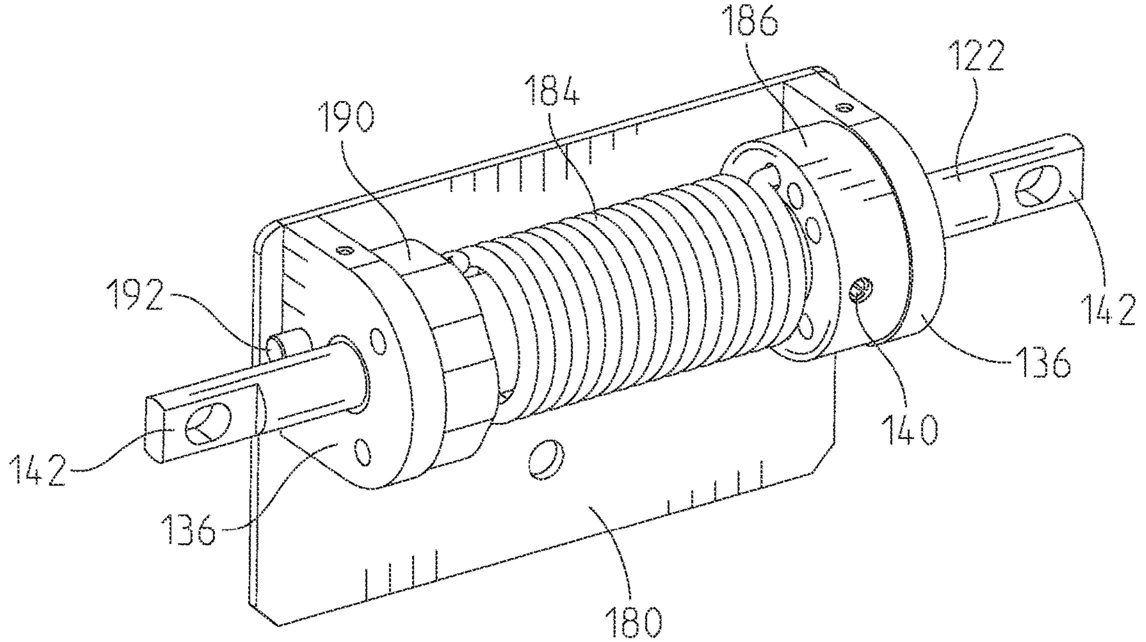
FIG. 17 is another perspective view of the yoke assembly of in FIG. 14, shown without the cover to illustrate internal components thereof.
Figure 18:
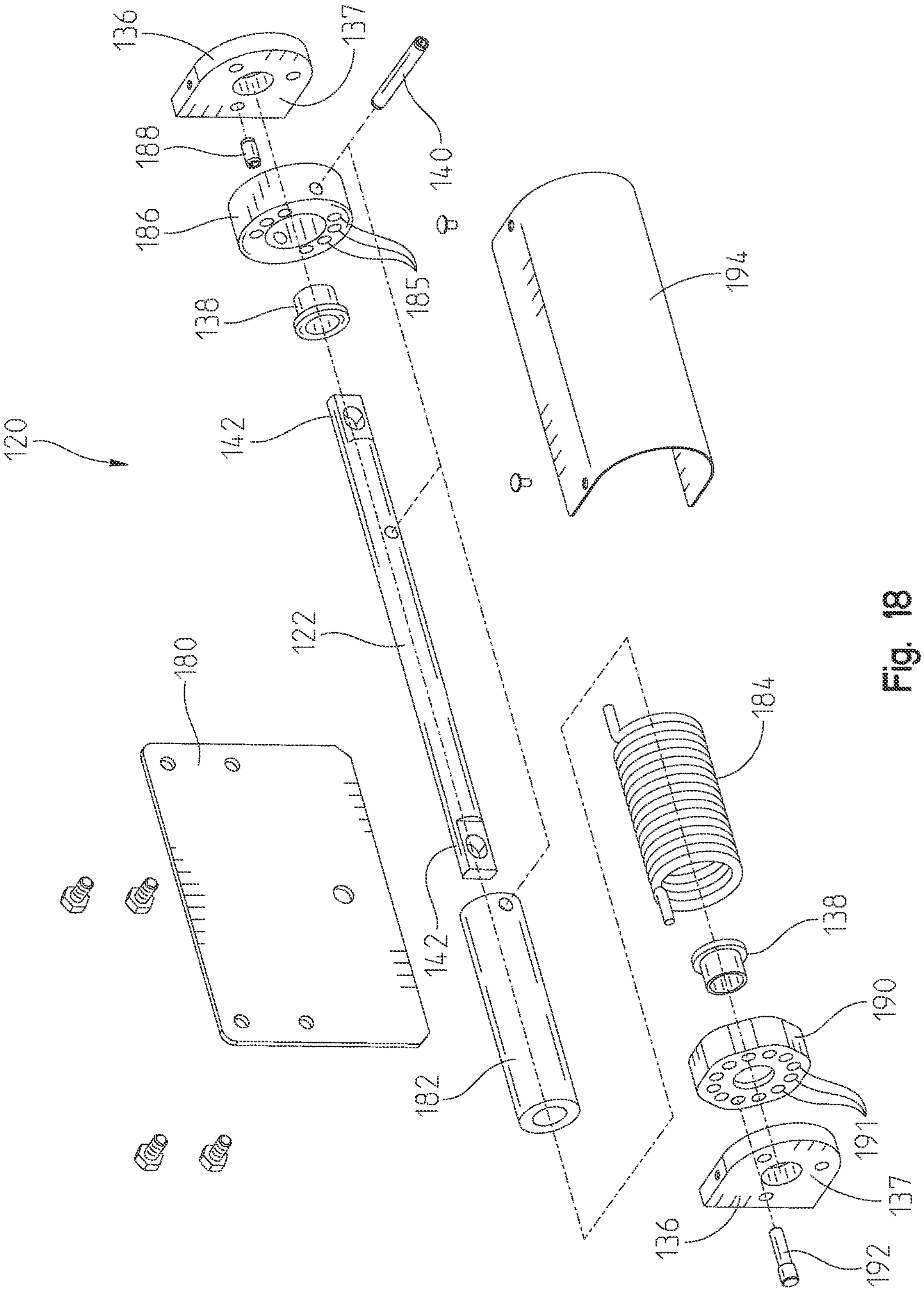
FIG. 18 is a perspective, exploded view of the yoke assembly of FIG. 14.

For example, an upward force application of as little as 1 lb., 4 lbs. or 7 lbs. upon handle 126 may be sufficient to raise base frame 102 and searing attachment 110 from the closed position shown in FIG. 22A toward the open position shown in FIG. 22C. This counterbalance is effected by torsion spring 184 and associated transmission components, as shown in FIGS. 17 and 18. As described in further detail below, a first free end of torsion spring 184 is operably coupled to a stationary yoke frame formed by base plate 180 and a pair of arms 136 extending therefrom, while the other free end of torsion spring 184 is operably coupled to pivot shaft 122 such that it can impart a lifting torque to U-shaped frame 114 and thereby reduce the required amount of force required to lift base frame 102 and any associated attachment.

Referring to the exploded view of yoke assembly 120 shown in FIG. 18, pivot shaft 122 may be rotatably fixed with a spring support sleeve 182 and a tension preload collar 186 via a pin 140 as illustrated. In an exemplary embodiment, spring support sleeve 182 is made of polyoxymethylene, such as Delrin available from DuPont USA. The other components of yoke assembly 120 may be made of stainless steel except as otherwise specifically noted herein.

Torsion spring 184 may be received over spring support sleeve 182, and a free end of spring 184 may then be received in a chosen one of the plurality of apertures formed in the adjacent annular surface of tension preload collar 186. The choice of aperture 185 can be based upon a desired preload for torsion spring 184. For example, choosing an aperture near the free end of spring 184 when base frame 102 is in the open position will allow stored energy via torsion within spring 184 as the base frame 102 is lowered into its closed position.

Figure 19:
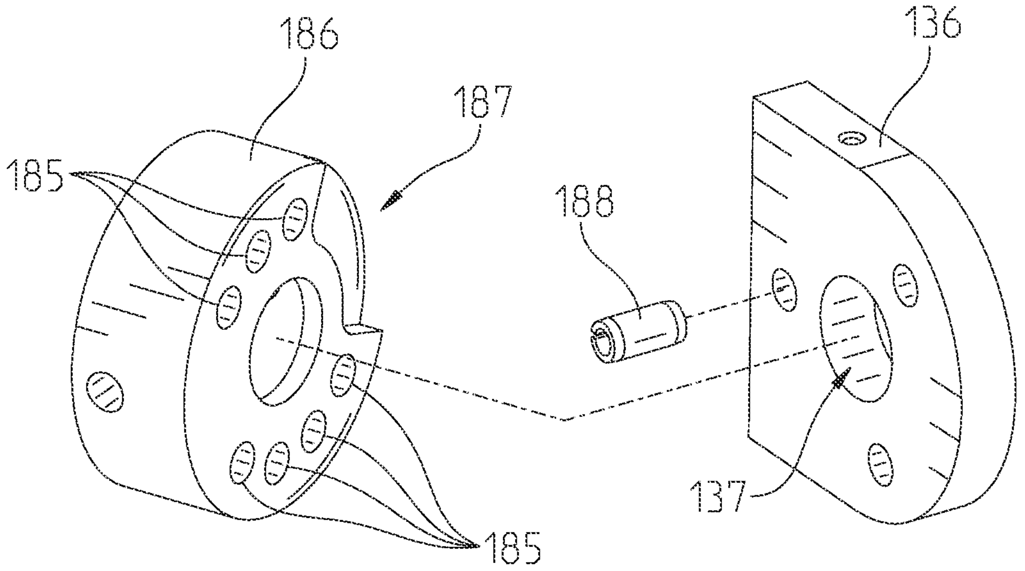
FIG. 19 is a perspective, exploded view of a portion of the yoke assembly of FIG. 14, illustrating the engagement between an arm and a tension preload collar.
Figure 20:
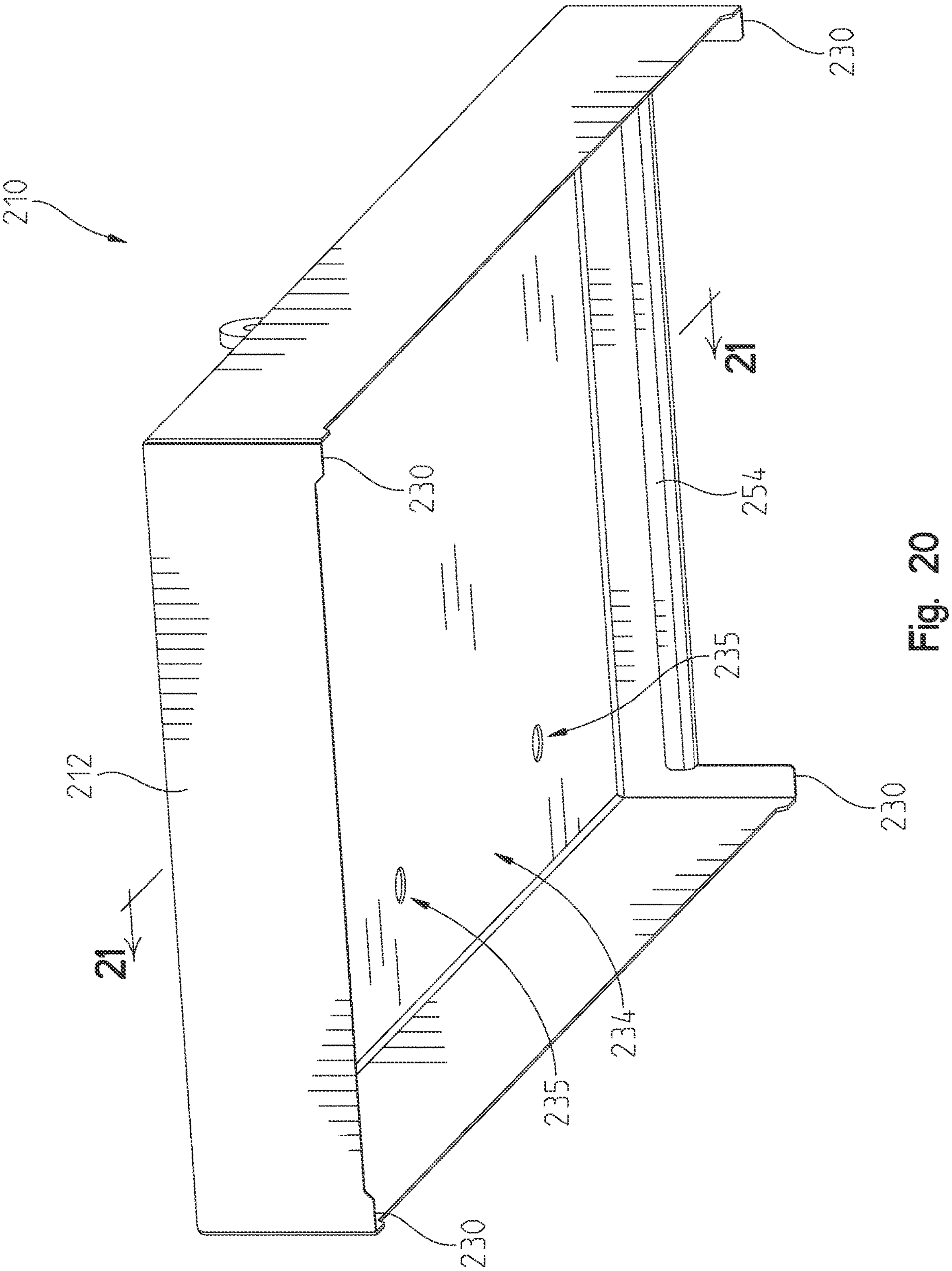
FIG. 20 is a perspective view showing the underside of a steaming attachment of the present disclosure.

Turning to FIG. 19, pin 188 may be fixed to any of the illustrated apertures in arm 136 to form a fixed protrusion extending therefrom. Pin 188 is received within an arcuate void 187 formed on the outside annular surface of preload collar 186. As collar rotates together with shaft 122 and sleeve 182 during opening or closing of base frame 102, pin traverses arcuate void 187. If it is attempted to move base frame 102 beyond the intended range of motion defined by arcuate void 187, pin 188 abuts the end of void 187 and prevents such movement. For this reason, collar 186 has a narrow range of rotational orientations permissible for a given position of base frame 102, and therefore the tension adjustment afforded by apertures 185 is also narrow.

To provide additional tension adjustment, the opposing free end of spring 184 is received within one of the plurality of adjustment apertures 191 formed in the inside and outside annular surfaces of tension adjustment collar 190. Similar to collar 186, any convenient aperture 191 may be utilized depending on the initial orientation of spring 184. However, while collar 186 is constrained to a fixed range of motion by interaction with pin 188 and arm 136, tension adjustment collar 190 is free to rotate about shaft 122 and with respect to the adjacent arm 136 unless and until collar bolt 192 is passed through arm 136 and engaged with one of the outside apertures 191 to lock tension adjustment collar 190 at the desired rotational position, as shown in FIG. 17. In addition, tension adjustment collar 190 is formed as a generally hexagonal construct, such that opposing flats may be engaged by a wrench in order to forcibly rotate tension adjustment collar 190 against the torsional spring bias of spring 184.

In this way, tension adjustment collar 190 may be rotated about the pivot axis of shaft 122 to preload or "clock" spring 184 to provide as much tension as desired for a given position of base frame 102. Thus, tension adjustment collar 190 may be used to tune the amount of assistance provided by torsion spring 184 to the lifting of base frame 102 and any associated attachment. Further, as shown in FIG. 17, tension adjustment collar 190 and the associated collar bolt 192 are accessible to an operator of modular cooking mechanism 100 (FIG. 11) and griddle 116 (FIG. 10), such that field adjustments of the torsion preload within spring 184 may be made as necessary, e.g., when changing from a relatively light attachment to a heavier attachment or vice versa. Cover 194 is provided to cover the components of yoke assembly 120 and protect such components from contamination by, e.g., grease or dust. Cover 194 may be readily removed to expose tension adjustment collar 190 and the other components for adjustment or service as needed.

Bushings 138 may be provided to provide a lubricious interface between pivot shaft 122 and the respective pair of arms 136 through which it passes. The apertures formed in each arm 136 are coaxial and define an axis substantially parallel to a plane defined by base plate 180 as well as to a plane defined by cooking surface 132. Shaft 122 is, of course, coaxial with these apertures such that the pivot axis of base frame 102 is similarly parallel to base plate 180 and cooking surface 132. As described above with respect to searing mechanism 10. U-shaped frame 114 is attached to shaft 122 via extensions 142.

In addition the modular attachment of various cooking attachments to base frame 102, the frame 102 itself may also be modularly attached to, or disconnected from, griddle 116. Base frame 402 may also be modularly attached to and disconnected from griddle 116 in the same manner as discussed herein with respect to base frame 102.

Figure 15:
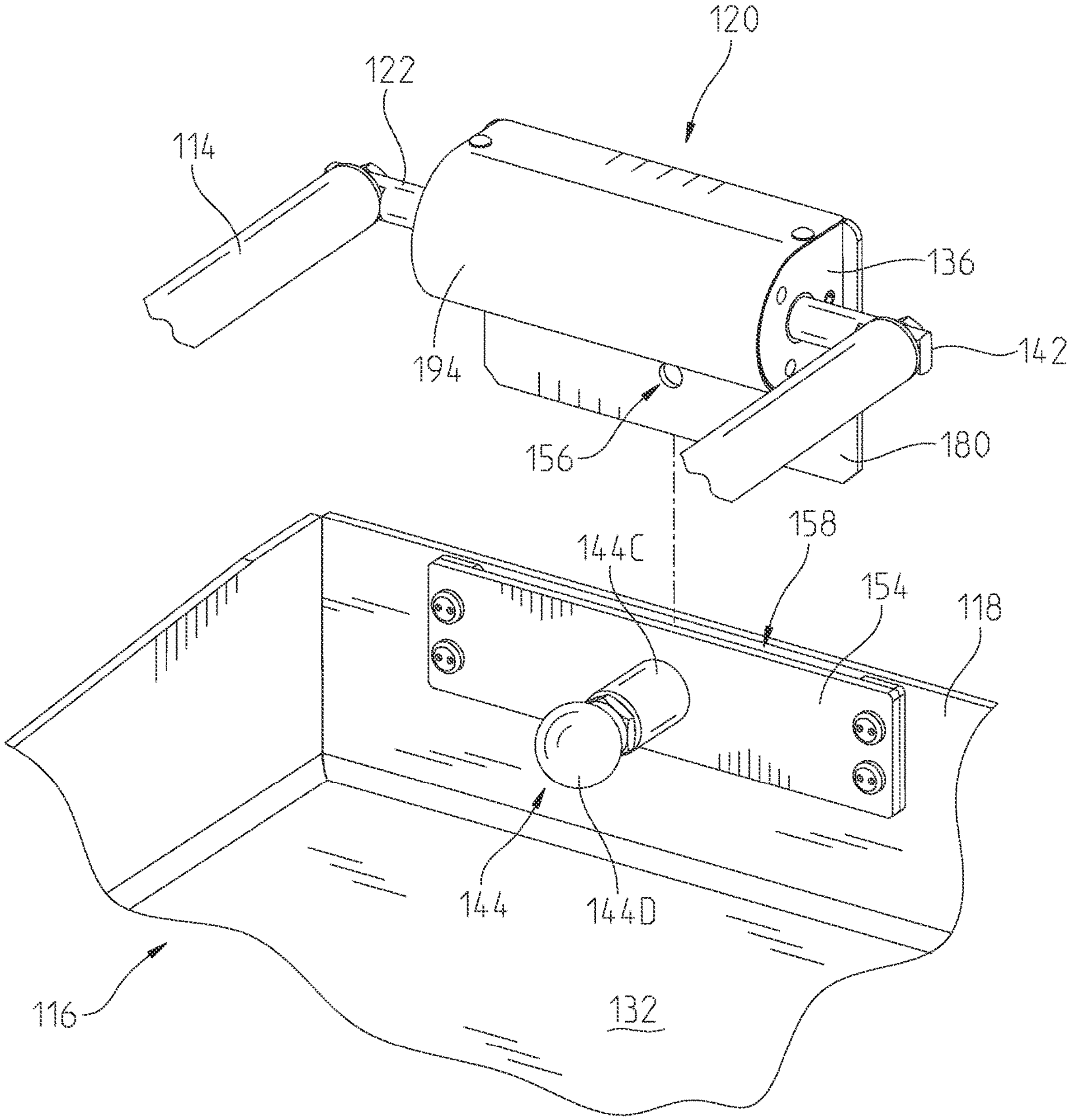
FIG. 15 is a perspective view of the yoke assembly of in FIG. 14, illustrating its attachment to the griddle of FIG. 10.
Figure 16:
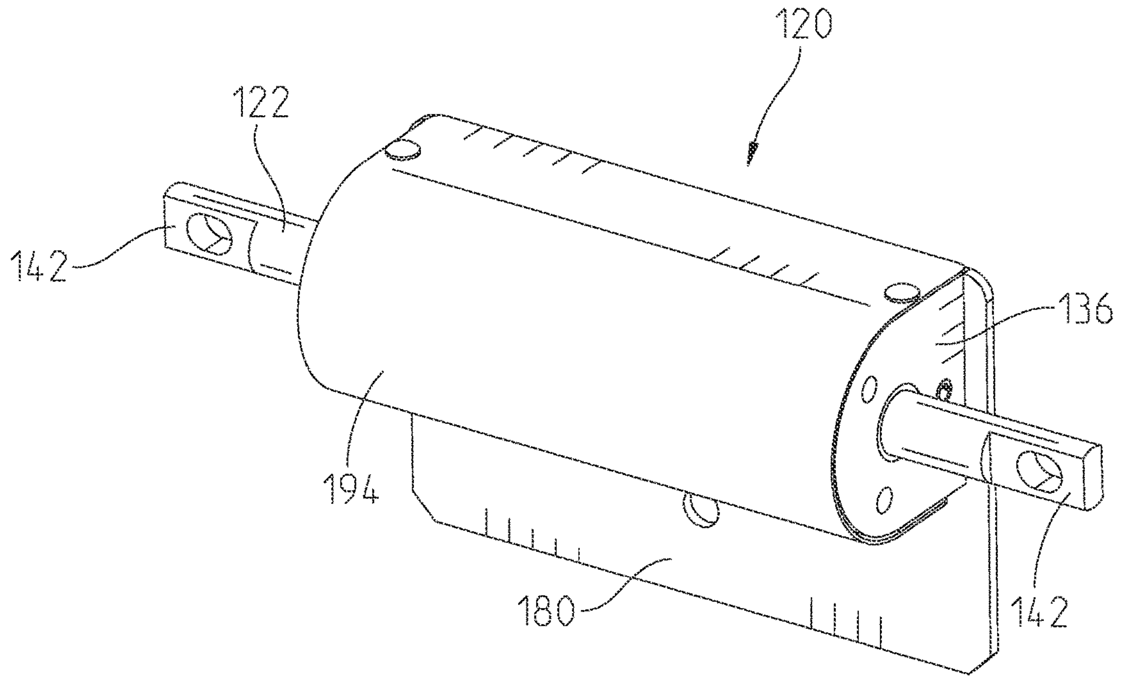
FIG. 16 is a perspective view of the yoke assembly of in FIG. 14.

Turning to FIG. 15, a lower portion of base plate 180 of yoke assembly 120 is sized to be received within a slot 158 formed between mechanism attachment plate 154 and the adjacent rear splash shield 118 of griddle 116. For some applications in which a downward pressure on handle 126 is not expected, such as steaming attachment 210 shown in FIG. 10, no further fixation is necessary other than the passage of base plate 180 into slot 158. In such an installation, the weight of the attachment is sufficient to hold base plate 180 in slot 158 during normal use.

Figure 14:
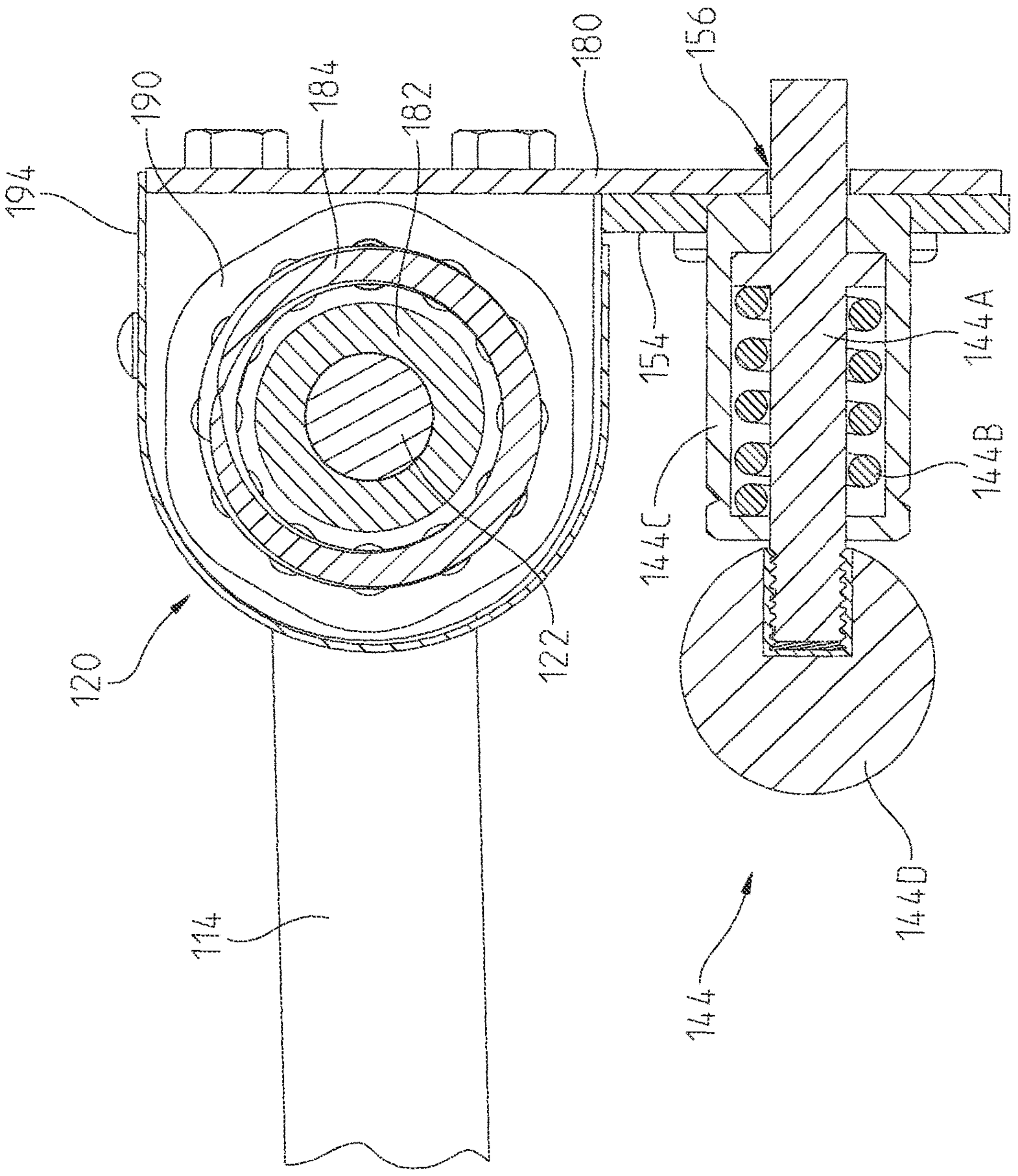
FIG. 14 is a side elevation, cross-section view of a yoke assembly of the present disclosure.

In other applications, such as searing attachment 110, a downward force may be occasionally applied to handle 126 resulting in a corresponding upward force urging base plate 180 out of engagement with slot 158. For such applications a quick release assembly 144 may also be provided in order to lock yoke assembly 120 into slot 158. As best shown in FIG. 14, quick release assembly 144 includes housing 144C which is fixed to the lower portion of base plate 154. Plunger 144A is received within housing 144C and biased into an engaged position by spring 144B, which urges the distal end of plunger 144A through an aperture in plate 180 as illustrated. A handle 144D may be provided to retract plunger 144A into housing 144C by manual operation. Turning to FIG. 15, handle 144D may be pulled against the biasing force of spring 144B (FIG. 14) to retract plunger 144A, at which time base plate 180 may be received into slot 158. When plunger 144A becomes aligned with aperture 156, and handle 144D may be released to allow spring 144B (FIG. 14) to bias plunger 144A through aperture 156, thereby locking base plate 180 into slot 158.

As a supplement or alternative to yoke assembly 120, counterbalance assembly 820 may be provided as shown in FIGS. 46-51. Counterbalance assembly 820 is compatible with any of the cooking attachments described herein, though it may be particularly beneficial for use with relatively heavy cooking attachments such as heated product press attachments, including attachments 510, 610 and 710 described herein. In the illustrated embodiment, counterbalance assembly 820 is used with cooking attachment 810, which includes an enclosed, vertically adjustable, heated upper platen. In particular, housing 811 of cooking attachment includes a heated lower surface which is heated by heater assembly 813. The heater assembly 813 and housing 811 (together with cover 812) can be raised or lowered by a motorized lifting assembly 814, which is mounted to mainstay 816 and which drives cross member assembly 817 up or down to transmit motion to heater assembly 813 and housing 811. Handle assembly 815 is used to pivot cooking attachment 810 up or down between a closed position shown in FIG. 46, and an open position shown in FIG. 47.

Cooking attachment 810 further includes hinge arm 818, which is the functional interface between cooking attachment 810 and counterbalance assembly 820. In particular, hinge arm 818 includes proximal extension 818C which can be bolted to mainstay 816, thereby forming a fixed attachment therebetween. Hinge arm 818 can be similarly connected by any suitable method, including bolts or welding, to any other cooking attachment described herein to utilize counterbalance assembly 820 for such cooking attachment.

Figure 50:
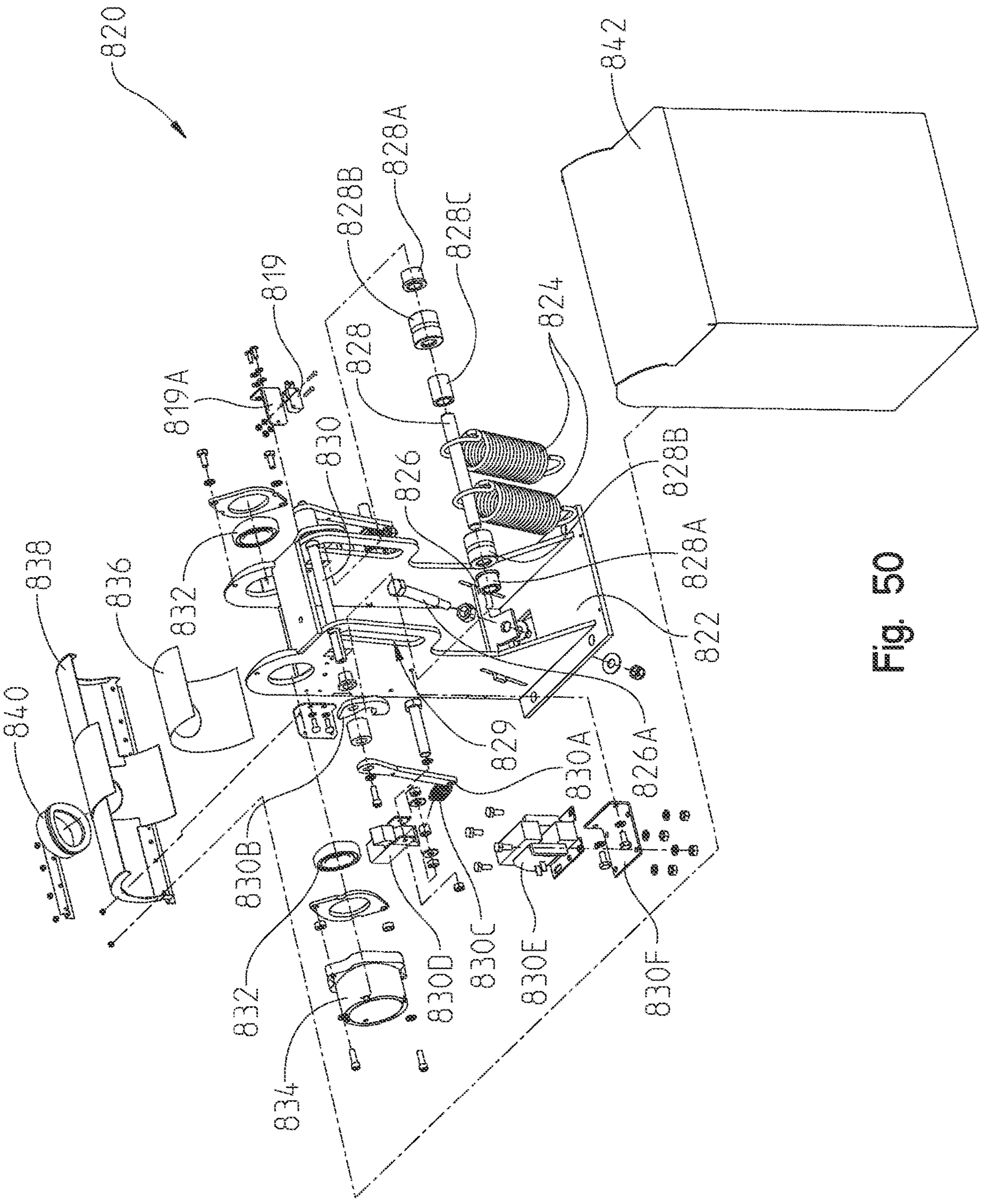
FIG. 50 is an exploded view of a portion the counterbalance pivot assembly of FIG. 48.
Figure 5I:
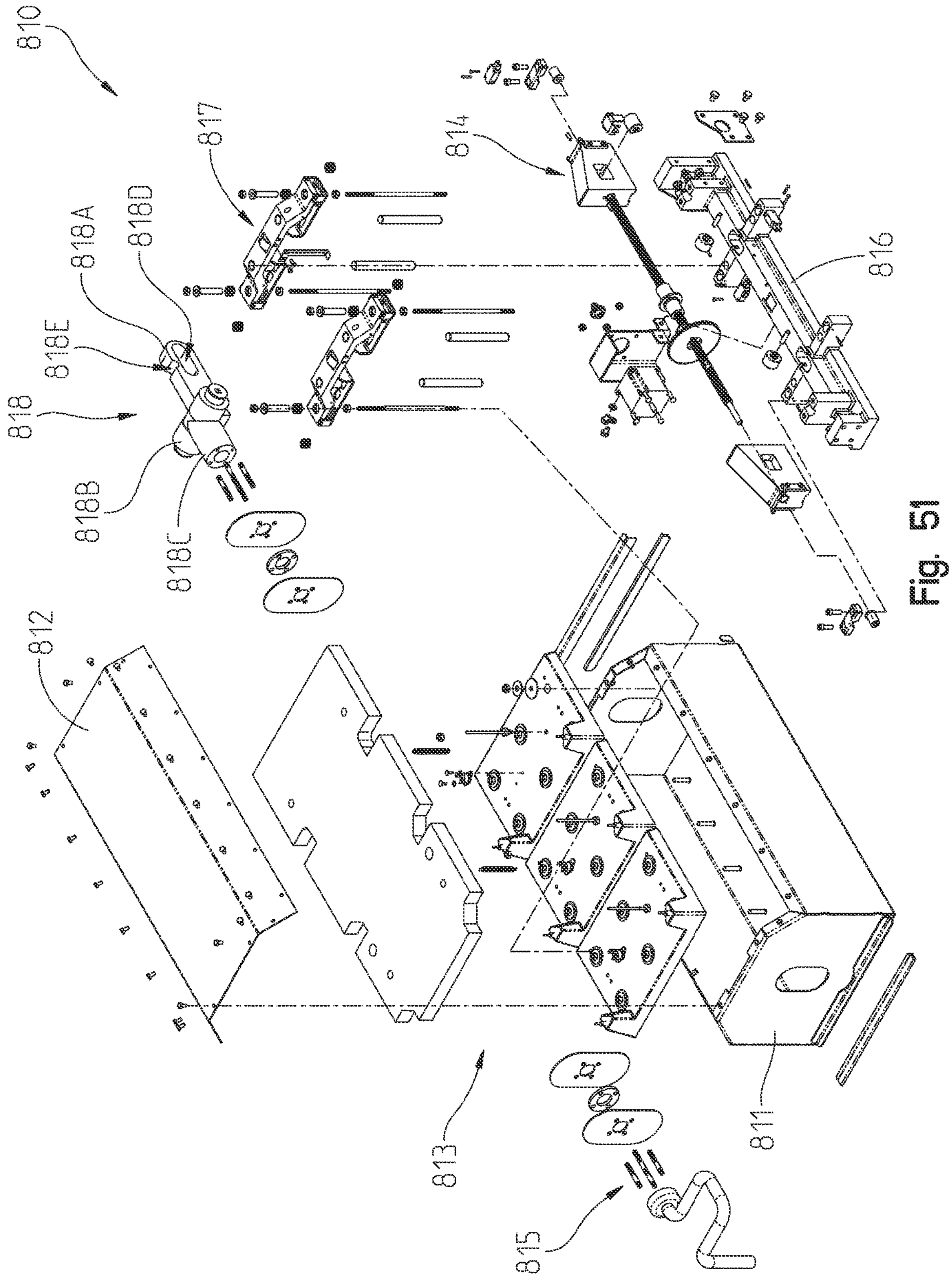

Turning to FIG. 50, counterbalance assembly 820 includes frame 822 which pivotably attaches to hinge arm 818, and also produces a counterbalancing force to the weight of cooking attachment 810 which is transmitted through hinge arm 818. For the pivotable connection, hinge arm 818 includes pivot barrel 818B (FIG. 51) defining the horizontal pivot axis about which cooking attachment 810 pivots. Barrel 818B is received by bearings 832 mounted to frame 822. An extension 818A extends distally from barrel 818B, i.e., in the opposite direction as proximal extension 818C and away from cooking attachment 810. Guide slot 818D formed in distal extension 818A aligns with slots 829 formed in frame 822 upon assembly. Spring traveler 828 then received through slots 829 and guide slot 818D, thereby functionally connecting distal extension 818A to frame 822.

Figure 48:
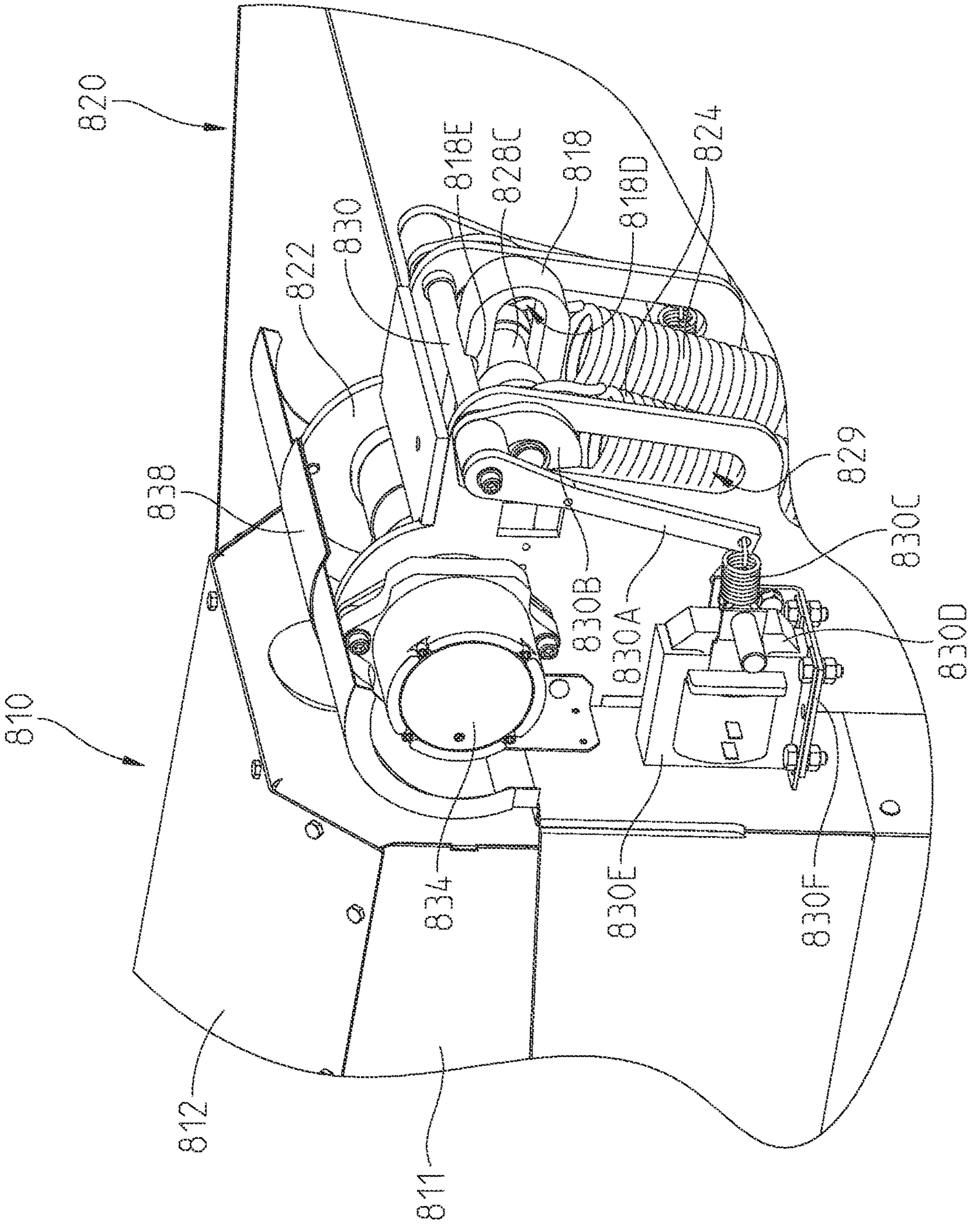
FIG. 48 is a perspective view of the counterbalance pivot assembly of FIG. 46.
Figure 49:
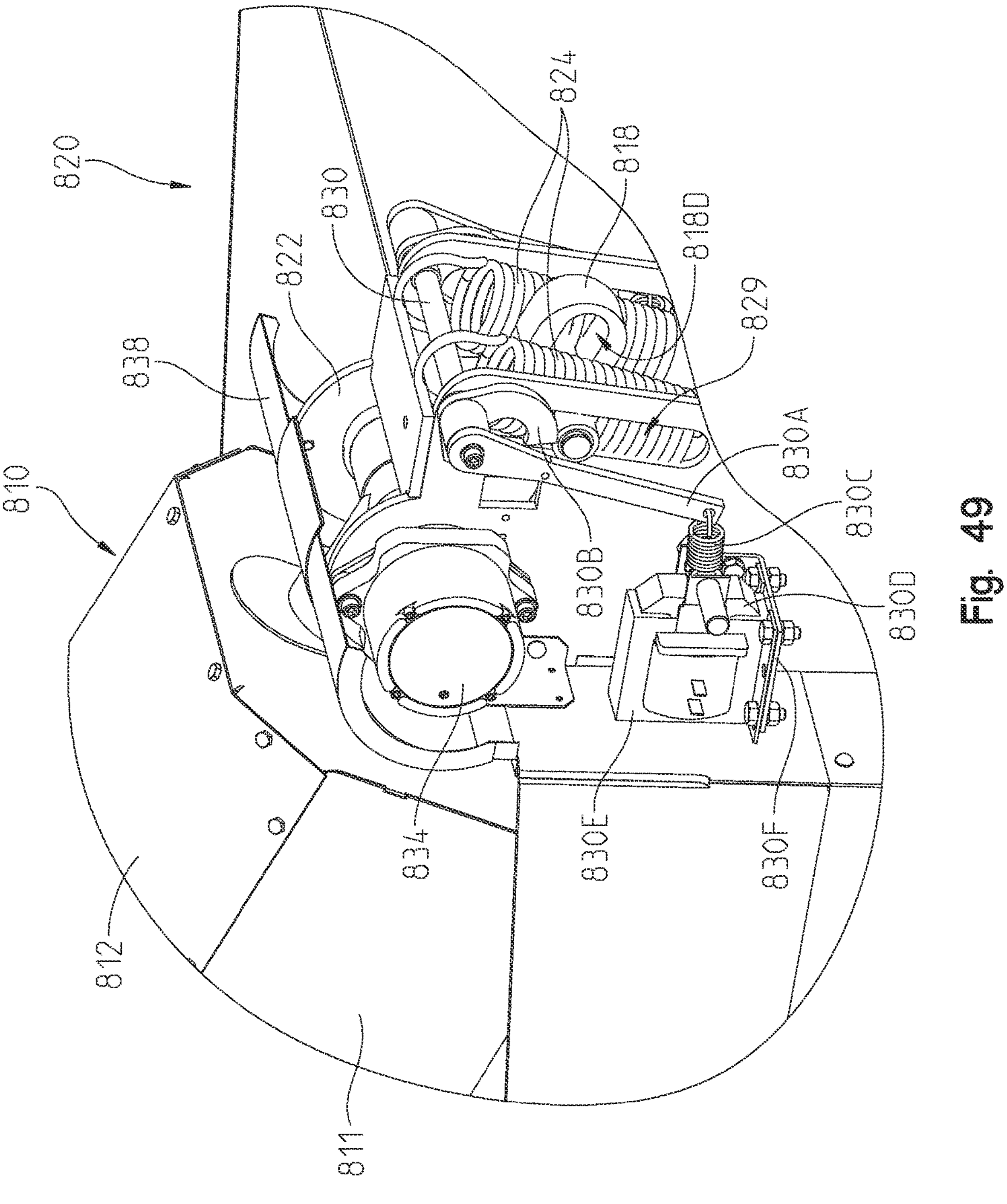
FIG. 49 is a perspective view of the counterbalance pivot assembly of FIG. 47.

Extension springs 824 connect at a first end to spring traveler 828, as shown in FIGS. 48 and 49. The opposing end of each spring 824 is connected to spring anchor 826 (FIG. 50), which is slideable with respect to frame and can be adjusted along its travel by adjuster 826A to modify the spring preload. For example, a heavy cooking attachment may justify a high spring preload, while a relatively lighter attachment may require less preload.

As hinge arm 818 rotates during opening and closing of cooking attachment 810, traveler 828 traverses slots 829 in frame 822 and slot 818D in hinge arm 818. In the closed position of FIG. 48, slots 829 and 818D are substantially perpendicular to one another such that tension in springs 824 transmits a first, relatively large force to hinge arm 818 to provide a correspondingly large assist in the initial stages of lifting cooking attachment 810 from a closed position (FIG. 46) toward an open position (FIG. 47). As the opening movement proceeds, less force is needed to lift cooking attachment 810 by an incremental amount. As shown in FIG. 49, slots 829 and 818D progressively become less perpendicular and more aligned as the lifting procedure is performed. The more aligned slots 829, 818D become, the less force from springs 824 is transmitted to hinge arm 818. The relative geometry of slots 829, 818D are designed such that this reduction in counterbalancing force provided by springs 824 is commensurate with the reduction in force needed to lift cooking attachment 810, such that a consistent or substantially constant force applied to handle assembly 815 (FIG. 47) can be used to move cooking attachment 810 up or down.

Counterbalance assembly 820 further includes features which provide for smooth and reliable operation, as well as potential interface with a controller, such as controller 559 shown in FIG. 34 and described in detail below. For example, the interface between spring traveler 828 and slots 829 is made lubricious by bushings 828A and riders 828B, while spacer bushing 828C similarly creates a lubricious interface between traveler 828 and slot 818D of hinge arm 818.

In the illustrated embodiment of FIGS. 48-50, down lock shaft 830 is rotatably connected to retainer 830B, which selectively retains the end of traveler 828 at an upper end of slot 829 (FIG. 48) or allows traveler 828 to move downwardly through slot 829 (FIG. 49). In particular, when an operator has lowered cooking attachment 810 into a closed configuration (FIG. 46) to initiate a cooking operation, solenoid body 830E may be energized to cause solenoid core 830D to be drawn inwardly toward body 830E. This, in turn, urges retainer 830B to rotate via spring 830C. If traveler 828 is not in the fully raised position within slot 829 (which corresponds to a fully closed position of cooking attachment 810, the biasing force of spring 830C will cause retainer 830B to enter the closed and locked position (shown in FIG. 48) when the fully closed position of the cooking attachment 810 is achieved. At this point, retainers 830B prevent traveler 828 from advancing downwardly in slot 829, thereby preventing opening of cooking attachment 810. When the cooking process is completed or the controller and/or operator otherwise determines that the cooking attachment 810 should be free to open, solenoid body 830E is de-energized or reversed to extend solenoid core 830D outwardly, such that retainers 830B move out of registration with the ends of traveler 828 and traveler 828 becomes free to move downwardly within slot 829. In the illustrated embodiment, solenoid body 830E is mounted to frame 822 by bracket 830F.

Damper 834 may also be provided at an axial end of pivot barrel 818B of hinge arm 818. Damper 834 is configured to dampen the pivoting movement of cooking attachment 810 through its range of travel between the closed position (FIG. 46), a fully open position, or a range of intermediate positions (FIG. 47).

Turning to FIG. 50, sensor 819 may be mounted (e.g., by bracket 819A) to frame 822 and positioned to be contacted by hinge arm 818 at a particular position, such as when cooking attachment 810 is fully closed. In this way, sensor 819 can issue a signal indicative of the particular position of hinge arm 818 and cooking attachment 810, which can in turn be used by the controller and/or operator to control other functions, such as the locking or unlocking of traveler 828 via retainers 830B as described above.

Figure 46:
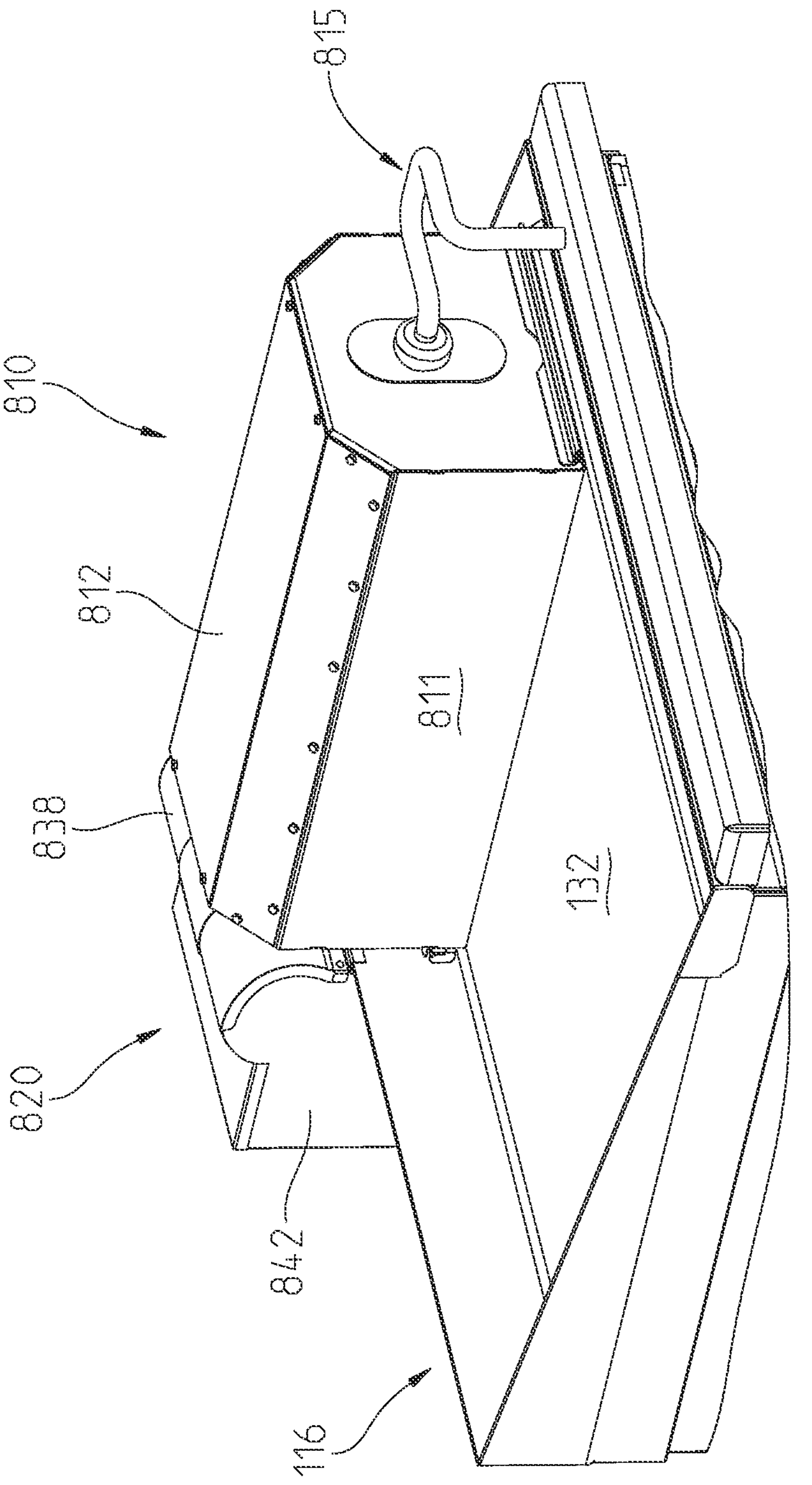
FIG. 46 is a perspective view of another cooking attachment of the present disclosure in a close position, attached to a griddle by a counterbalance pivot assembly.
Figure 47:
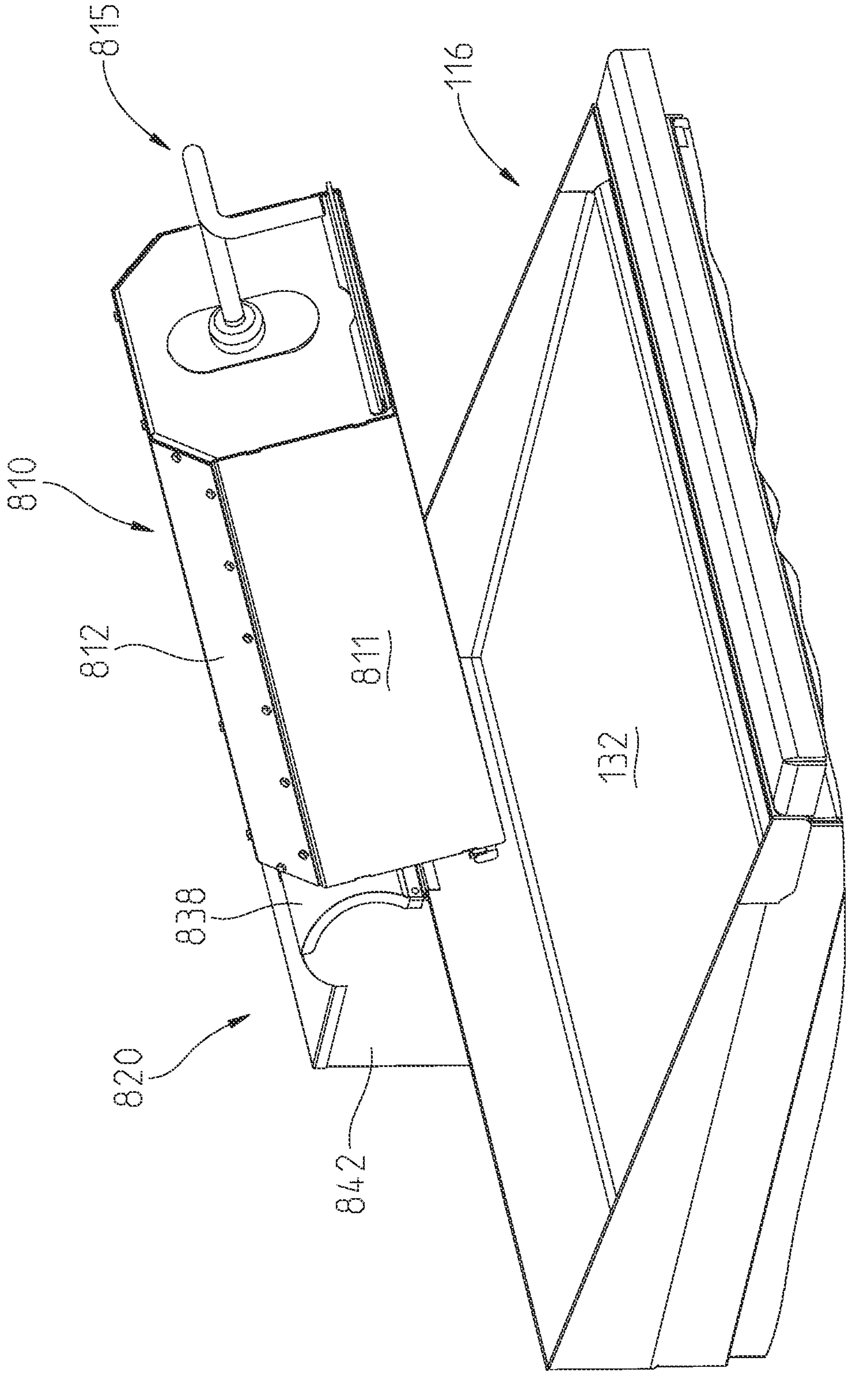
FIG. 47 is another perspective view of the cooking attachment and counterbalancing pivot assembly of FIG. 46, shown with the cooking attachment pivoted open.

In an exemplary embodiment, counterbalance assembly 820 is protected from environmental hazards and contamination by housing 842, as shown in FIGS. 46, 47 and 50. In addition, a curved cover 838 is provided to enclose the area around hinge arm 818, with an inner cover 836 to form a tight seal. A flexible boot 840 may also be disposed between cover 838 and hinge arm 818 to maintain the seal during opening and closing of cooking attachment 810.

Turning now to FIGS. 52 and 55-60, another counterbalance assembly 1820 is illustrated in connection with griddle 116 and cooking attachment 1810. Counterbalance assembly 1820 is generally similar in function to counterbalance assembly 820 described in detail above, and corresponding parts have corresponding reference numerals, except with 1000 added thereto.

However, counterbalance assembly 1820 is configured to utilize a single spring 1824, rather than two springs 824 as used in assembly 820. In addition, assembly 1820 pivotably attaches to cooking attachment 1810 in a different manner, via hinge arm 1818, which allows the platen pivot to pass directly over the spring pivot as illustrated by a comparison of FIGS. 58-60. As further described below, this arrangement cooperates with yoke assembly 120 to provide a calibrated assist which allows a user to exert a low, consistent force on handle 1807 to lift or lower cooking attachment 1810 throughout the range of motion from the fully closed configuration to the fully open configuration.

Figure 56:
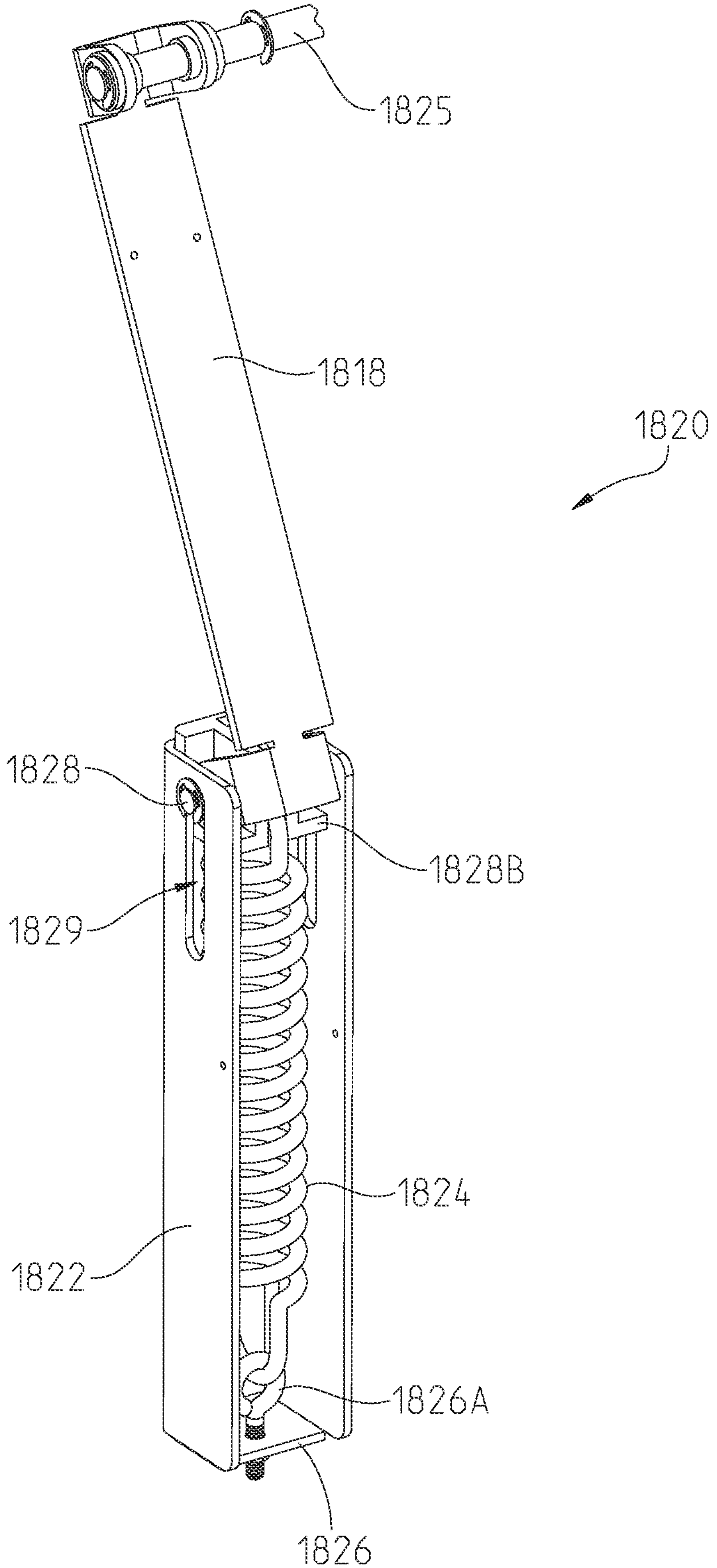
FIG. 56 is a perspective view of the counterbalance spring assembly shown in FIG. 55.
Figure 57:
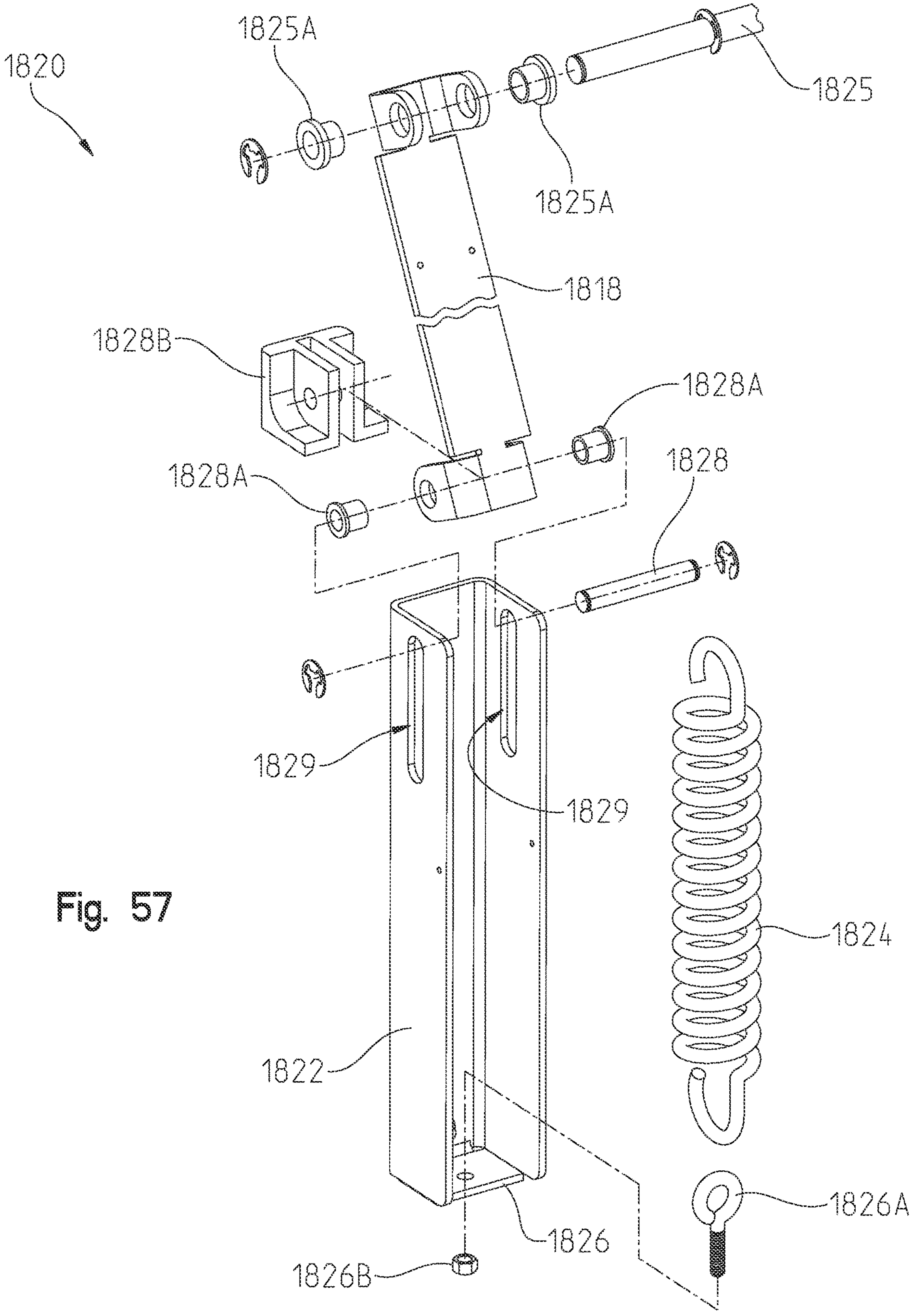
FIG. 57 is a perspective, exploded view of the counterbalance spring assembly shown in FIG. 56.

FIGS. 56 and 57 illustrate the structure and arrangement of the components of counterbalance assembly 1820. Frame 1822 houses extension (or tension) spring 1824, which is connected at its lower end to spring anchor 1826 of frame 1822 via I-bolt 1826A and nut 1826B (FIG. 57). At its upper end, spring 1824 is connected to frame 1822 via traveler 1828 which passes through slots 1829 and is retained by snap rings as illustrated. Traveler 1828 also passes through a lower end of hinge arm 1818 and bushings 1828A which provide a low friction, lubricious interface between traveler 1828 and slots 1829. In the illustrated embodiment, rider 1828B also provides a low-friction, physical structure between hinge arm 1818 and frame 1822 which inhibits rotation of spring 1824 and promotes good alignment between traveler 1828 and slots 1829. With this arrangement, hinge arm 1818 may move up and down within housing 812 while also pivoting about traveler 1828, as described in detail below.

Hinge arm 1818 is biased to its lowest position within slot 1829 by spring 1824. At this lowest position spring may still be slightly extended to provide a spring preload inhibiting initial movement of traveler 1828 upwardly within slot

1829. This preload may be increased or decreased by adjusting I-bolt 1826A up and down with respect to spring anchor 1826, which may be accomplished by rotating nut 1826B.

Figure 55:
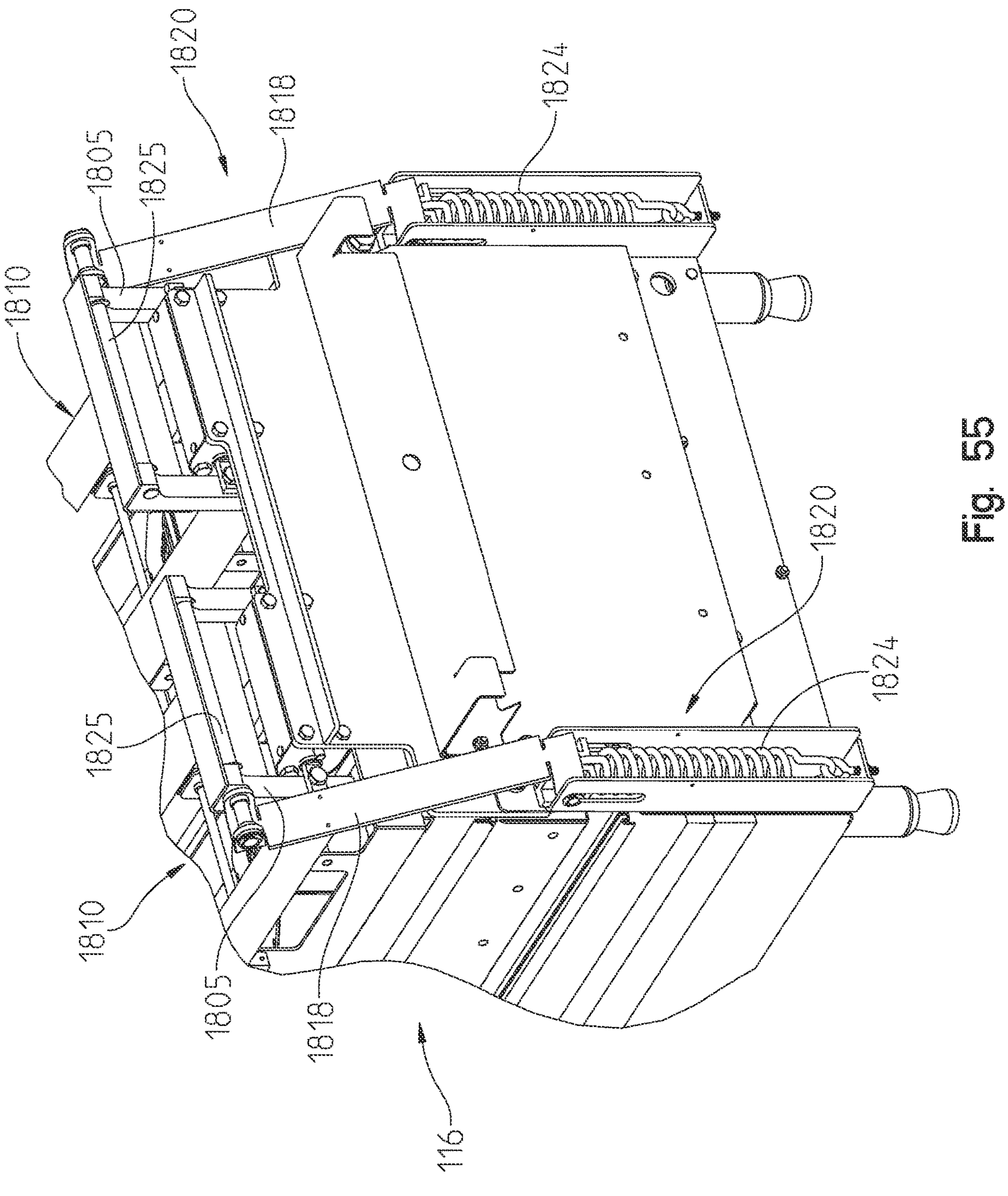
FIG. 55 is a rear perspective view of the griddle and cooking mechanism shown in FIG. 52, illustrating the counterbalance spring assemblies thereof.

As best seen in FIGS. 55 and 56, the upper end of hinge arm 1818 forms a pivot connection with cooking attachment 1810 via pivot bar 1825, which passes through an upper portion of distal frame members 1805. Bushings 1825A, shown in FIG. 57, provide a low friction, lubricious interface between pivot bar 1825 and hinge arm 1818, similar to bushings 1828A described above.

Figure 58:
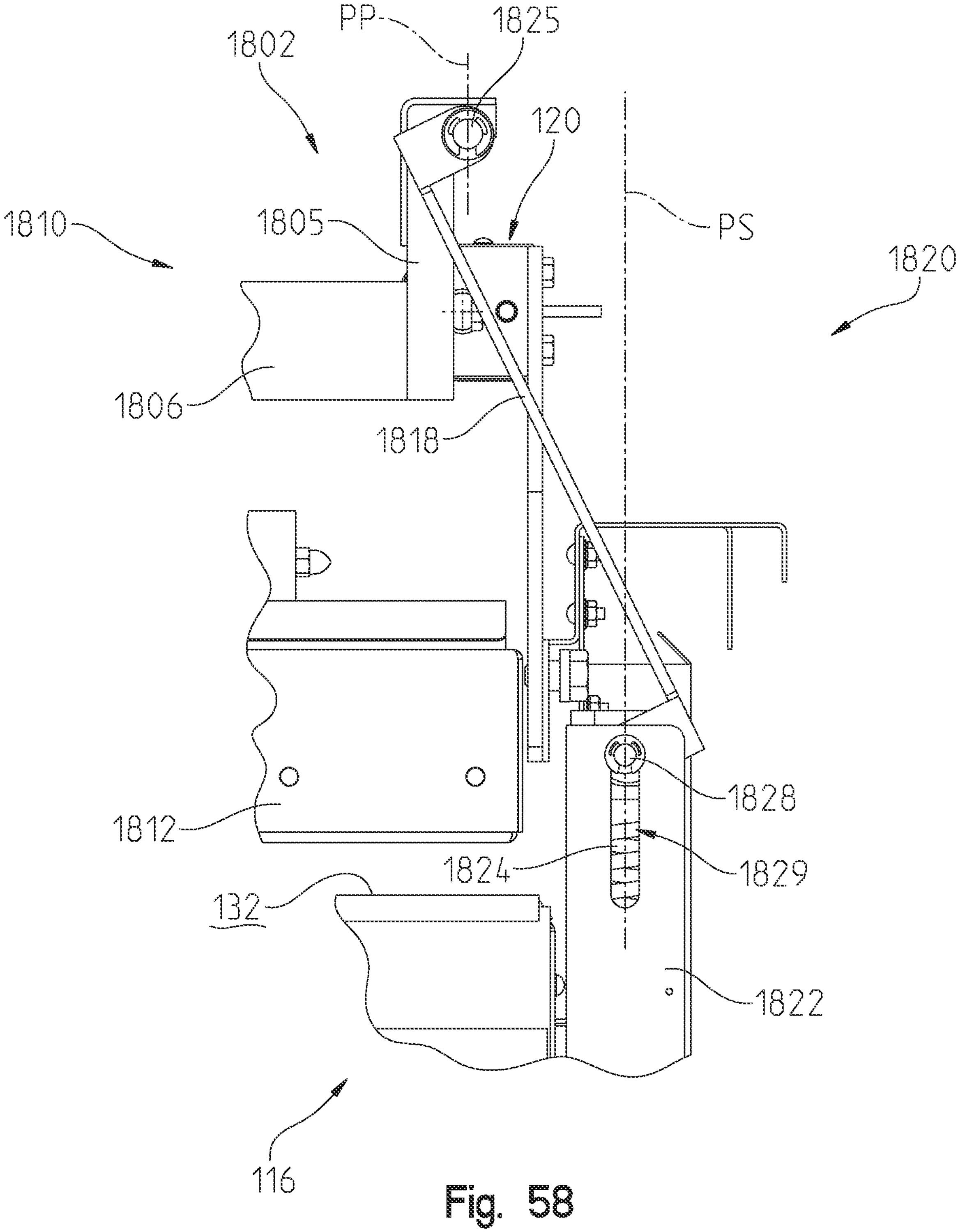
FIG. 58 is a side elevation view of the griddle and counterbalance assembly shown in FIG. 55, in which the product press attachment is in the closed configuration.

Turning to FIG. 58, counterbalance assembly 1820 is shown when cooking attachment 1810 is fully closed, with the lower cooking surface of press plate 1812 substantially parallel to cooking surface 132 of griddle 116. In this arrangement, spring 1824 is fully extended and providing a maximum counterbalancing force upon traveler 1828, which is at the top of slot 1829. This tension force is transmitted to frame 1802 of cooking attachment 1810 (FIG. 55) via hinge arm 1818 as two force vectors running parallel to hinge arm 1818, one which points downwardly and the other which points rearwardly or distally. Because distal frame members 1805 are vertically oriented in the closed configuration shown in FIG. 58, only the rearward force vector contributes assistance to the initial opening of cooking attachment 1810.

However, as noted above with respect to other cooking attachments, yoke assembly 120 provides a maximum lift assist force via torsion spring 184 (FIG. 17) when counterbalance assembly 1820 is in the closed configuration. In an exemplary embodiment, the assist provided by yoke 120 is calibrated to cooperate with the rearward force vector provided by spring 1824 to allow a user to lift cooking attachment 1810 from the closed position by a slight force upon handle 1807 (FIG. 52), such as a 1 pound, 2 pounds, 3 pounds, 4 pounds or 5 pounds upward force, for example.

Figure 59:
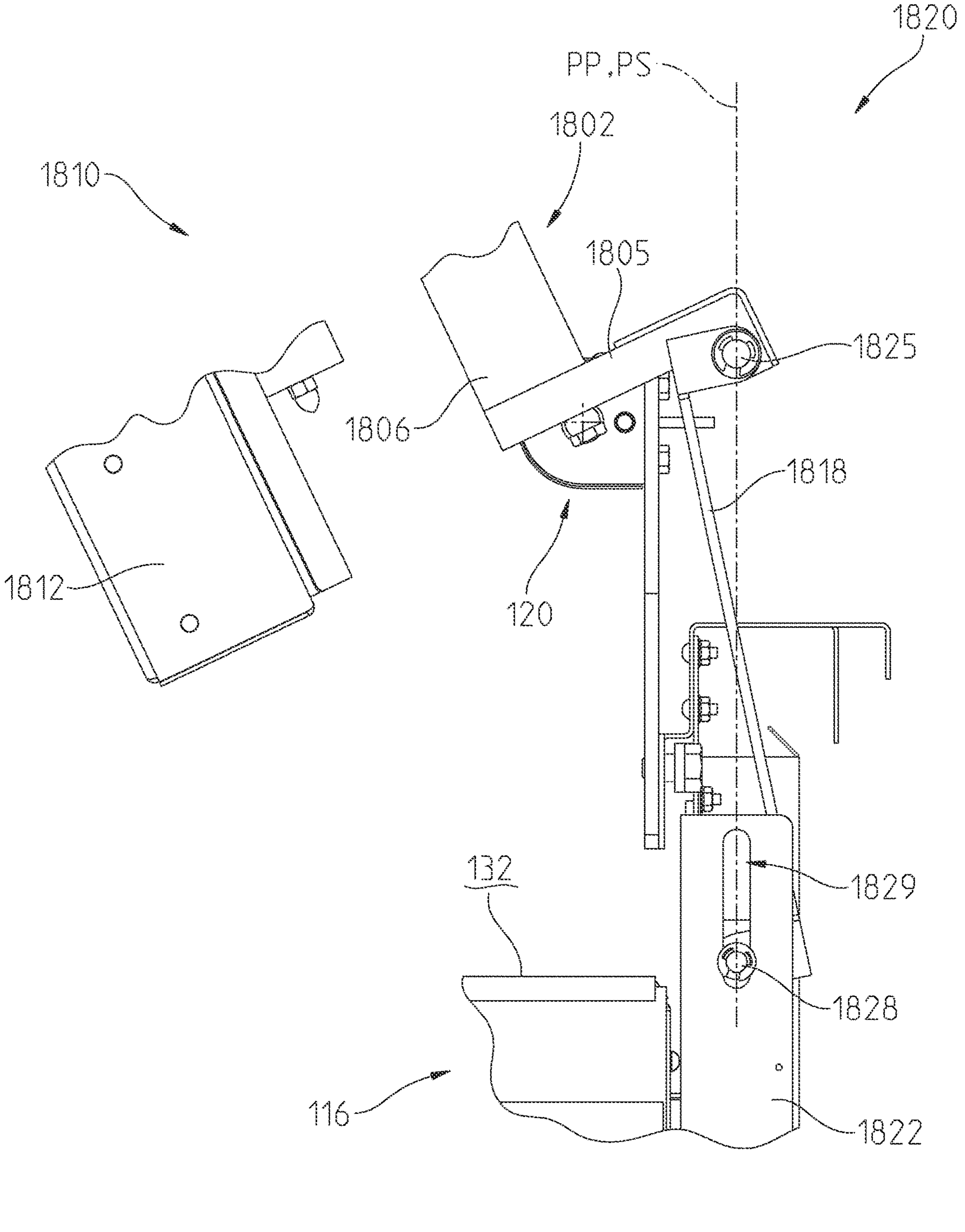
FIG. 59 is another side elevation view of the griddle and counterbalance assembly shown in FIG. 58, in which the product press attachment is pivoted toward an open configuration.
Figure 60:
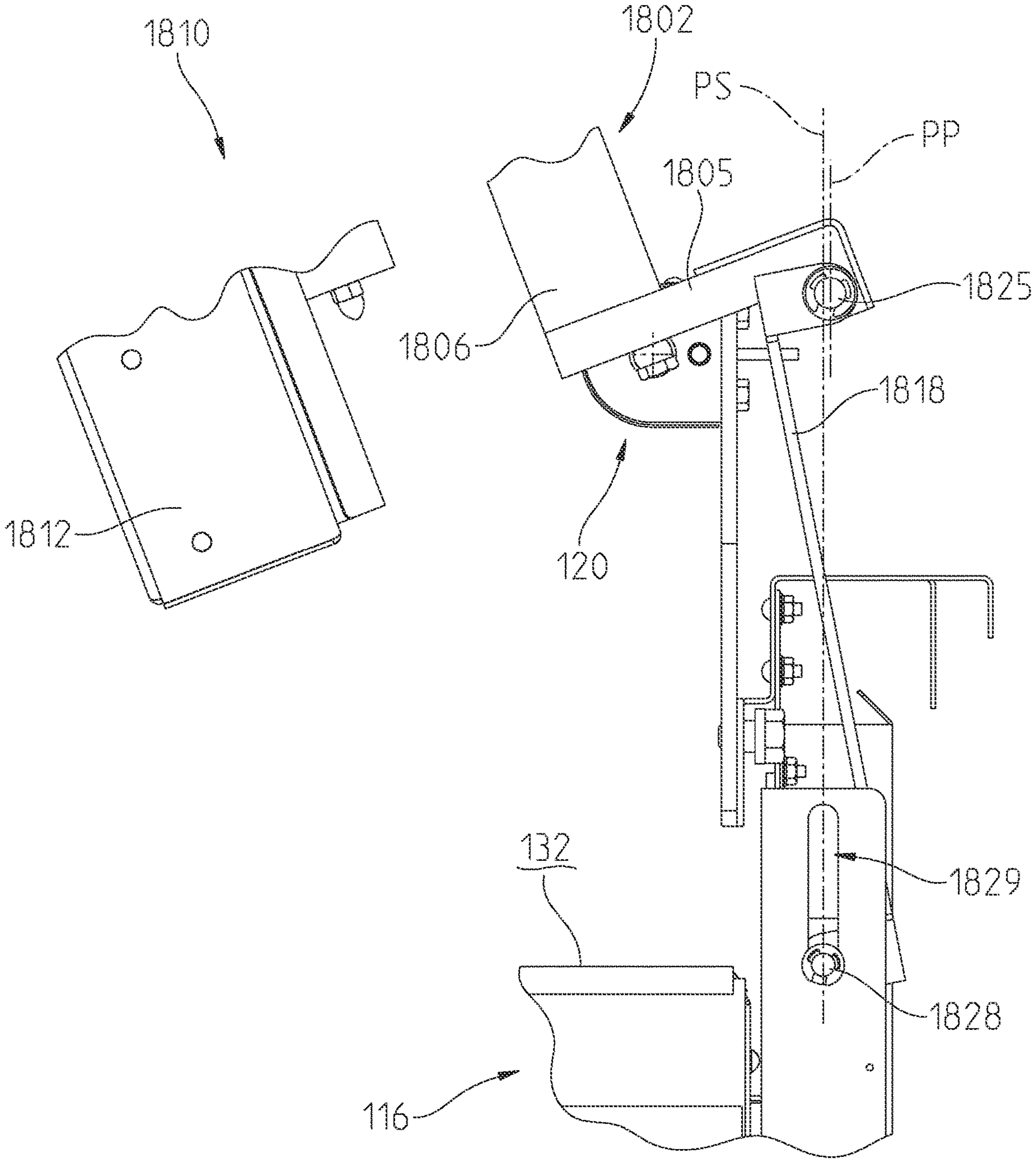
FIG. 60 is another side elevation view of the griddle and counterbalance assembly shown in FIG. 58, in which the product press attachment is pivoted into a fully open configuration.
Figure 62:
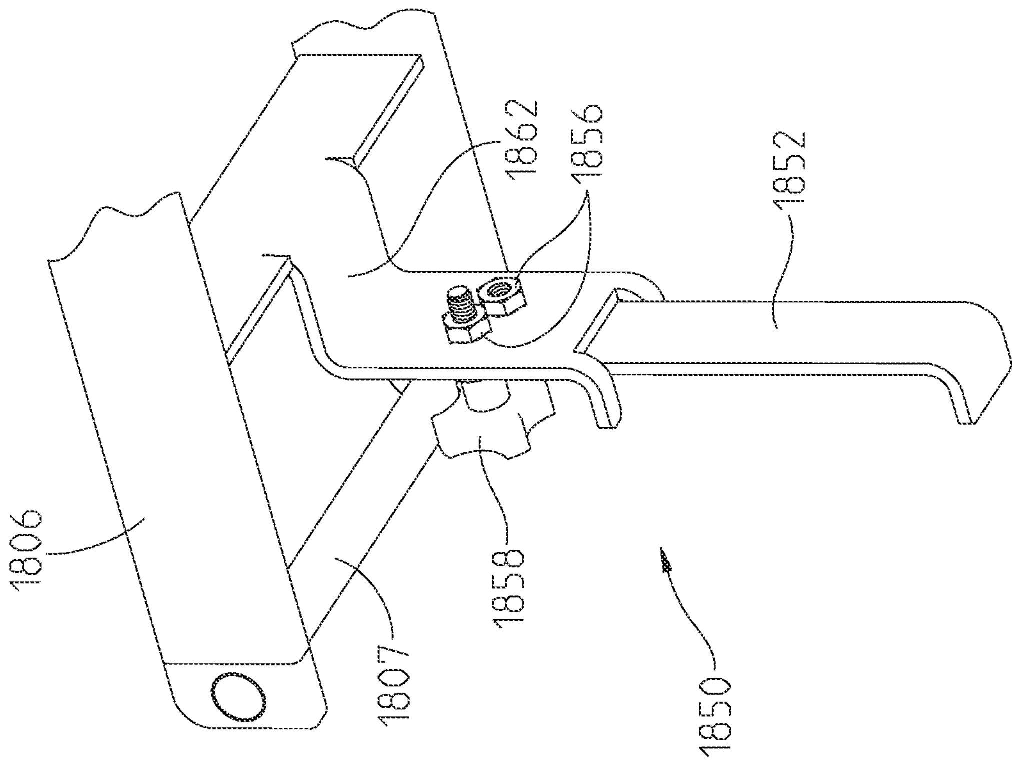
FIG. 62 is another perspective view of the height adjuster assembly shown in FIG. 61.

As the lifting operation progresses from the fully closed configuration of FIG. 58 toward the fully open configuration of FIG. 60, the force assist provided by yoke assembly 120 decreases, but the force assist provided by spring 1824 increases. In particular, as the upstanding portion of distal frame member 1805 tilts backwardly away from the vertical, as shown in FIG. 59, the downward force vector provided by spring 1824 through hinge arm 1818 becomes a larger and larger contributor to the opening assist force, while the rearward force vector also continues to provide some assist. The height and configuration of distal frame member 1805 can be calibrated to achieve the desired balance between these force vectors, as well as the spring constant provided by tension spring 1824. In the illustrated embodiment, and in conjunction with yoke assembly 120, the total assist is calibrated to allow a substantially constant upward force to raise cooking attachment 1810 through its entire range of motion. Similarly, this cooperation of forces may also allow cooking attachment 1810 to be released at any desired intermediate position (i.e., by releasing handle 1807) while retaining cooking attachment at the intermediate position. This retention function may be supplemented with a damper, which may be integrated into yoke assembly 120, for example.

In addition to providing complementary force assist, the counterbalance pivot point defined by pivot bar 1825 passes over the spring pivot point defined by spring traveler 1828, such that spring 1824 provides a slight retention force holding cooking attachment 1810 in the fully open configuration. Referring to FIG. 58, a vertical plane PP passing through the axis of pivot bar 1825 is proximal of a vertical plane PS passing through spring traveler 1828 when cooking attachment 1810 is in the fully closed configuration. As cooking attachment 1810 is opened, vertical plane PP of pivot bar 1825 moves distally, eventually becoming coplanar with vertical plane PS of spring traveler as cooking attachment 1810 approaches the fully opened position as shown in FIG. 59.

At this point, the remaining travel of spring traveler 1828 within slot 1829 can be used to urge cooking attachment 1810 into a fully opened position, shown in FIG. 60. In this fully open position, plane PP defined by pivot bar 1825 is distal of plane PS defined by traveler 1828, but hinge arm 1818 remains oriented to provide both downward and rearward force vectors. In this arrangement, the remaining (i.e., preload) tension in spring 1824 (FIG. 56) serves to hold cooking attachment 1810 in the fully open position unless and until a sufficient counter acting force is applied, such as on handle 1807 (FIG. 52). In this way, counterbalance assembly 1820 allows a user of cooking attachment 1810 to securely retain attachment 1810 in its fully open position while performing operations on griddle 116, such as adding or removing food products, without concern that cooking attachment 1810 can be brought down with anything other than a deliberate closing force on handle 1807.

4. Vertically Adjustable Platen

Turning now to FIGS. 30 and 31, cooking mechanism 500 includes a system for vertical adjustment of a cooking attachment. In the illustrated embodiment, heated product press attachment 510 is used for moveable cooking mechanism 500, though any cooking attachment may be used as required or desired for a particular application, including the attachments described in detail above.

Attached to an upper surface of the illustrated attachment 510 is a proximal mount plate 525A and a distal mount plate 525B, both of which extend laterally across the upper surface (i.e., along a direction perpendicular to the proximal-to-distal direction with respect to the operator). As best shown in FIG. 31, corresponding proximal and distal cross braces 524A and 524B laterally span the distance between the left and right arms of frame 514, and are positioned to align with mount plates 525A and 525B respectively upon assembly. In particular, cross braces 524A, 524B include central apertures flanked by a plurality of threaded fastener holes (such as four such holes, as shown). Mount plates 525A, 525B have corresponding central apertures flanked by a set of corresponding fastener holes, except that the aperture and holes formed in mount plates 525A, 525B are vertically elongated slots as best seen in FIG. 31. Upon assembly of cooking mechanism 500, cam rod 527 is passed through the central apertures, and cams 529 are placed in the elongated central apertures of mount plates 525A and 525B. In the illustrated embodiment, bushings 529A are also placed between cam rod 527 and the respective central apertures formed in cross braces 524A and 524B, in order to allow cam rod 527 to rotate smoothly even when loaded by the weight of attachment 510 and/or forces applied to food items. Spring 530 provides compressive force on the bushings 529A urging such bushings to remain retained within their respective apertures, while avoiding undue compressive friction on cams 529.

Knob 531 is connected to cam rod 527 at its proximal end, such that rotation of knob 531 rotates cam rod 527. Cams 529 are rotatably fixed to cam rod 527, such as by keying and/or set screws or another similar arrangement, such that rotation of knob 531 rotates cams 529 within the elongate hole formed in each respective mount plate 525A and 525B.

As the lobe of each cam 529 rotates, product press attachment 510 is moved upwardly or downwardly depending on the location of the cam lobe within the elongated slot. For example, when the lobes of cams 529 are pointing up, product press attachment 510 is in a raised position. Conversely, when the lobes of cams 529 are pointing down, product press attachment 510 is in a lowered position. At intermediate positions of the lobes of cams 529, product press attachment 510 is in an intermediate position between the raised and lowered positions. Thus, height adjustment of attachment 510 may be effected by rotating cams 529 to any desired rotational position within the elongated apertures formed in cross braces 524A, 524B.

As noted above, elongate slots flank the central aperture for mount plates 525A. 525B, while cross braces 524A, 524B have corresponding threaded apertures. In the illustrated embodiment of FIG. 31, shoulder bolts pass through the elongate slots provided in mount plates 525A, 525B and threadably attach to the aligned threaded holes of cross braces 524A, 524B. This arrangement keeps attachment 510 level with respect to frame assembly 502 as cam rod 527 is rotated.

Figure 33:
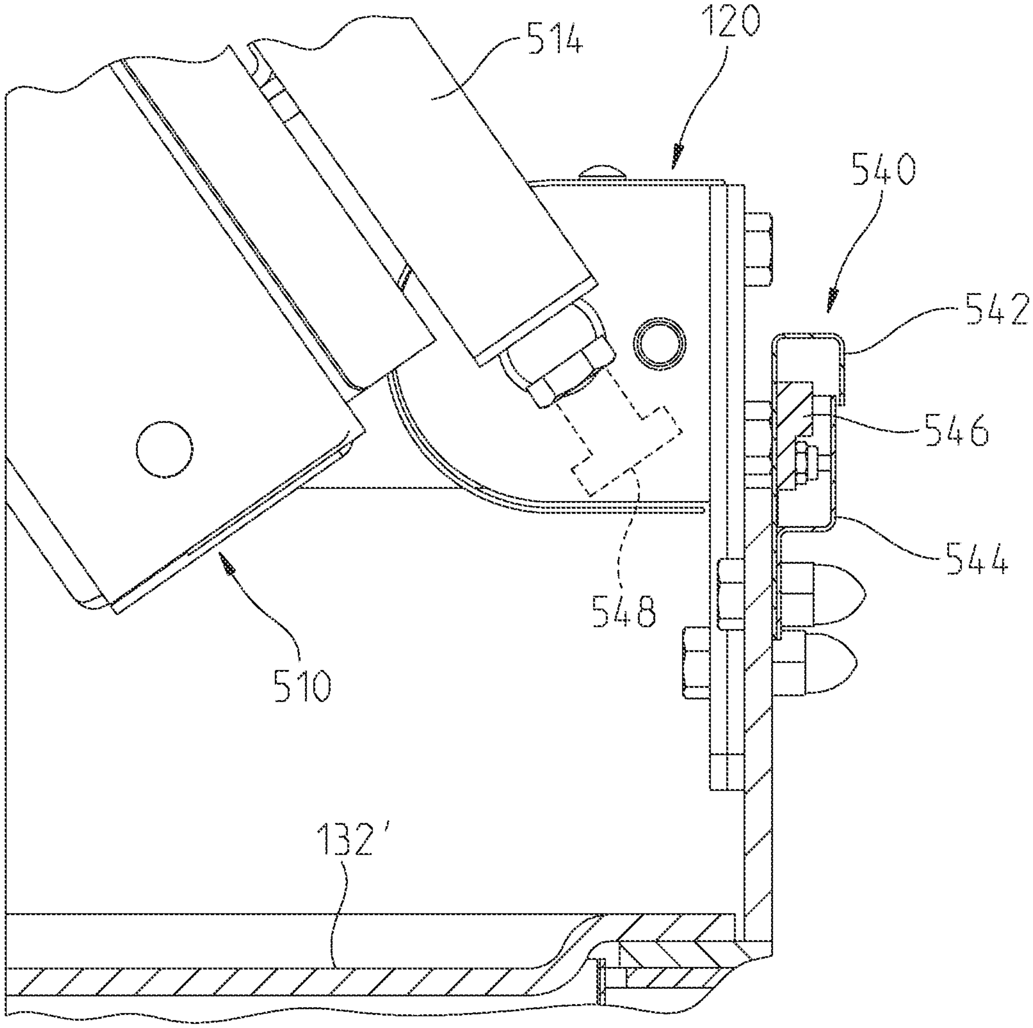
FIG. 33 is another side elevation, enlarged section view of the cooking mechanism shown in FIG. 32, in which the mechanism is in an open configuration.

The height adjustability provided by cams 529 of the associated mechanism shown in FIGS. 30 and 31 allows for precise and repeatable spacing between a cooking attachment, such as attachment 510, and the adjacent cooking surface 132' (see, e.g., FIGS. 36 and 33). This, in turn, allows for selective force application upon any foods contained within the cooking volume formed between the cooking surfaces when cooking mechanism 500 is in the closed position (as shown in FIG. 30). For example, higher forces may be used where shaping of a food product is desired, such as in situations where balled or cylindered meat product is desired to be flattened by application of a precise and repeatable force during the cooking process. On the other hand, for other food products such as veggie burgers, a reduced force may be desired which merely ensures firm, but not shape-altering, contact between the food product and the upper and lower cooking surfaces.

5. Sensing, Control and Locking of Upper Platen

Figure 32:
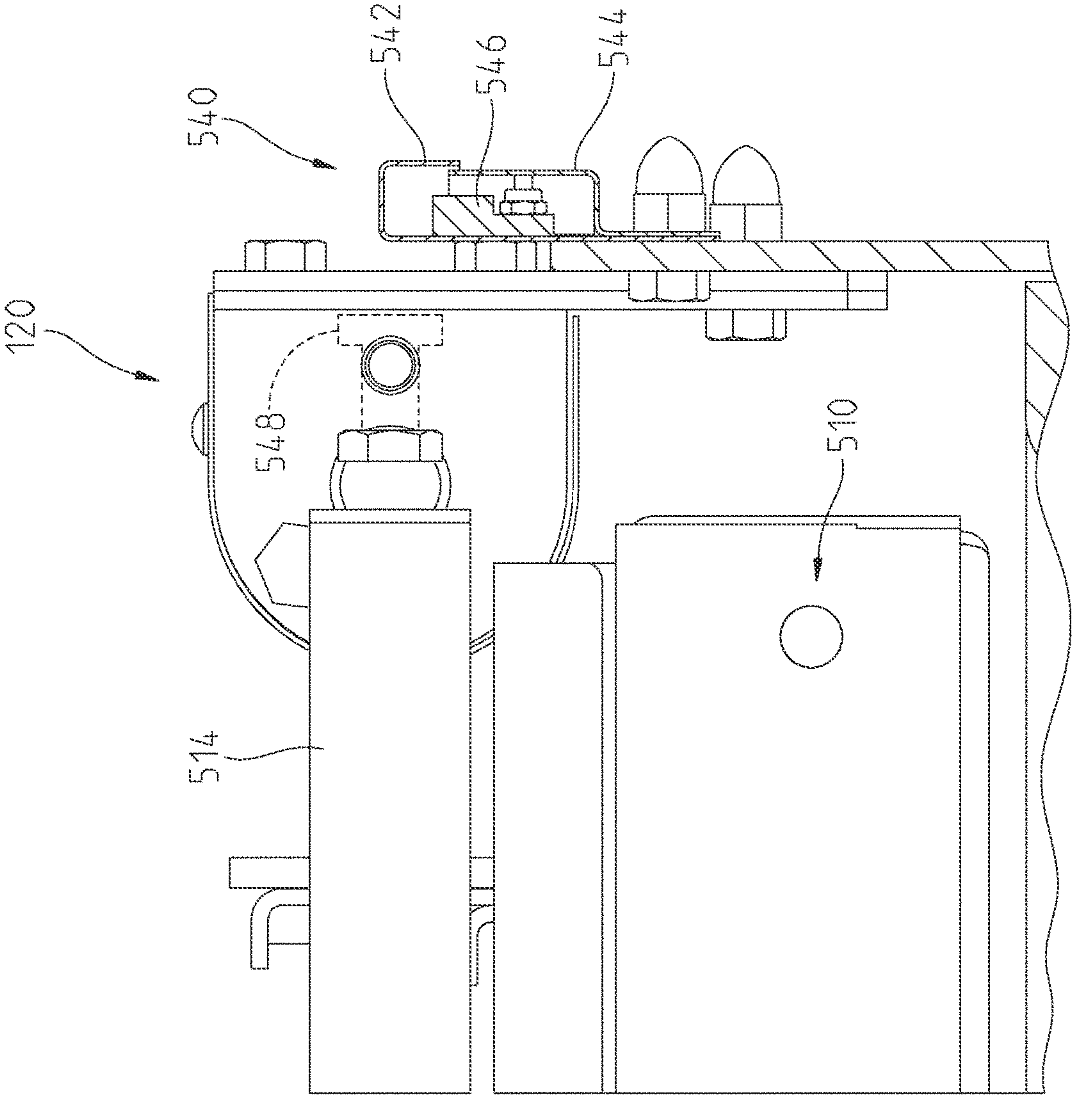
FIG. 32 is a side elevation, section view of a portion of the cooking mechanism of FIG. 30, illustrating a sensor assembly with the mechanism in a closed configuration.

Turning now to FIGS. 30, 32 and 33, lockout switch assembly 540 is shown. As described in detail below, lockout switch assembly 540 is operable to sense whether cooking mechanism 500 is in the closed position (FIG. 32) or the open position (FIG. 33). A signal from lockout switch assembly 540 may be received by a controller and/or an operator to facilitate safe and effective operation of griddle 116'.

As best shown in FIG. 30, lockout switch assembly 540 includes proximal shield 542 and distal shield 544, with a sensor 546 received therebetween. When fully assembled as shown in FIGS. 32 and 33, shields 542, 544 provide an enclosed space which protects sensor 546 from environmental hazards and contaminants. In an exemplary embodiment, sensor 546 is configured to sense the presence or absence of a magnetic field, such as a magnet mounted in the head of bolt 548, within a certain proximity from the sensing surface of sensor 546. Thus, when bolt 548 and its magnet face sensor 546 as frame 514 is lowered into the closed position as shown in FIG. 32, sensor 546 activates and issues a signal indicative of such closed configuration to the controller and/or operator. Alternatively, when bolt 548 and its magnet are out of registration with sensor 546 while frame 514 is pivoted upwardly in the open configuration, as shown in FIG. 33, sensor 546 is deactivated and issues a signal (or the absence of a signal) indicative of the open configuration to the controller and/or operator. In an exemplary embodiment, sensor 546 is a reed switch or other sensor of magnetic fields for noncontact sensing of the presence or absence of bolt 548 and its embedded magnet, though other switch arrangements may be used as required or desired for a particular application. For example, reed switches or other contact switches may also be used in some instances.

Figure 35:
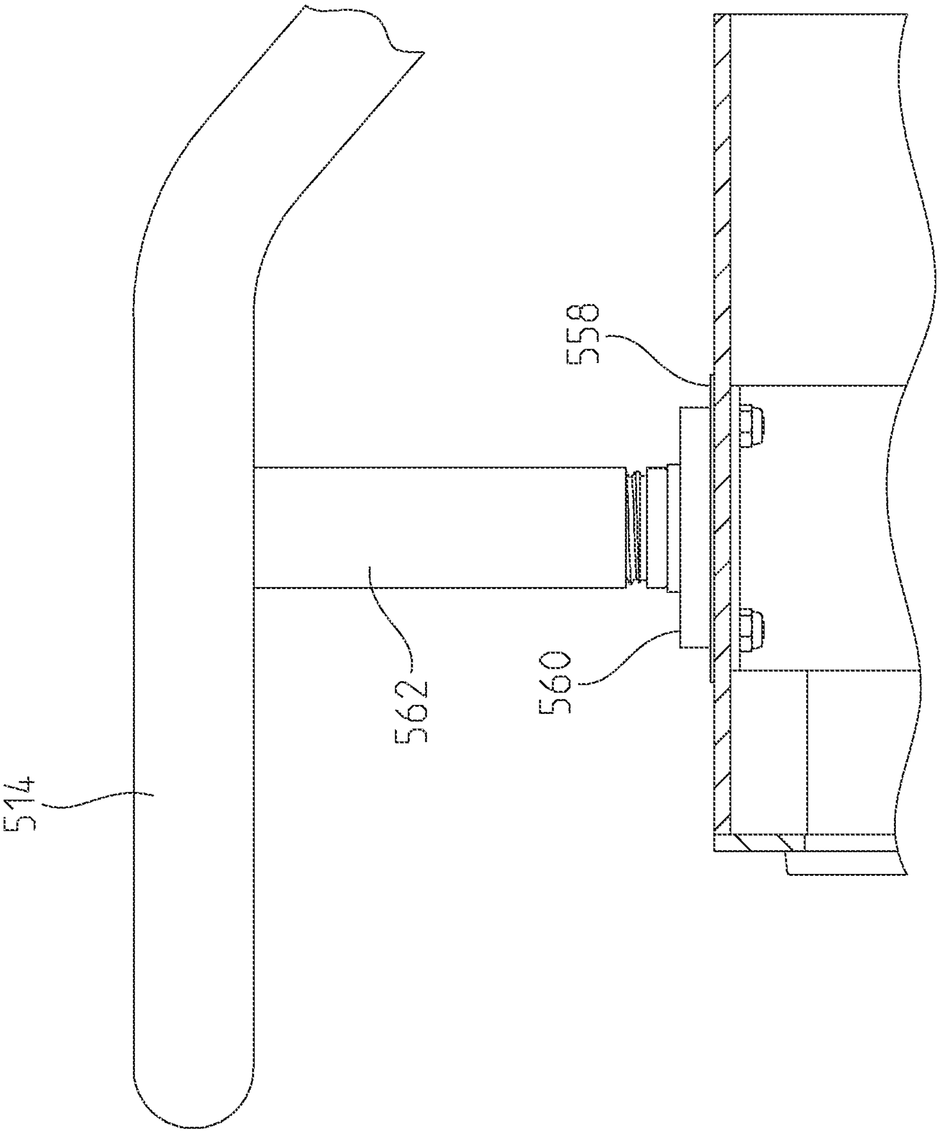
FIG. 35 is a side elevation, section view of a portion of the cooking mechanism shown in FIG. 30, illustrating a timing sensor actuator shown in the activated position when the cooking mechanism is in the closed configuration.

Turning now to FIGS. 34 and 35, timing switch assembly 550 may also be provided in connection with griddle 116' in order to sense when cooking mechanism 500 is fully closed and compressed upon any food items to be cooked, and to retain cooking mechanism is such closed configuration for a predetermined or other desired time. Switch assembly 550 utilizes an electromagnet 552 (FIG. 34) which, when energized, both holds cooking mechanism closed and also activates switch 556. Switch 556 then issues a signal to the controller and/or operator which is indicative of both the energized state of electromagnet 552, and the closed configuration of base frame 502 of cooking mechanism 500.

As shown in FIG. 35, a cross brace 562 may extend between the legs of frame 514 (FIG. 31) and downwardly to a point of attachment with the timing sensor retention plate 560, which is a cylindrical plate or puck made of a ferrous material. In the illustrated embodiment, plate 560 is threadably attached to the upstanding portion of subframe 562 such that plate 560 may be vertically adjusted by threading the attachment upwardly or downwardly. When closed, plate 560 may be magnetically held in place upon cover plate 558 as shown in FIG. 35.

The magnetic attraction force for retaining actuator 560 in its closed position is generated by electromagnet 552, which is retained in position below cover plate 558 by bracket 554. When energized, electromagnet 552 retains plate 560 in place such that a user or operator cannot easily open cooking mechanism 500. Unless and until magnet 552 is deactivated, plate 560 is forcibly retained against cover plate 558 to hold cooking mechanism 500 in its closed position.

During activation of electromagnet 552, a magnetic field is produced which attracts plate 560. When plate 560 descends to the closed and locked position abutting cover plate 558 as shown in FIG. 35, the magnetic field generated by electromagnet 552 becomes concentrated around plate 560. This concentration of the magnetic field also activates reed switch 556, which is mounted to bracket 554 adjacent electromagnet 552. In particular, reed switch 556 has a ferrous actuation arm which is positioned to be drawn into an activated position by the concentrated magnetic field resulting from a combination of two factors: electric actuation of electromagnet 552 and the presence of plate 560 in its closed and locked position upon cover plate 558. In this way, reed switch 556 provides an indication of the combination of these two system conditions, while also remaining in a protected location underneath griddle 116. This indication is issued in the form of a signal from switch 556 that may be received by the controller and/or system operator.

For example, controller 559 (FIG. 34) may regulate cooking time in addition to cooking temperature from one or both of the upper and lower cooking surfaces of griddle 116'. Controller 559 may receive signals from timing switch assembly 550 and/or lockout switch assembly 540, and may issue commands to activate or deactivate heaters 117 or 654, electromagnet 552, or other structures described herein. In one example, an operator may close cooking mechanism 500 by lower base frame 102, at which point controller 559 receives a signal from switch assembly 540 indicative of the closed position. The operator may then issue a command to lock the base frame 102 in the lower position, such as by bringing the lock plate 560 down upon the cover plate 558, causing electromagnet 552 to activate. Controller 559 may confirm such activation by the signal issued from switch 556, and then start a cooking routine. This cooking routine may include setting a timer for a predetermined cooking time. When the timer expires, controller 559 may de-energize electromagnet 552 in order to open or facilitate the opening of cooking mechanism 500. The cooking routine programmed into controller 559 may also include control over the temperature of the cooking surfaces during the cooking operation (e.g., by selectively activating one or more heaters), though such temperature control may also be manual (e.g., through the use of temperature controller 511 shown in in FIG. 30).

Turning now to FIG. 36, latching cooking mechanism 600 includes latch assembly 601 which is operable to use mechanical advantage in producing a downward force upon food items contained between the planar cooking surface 132' of griddle 116' and the adjacent lower surface of the cooking attachment, which in the illustrated embodiment is heated product press attachment 610 described in detail above. The U-shaped frame 602 of cooking mechanism 600 includes a proximal portion 614 having handle 626, which is pivotably connected via pivot joints 605 to respective distal bars 606 which extend from the proximal pivot joints 605 to distal pivot joints at yoke assembly 120 (described in detail above). Proximal frame 614 includes a proximal cross brace 627, which has latch hook 622 extending downwardly therefrom. As best seen in FIG. 36, cross brace 627 includes two lateral cross members separated by a proximal-to-distal gap, with the upper portion of latch hook 622 spanning this gap. A distal cross brace 623 extends laterally between the respective distal bars 606.

Spring guide 621 extends along a proximal-to-distal direction from the proximal cross brace 627 to the distal cross brace 623, as shown in FIG. 36. Spring 629 is captured between distal cross brace 623 and a nut 625 which is at a further distal position. As shown by a comparison of FIGS. 39 and 40, as proximal frame 614 is pivoted downwardly, the head of spring guide 621 is drawn in a proximal direction by proximal cross brace 627. As spring guide 621 moves proximally, spring 629 is compressed between distal cross brace 623 and nut 625. Thus, proximal frame 614 is biased by spring 629 into the open position shown in FIG. 39, and may be moved toward a closed (and latched) position shown in FIG. 40 by pressing downwardly on handle 626 against the biasing force of spring 629.

Figure 39:
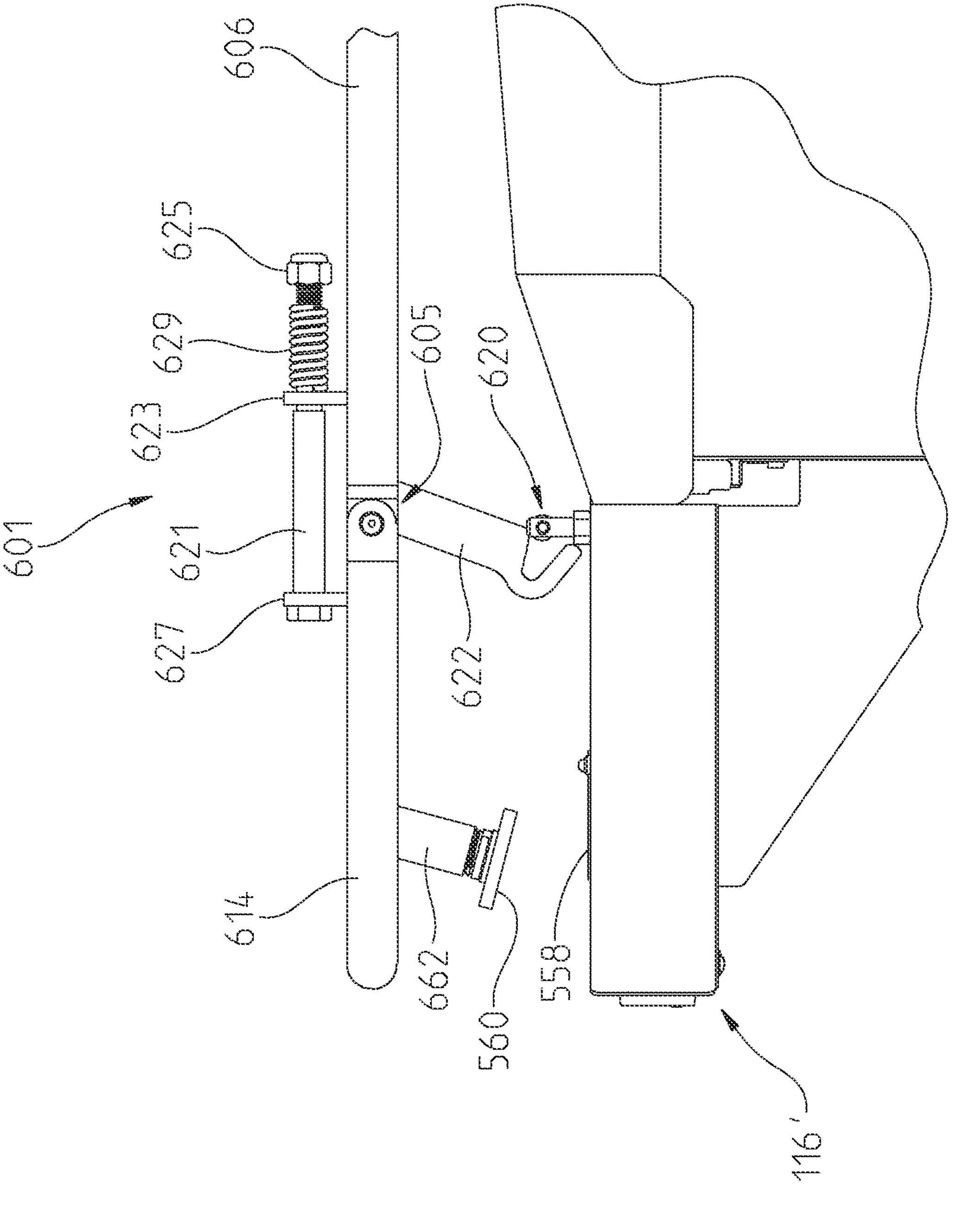
FIG. 39 is a side elevation view of a portion of the latching cooking mechanism shown in FIG. 36, illustrating the latch in an unlatched configuration.
Figure 40:
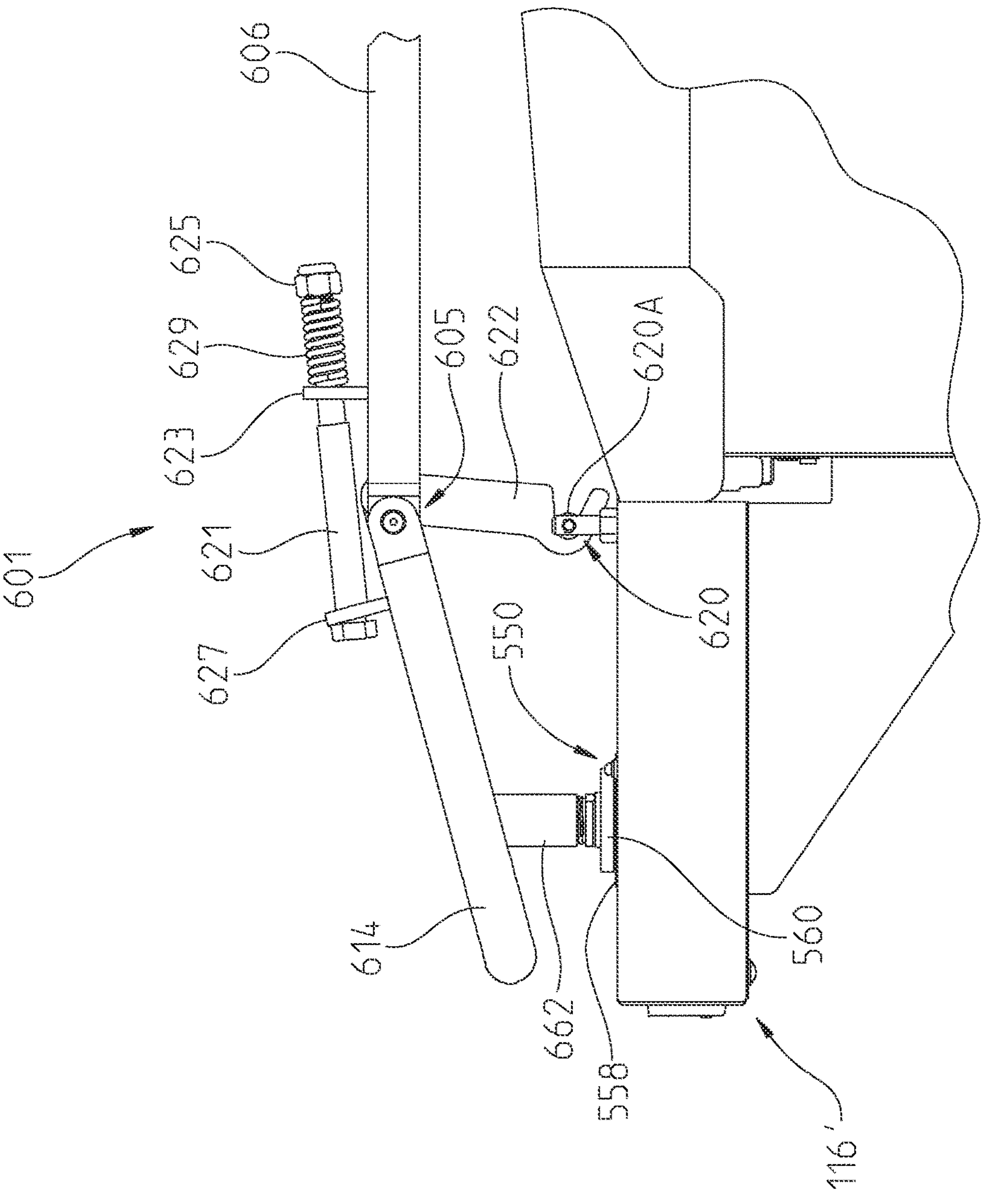
FIG. 40 is a side elevation view of a portion of the latching cooking mechanism shown in FIG. 36, illustrating the latch in a latched configuration.

Attached to the adjacent upper surface of griddle 116' is latch receiver 620, which is illustrated in FIG. 36 as a pair of uprights threadably connected to the upper surface of griddle 116' and a latch pin extending laterally between the uprights. When distal bars 606 are in the closed position. (e.g., substantially parallel with cooking surface 132' as shown in FIGS. 36 and 39), latch hook 622 becomes aligned but not engaged with latch receiver 620. At this point, proximal frame 614 may be pivoted downwardly about pivots 605, thereby engaging latch hook 622 with the latch pin of latch receiver 620, shown as roller 620A in FIG. 40. As this engagement occurs, the lower portion of latch hook 622 draws distal bars 606 downwardly with a mechanical advantage, such that any food items contained between cooking surface 132 and the lower surface of product press attachment 610 are compressed with a force greater than the downward force applied to proximal frame 614 by the operator. When fully latched, latch mechanism 601 defines a closed and locked position in which frame assembly 602 may not be pivoted towards its open configuration unless and until the latch is released (i.e., moved to an unlocked position). Once pushed down fully, proximal frame 614 may also activate timing switch assembly 550 by placing ferrous plate 560 against cover plate 558 and actuating electromagnet 552, as discussed above with respect to FIG. 34.

Turning now to FIGS. 43A-43G, another latching mechanism 1601 is shown in combination with a handle retention assembly 1670. The general function and structure of latching mechanism 1601 is similar to that of mechanism 601 described above, and corresponding structures have corresponding reference numerals, except with 1000 added thereto.

However, latching mechanism 1601 includes an enhanced pivot structure and related components which provide enhanced leverage and greater latching security. As described in further detail below, latch plate 1622 pivots about pivot pin 1638 through a range of motion independent of proximal frame 1614 (FIG. 43E), which pivots about pivot joint 1605 (FIGS. 43A and 43B) the resulting offset between these two pivots confers an additional mechanical advantage upon latch plate 1622 which allows it to forcefully engage with latch receiver 1620, as shown in FIG. 43B, providing a downward force on press attachment 610 larger than the downward force placed upon handle 1626 by the operator (FIG. 43F).

Figure 43D:
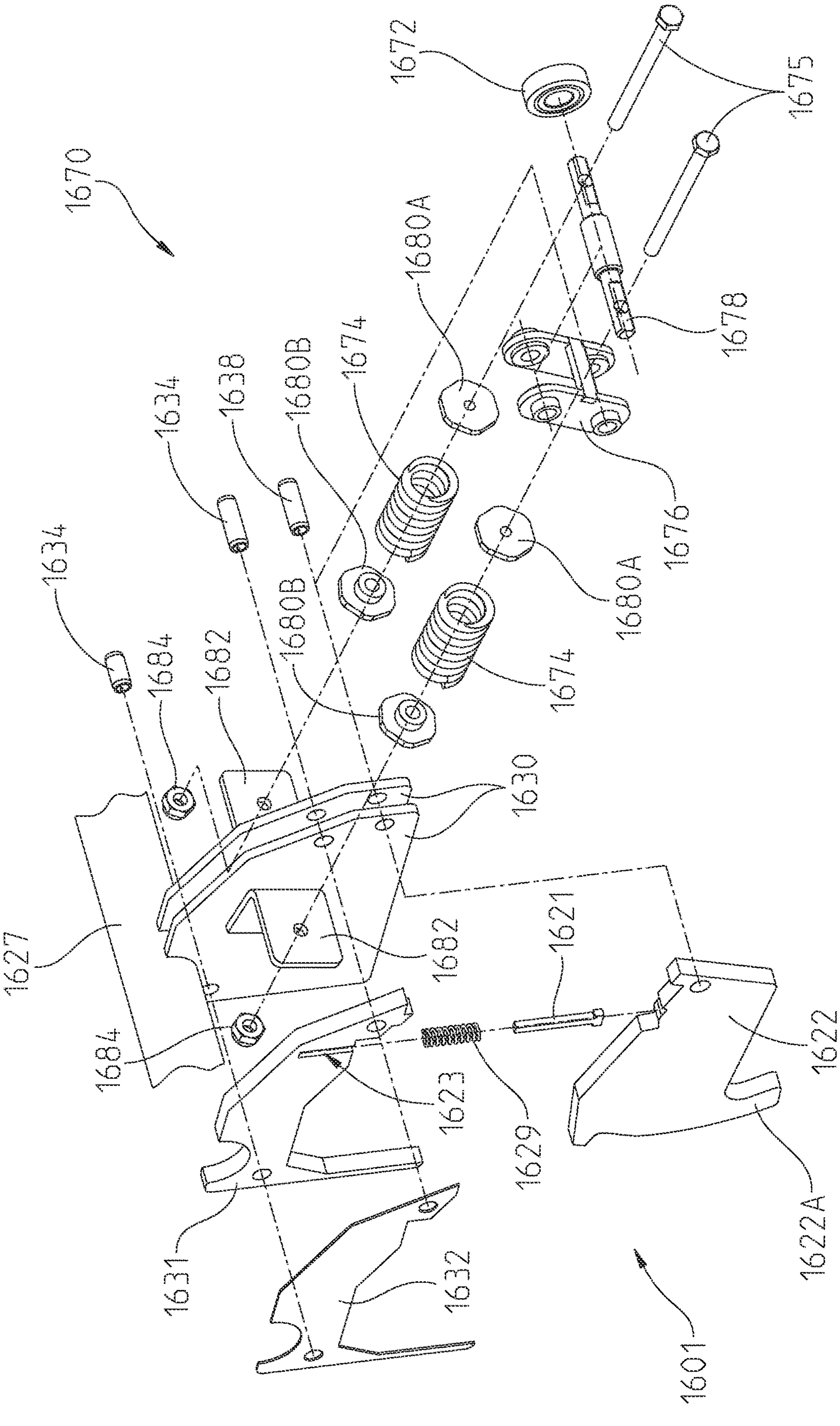
FIG. 43D is a perspective, exploded view of the latch assembly and handle retention assembly shown in FIG. 43C.
Figure 43E:
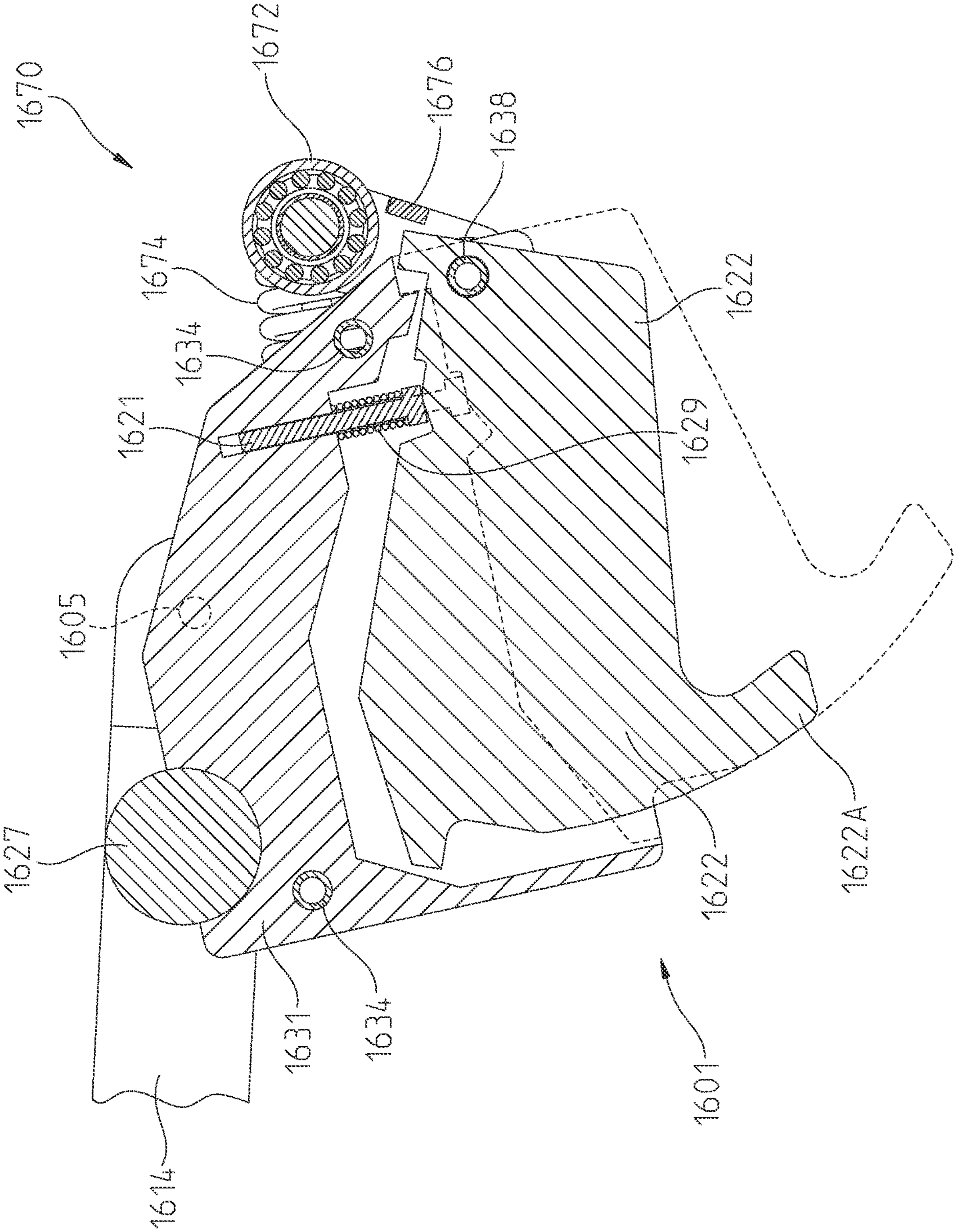
FIG. 43E is a side elevation, section view of the latch assembly and handle retention assembly shown in FIG. 43C.
Figure 43F:
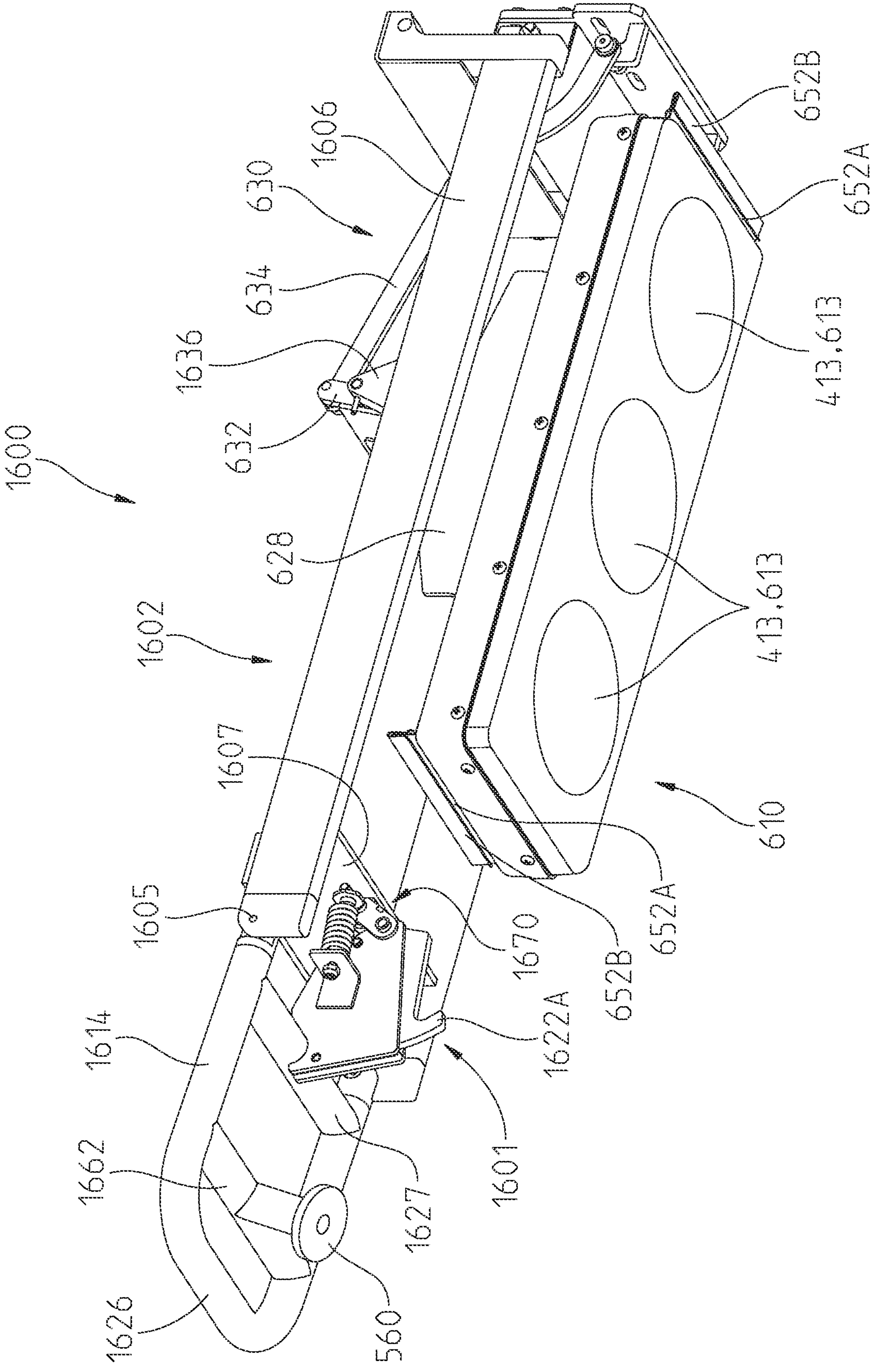
FIG. 43F is a perspective view of the latching cooking mechanism shown in FIG. 43A.
Figure 43G:
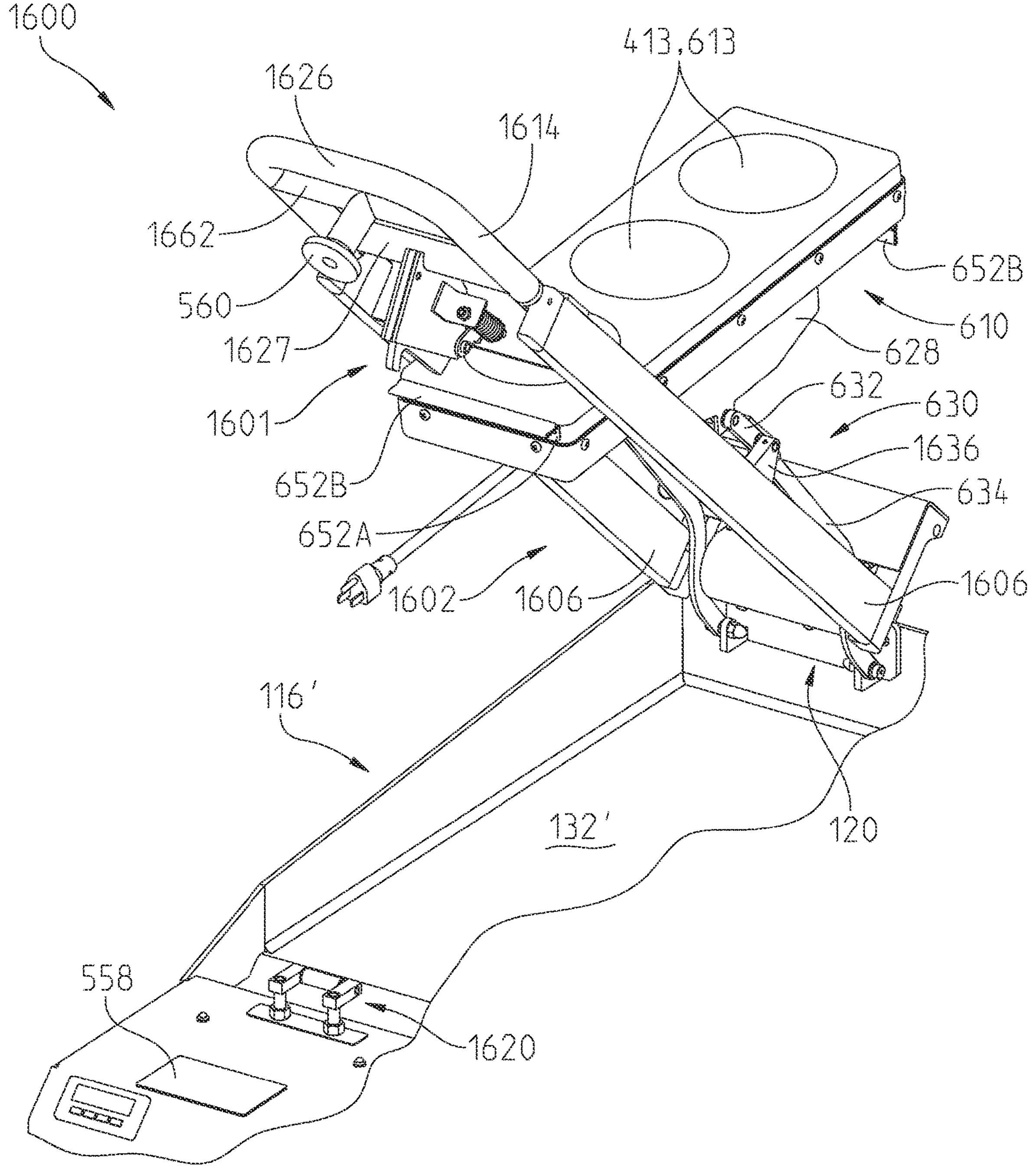
FIG. 43G is another perspective view of the latching cooking mechanism shown in FIG. 43F, in which the cooking mechanism is connected to a griddle and its cooking attachment is pivoted into a maintenance position.

FIGS. 43D and 43E illustrate the arrangement of the components of latch assembly 1601. As illustrated, an immobile frame is created by a pair of latch frame plates 1630 connected (e.g., by welding) to proximal cross brace 1627 of frame 1614 (FIG. 43F) a center frame plate 1631 is sandwiched between the latch frame plates 1630 together with a spring retainer plate 1632, and these components are fixed to one another by a pair of retainer pins 1634. Center frame plate 1631 includes pin slot 1623 which is sized to slidingly receive spring pin 1621. As best shown in FIG. 43E, spring pin 1621 is biased downwardly by spring 1629, and bears upon an upper surface of latch plate 1622. Thus, spring 1629 and spring pin 1621 cooperate to urge latch plate 1622 into a downward position adapted for initial contact with latch receiver 1620, as shown in FIG. 43A. In particular, latch plate 1622 contacts roller 1620A of latch receiver 1620, which provides a low-friction interface capable of facilitating relative motion of latch plate 1622 relative to latch receiver 1620 during operation of the latching mechanism, even with substantial forces therebetween as may arise from high latching pressures (as described below).

From the point of initial contact shown in FIG. 43A, further downward pressure on handle 1626 urges latch plate 1622 upwardly against the biasing force of spring 1629. As this upward movement occurs, the point of contact between latch receiver 1620 and latch plate 1622 moves towards latch hook 1622A. During this downward pressure which compresses spring 29, frame 1614 does not pivot about pivot joint 1605 and instead remains aligned with a distal portion of the frame, specifically distal bar 1606, as shown in FIG. 43A. As described in further detail below, this retained alignment results from handle retention assembly 1670, which prevents pivoting of proximal frame 1614 about pivot joint 1605 until a larger, threshold force is applied to handle 1626.

Upon application of a sufficient force to completely close latching cooking mechanism 1600 as shown in FIG. 43B, proximal frame 1614 pivots downwardly about pivot joint 1605. As shown in FIG. 43E, pivot joint 1605 is proximal of pivot pin 1638 but distal of the connection between proximal frame 1614 and latch assembly 1601, which is at the interface between cross brace 1627 and latch frame plates 1630 and center frame plate 1631 as noted above. This arrangement confers a mechanical advantage upon latch plate 1622, such that a reduced operator effort upon handle 1626 can result in a large latching force provided by latch assembly 1601. In addition, the downward force required to compress food product contained on cooking surface 132' (FIG. 43G) is also reduced by the interaction between latch hook 1622A and latch receiver 1620. These two components bear upon one another downward pressure is applied on handle 1626, as shown in FIG. 43B. Food that is contained below the lower surface of product press attachment 1610 may need to be compressed to fully close latch mechanism 1601, such as burger patties being compressed under domed press plates 413 and/or 613 in the illustrated embodiment. The user can compress the food items contained under domed press plates 413 and/or 613 with less force than would otherwise be required because of the mechanical advantage conferred by latch mechanism 1601, which converts a given movement of handle 1626 into a smaller movement of frame 1602 via the interaction of latch hook 1622A and latch receiver 1620, in view of the distance between the frame pivot 1605 and the latch plate pivot 1638 as described above. This, in turn, protects the user from fatigue and injury.

As noted above, latching cooking mechanism 1600 includes handle retention assembly 1670 which complements the function of latch assembly 1601 by keeping proximal frame 1614 aligned with the rest frame 1602. i.e., longitudinally aligned with distal bars 1606, during the initial lowering of latching cooking mechanism 1600 into a cooking position, which may also include initial compression of food items contained therein.

The components and construction of handle retention assembly 1670 are best shown in FIGS. 43C and 43D. Compression springs 1674 bias bearing 1672 in a generally distal direction, such that bearing 1672 is urged to engage with detent 1671 formed in cross brace 1607, which is attached at respective ends to each of the distal bars 1606. For bearing 1672 to be dislodged from detent 1671, springs 1674 must be compressed as shown in FIG. 43B.

In the illustrated embodiment, springs 1674 are anchored to proximal frame 1614 via anchor brackets 1682 fixed (i.e., by welding) to latch frame plates 1630. Springs 1674 engage anchor brackets 1682 via spring plate 1680B. At the other end of springs 1674, a corresponding threaded spring plate 1680A transmits spring force to bearing pin 1678, and therefore to bearing 1672. Bearing pin 1678, in turn, passes through a set of upper apertures formed in pivot arm 1676, with the lower apertures thereof pivotably connected to latch frame plates 1630 and center frame plate 1631 via the same pivot pin 1638 about which latch plate 1622 pivots. Bearing 1672 is rotatably supported upon bearing pin 1678. Springs 1674 are respectively retained by a threaded spring pin or screw 1675, which passes through an aperture formed in bearing pin 1678 and is threadably secured at bearing pin 1678 by spring plate 1680A. Each spring screw 1675 also passes through an aperture formed in anchor bracket 1682 and is held in place, e.g., for assembly, by a nut 1684 (FIG. 43D).

When proximal frame 1614 is in its up and open position, and therefore aligned with distal bar 1606 as shown in FIG. 43A, bearing 1672 aligns with detent 1671 and springs 1674 rotate pivot arm 1676 about pivot pin 1638 to push bearing 1672 into detent 1671. In this configuration, the outer race of bearing 1672 engages the outer limits of detent 1671, effectively locking pivot joint 1605. That is, upward and downward forces applied to handle 1626 will raise and lower latching cooking mechanism 1600 about its distal pivot at yoke assembly 120 (FIG. 43G), rather than actuated pivot joint 1605. Even when fully closed, as noted above, downward pressure on handle 1626 actuates latch assembly 1601 before handle retention assembly 1670, because the force of actuation resisted by spring 1629 (FIG. 43E) and any initial compression of food items contained under press attachment 610 are still not sufficient to overcome the biasing force of springs 1674 urging bearings 1672 to remain seated within detent 1671. Once further additional downward pressure on handle 1626 overcomes the biasing force of springs 1674, bearing 1672 is allowed to roll out of detent 1671 and ascend the interface of cross brace 1607, as shown in FIG. 43B.

Advantageously, handle retention assembly 1670 allows all downward force applied to handle 1626, up to a certain threshold, to be applied solely to the actuation of latch assembly 1601 and the initial compression of any food items contained under press attachment 1610. Only when the force threshold is reached does handle retention assembly 1670 actuate and allow pivoting of proximal frame 1614 about pivot joint 1605. When such pivoting occurs, latch assembly 1601 actuates as described above and confers a mechanical advantage for further compression of the food items and latching of latching mechanism 1601 in to the closed-locked position. At this point, ferrous puck 560 may become locked to plate 558 via electromagnet 552, as discussed above.

Figure 43H:
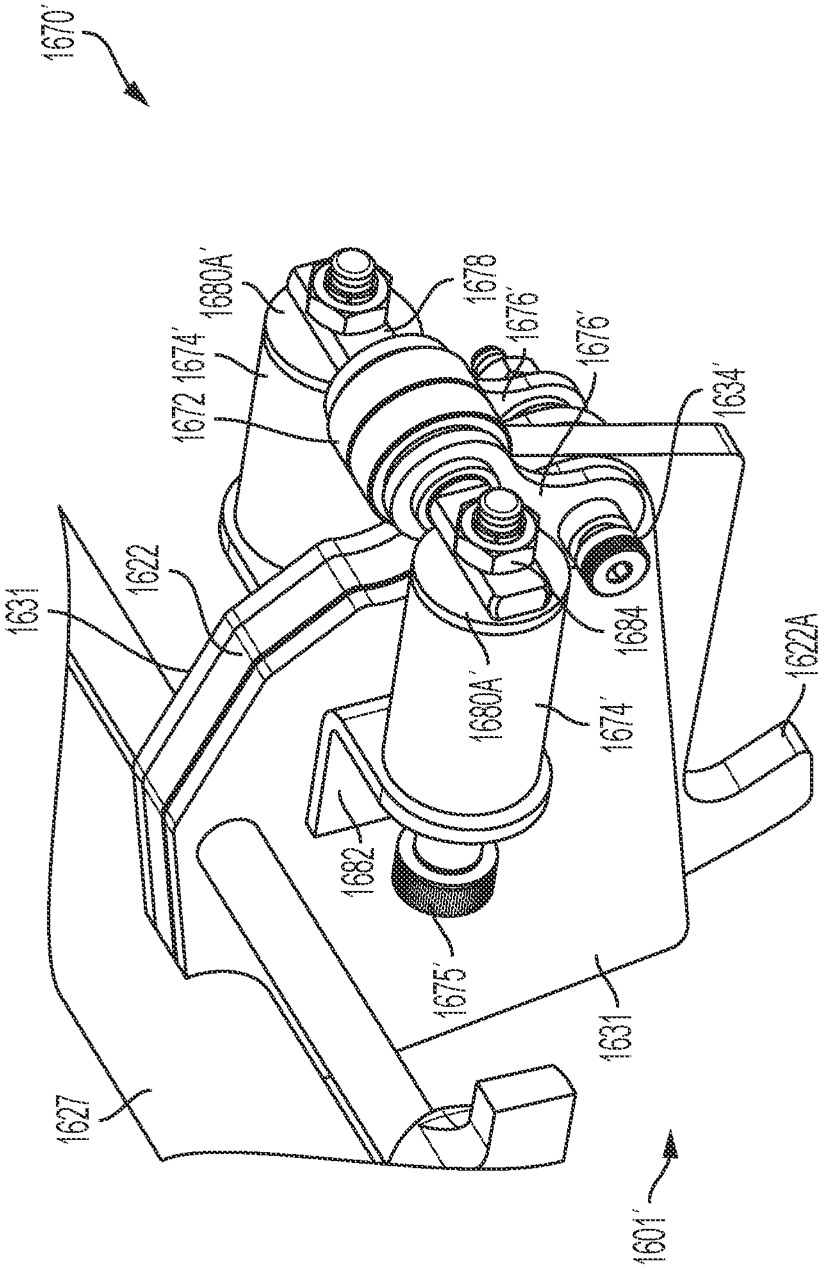
FIG. 43H is a perspective view of a portion of a further latching cooking mechanism made in accordance with the present disclosure.
Figure 43I:
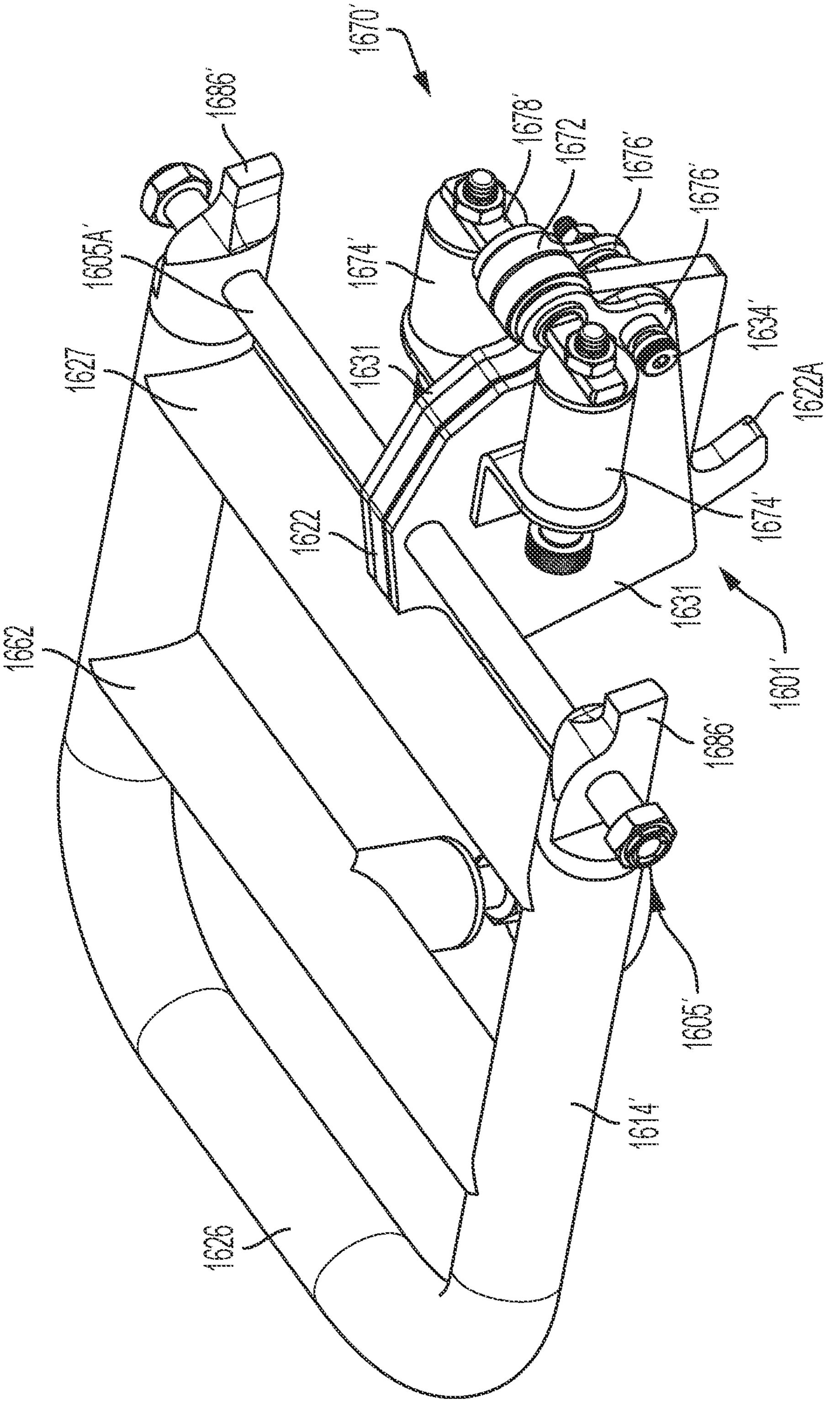
FIG. 43I is another perspective view the latching cooking mechanism shown in FIG. 43H.

Turning to FIGS. 43H and 43I, an alternative handle retention assembly 1670' and latch assembly 1601' are shown. Assemblies 1601' and 1670' are substantially similar to assemblies 1601 and 1670 described above, with reference numerals of assemblies 1601' and 1670' analogous to the reference numerals used in assemblies 1601 and 1670, except with a prime or “'” added thereto.

However, latch assembly 1601' and handle retention assembly 1670' includes streamlined and enhanced components which improve function and reduce cost. Referring first to FIG. 43H, latch assembly 1601' substitutes elastomeric springs 1674' for coil springs 1674 shown in FIGS. 43C and 43D. Elastomeric springs 1674', which may be urethane die springs defining a durometer appropriate to the application, are less likely to trap moisture or grease, are easier to clean, and are less likely to corrode in the challenging environment of commercial kitchens. Springs 1674' may each bear directly upon anchor brackets 1682 at one end, eliminating the need for spring plate 1680B (FIG. 43D), leaving only a modified spring plate 1680A' (FIG. 43H) needed for the opposing end of each spring 1674'.

Springs 1674' are fixed within the larger assembly 1601' by modified bolt 1675', which may include a knurled head which facilitates guiding of each tension of spring 1674' between anchor bracket 1682 and spring plate 1680A'. Jamb nut 1684 is placed at the distal side of assembly 1601' to lock the bolt 1675' by the user.

A pair of pivot arms 1676' is provided in place of the single, welded pivot arm assembly 1676 of assembly 1601 (FIG. 43D). Pivot arms 1676' are made from plate material (e.g., steel) which may be stamped or laser cut for reduced costs. Additionally, pivot arms 1676' are formed in a “FIG. 8” shape which lacks sharp corners, facilitating cleaning of assembly 1601' and preventing grease buildup. Retainer pin 1634' includes a knurled head to facilitate disassembly and reassembly for cleaning procedures.

The basic shape and function of the remaining components of assembly 1601', including center frame plate 1631 and latch plate 1622, are unchanged in the embodiment of FIG. 43H as compared to the embodiment of FIGS. 43C and 43D described above.

Turning now to FIG. 43I, proximal frame 1614' is also modified relative to frame 1614 described above. While frame 1614' includes handle 1626, subframe 1662 and cross brace 1627 that may be identical to their counterparts in frame 1614, pivot joint 1605' includes modifications for enhanced function and strength. In particular, pivot joint 1605' is effected by a crossbar 1605A' extending across the width of frame 1614', rather than a pair of pins for frame 1614. Crossbar 1605A' provides increased strength of alignment for frame 1614' along the pivot axis. In addition, an anti-rotation boss 1686' is added to the hinge end of frame 1614' to avoid pinch points and provide a more robust interface for preventing rotation beyond its nominal, intended range of pivoting motion.

6. Other Features

Figure 41:
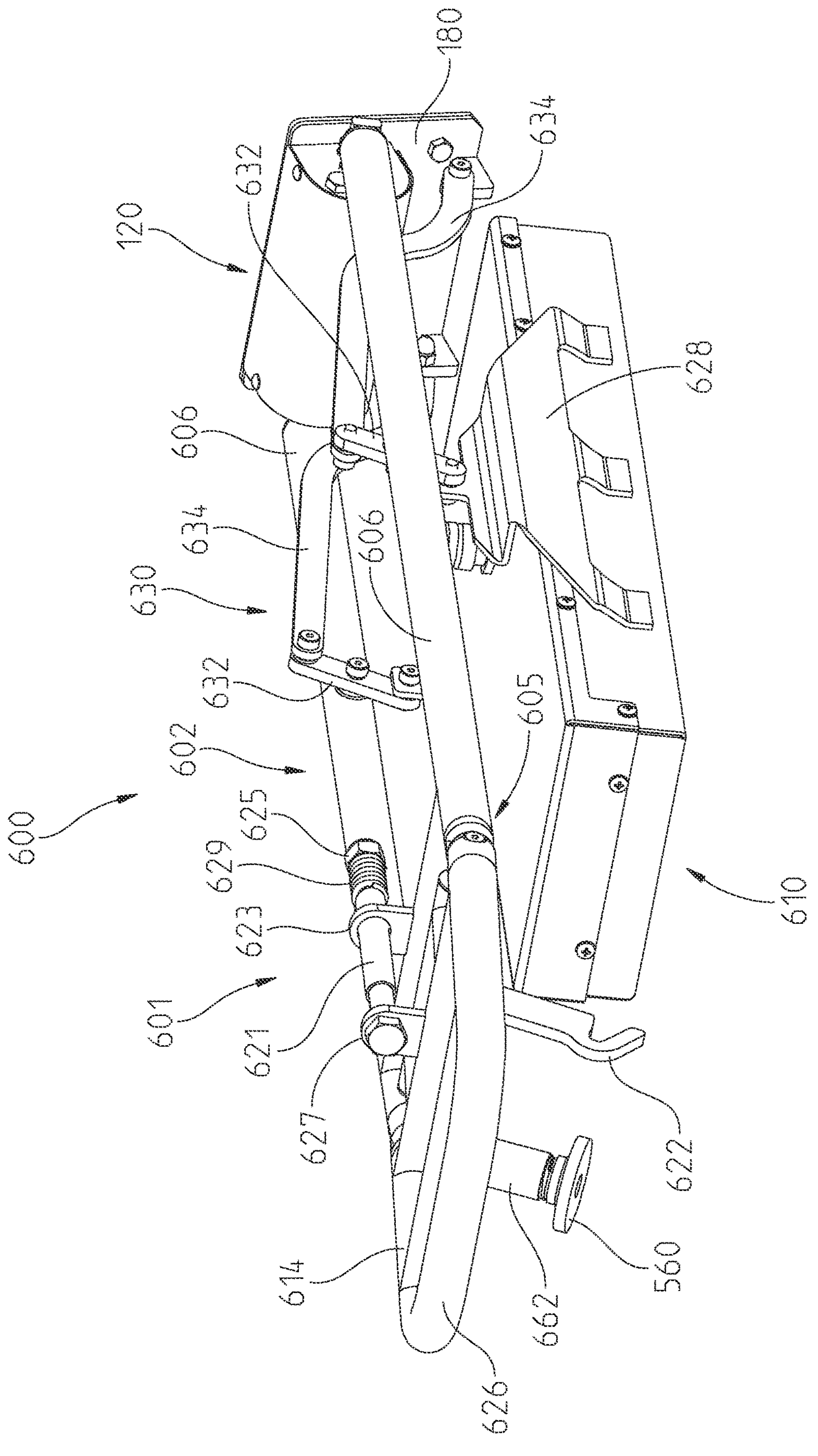
FIG. 41 is a perspective view of another latching cooking mechanism of the present disclosure, which further includes a pullback assembly.
Figure 42:
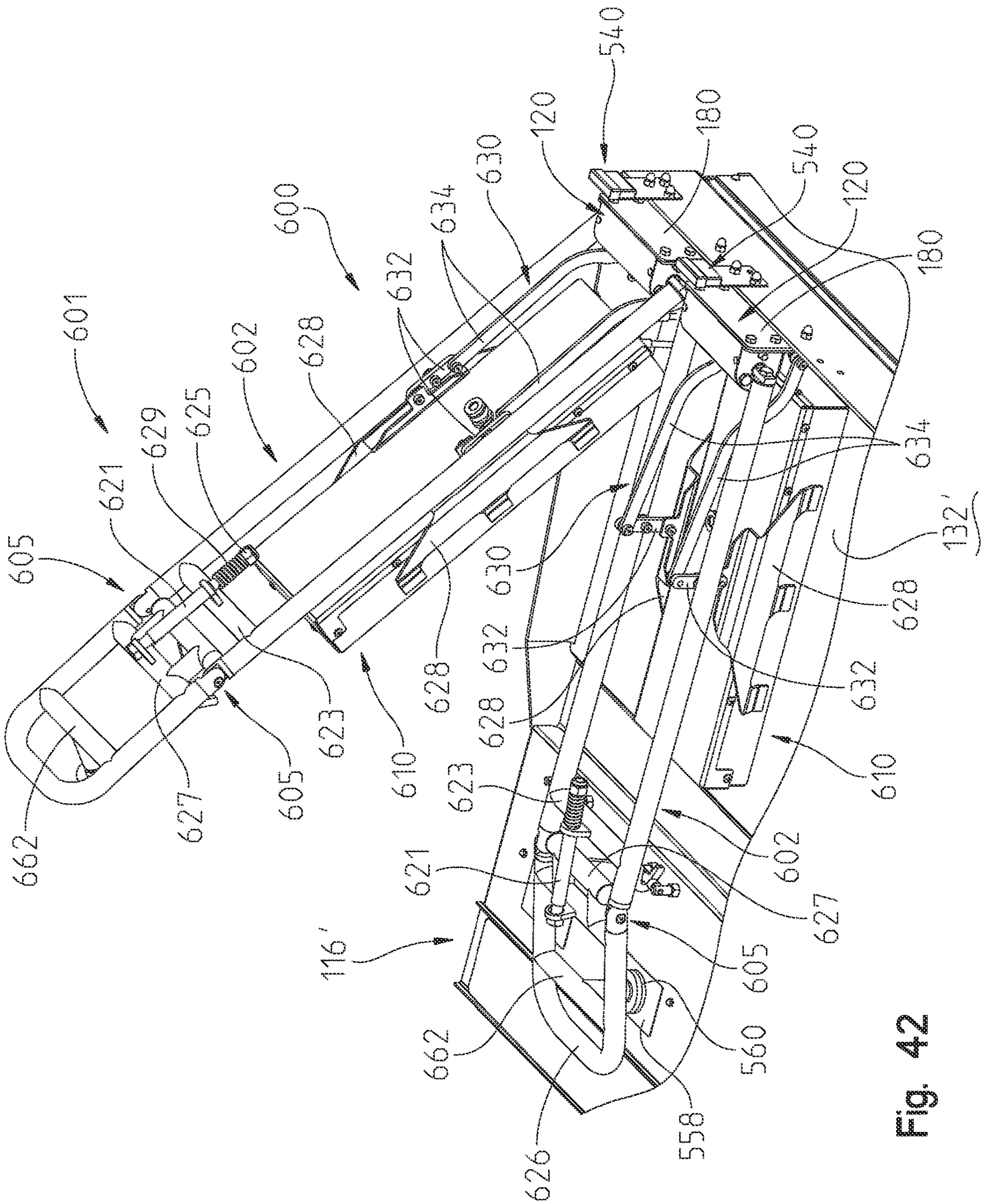
FIG. 42 is a perspective view of a griddle having a pair of the latching cooking mechanisms shown in FIG. 41 attached thereto.

FIGS. 41 and 42 illustrate latching cooking mechanism 600 with an additional feature operably disposed between distal bars 606 and base plate 180 of yoke assembly 120. Pullback assembly 630 is operable to prevent excessive downward pivoting of product press attachment 610 when cooking mechanism 600 is in the fully open position (shown at right in FIG. 42), while also allowing for attachment 610 to freely pivot when cooking mechanism 600 is in or near the closed position (shown at left in FIG. 42).

In the embodiment of FIG. 36, heated product press attachment 610 is connected to frame 602 at a pivot connection between uprights 628 and bars 606. In the illustrated embodiment of FIGS. 41 through 43, by contrast, this pivot connection is formed at the junction between uprights 628 and lower ends of the respective left and right pivot links 632 of pullback assembly 630, which are below bars 606 and below the hinge formed at yoke assembly 120 when base frame 602 is closed. A middle portion of each pivot link 632 is then pivotably joined to a respective distal bar 606 to form a central pivot. The opposing (upper) end of each pivot link 632 is connected to a respective pullback link 634 above the hinge formed at yoke assembly 120 when base frame 602 is closed. Pullback link 634 extends distally and downwardly to a distal pivot connection at a lower edge of base plate 180 of yoke assembly 120, below the hinge formed by yoke assembly 120.

When in the closed configuration shown in FIGS. 42 and 43, product press attachment 610 is free to pivot within a limited range of motion with respect to frame 602, similar to other pivotable attachments described herein. However, as frame 602 is lifted to the open configuration in which the lower surface of product press attachment 610 is drawn away from cooking surface 132', pullback link 634 rotates pivot link 632 about the connection at distal bar 606, which in turn draws attachment 610 upwardly toward distal bars 606. This upward movement, in turn, reduces the rotational range of attachment 610 with respect to frame 602. In particular, rotational stops are engaged after a lesser amount of rotation when attachment 610 is drawn up toward bars 606, as compared to a larger permitted rotation when attachment 610 is lowered. In the illustrated embodiment, contact between uprights 628 and the adjacent distal bars 606 is the relevant rotational stop, though other cooking attachments may have other structures which operate as a rotational stop.

In this way, pullback assembly 630 holds product press attachment 610 in a "more open." less downwardly-rotated configuration than would otherwise be the case when cooking mechanism 600 is pivoted to the fully open position. That is, the angle formed between the lower surface of product press attachment 610 and cooking surface 132 is increased by pullback assembly 630 because of its action in limiting the downward rotation of the distal portion of press attachment 610 when cooking mechanism 600 is fully open. This, in turn, creates additional space for operators to access cooking surface 132' and preform any other needed tasks underneath product press attachment 610 when in the open position.

Figure 44:
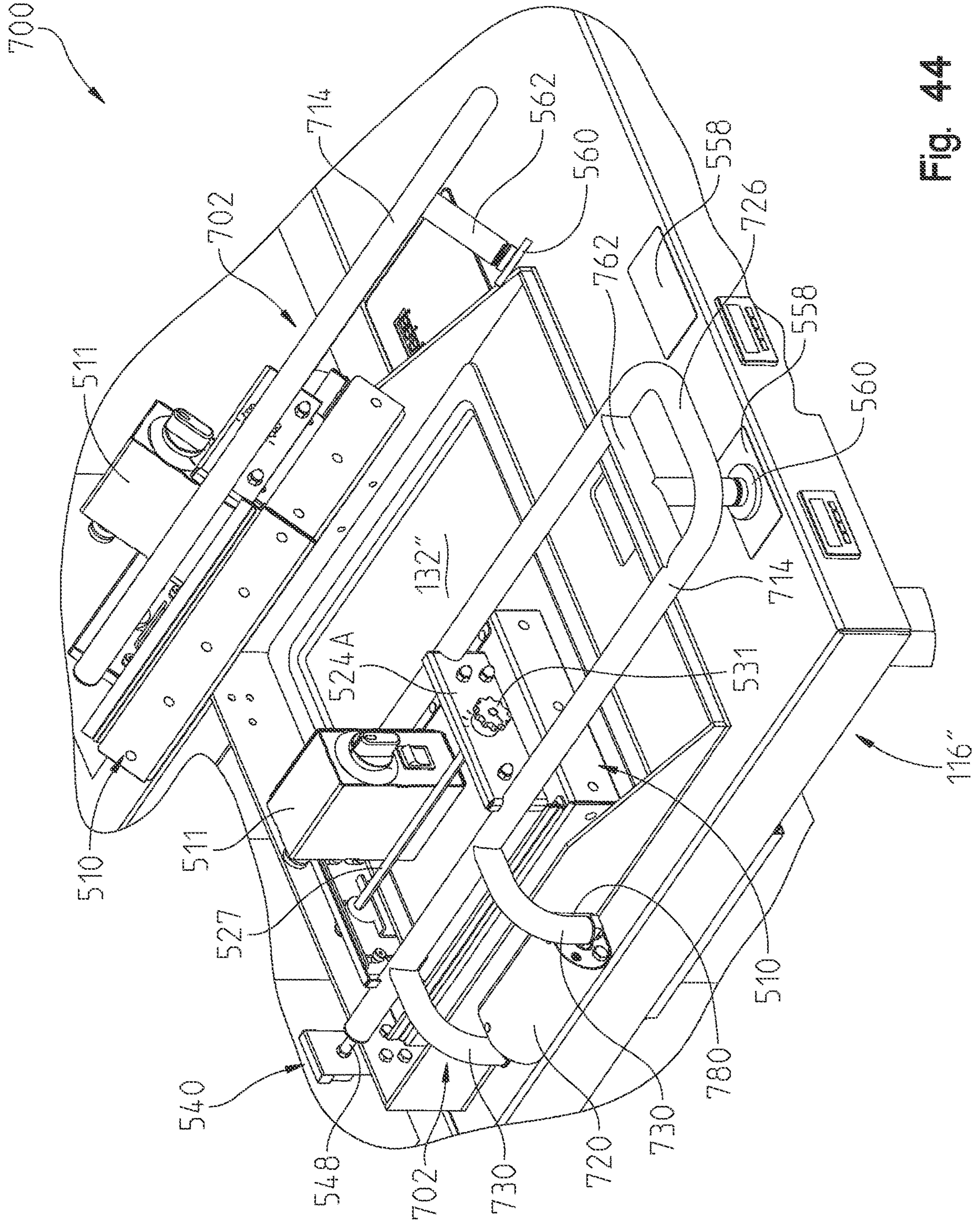
FIG. 44 is a perspective view of another griddle with side-hinged cooking mechanisms of the present disclosure attached thereto.
Figure 45:
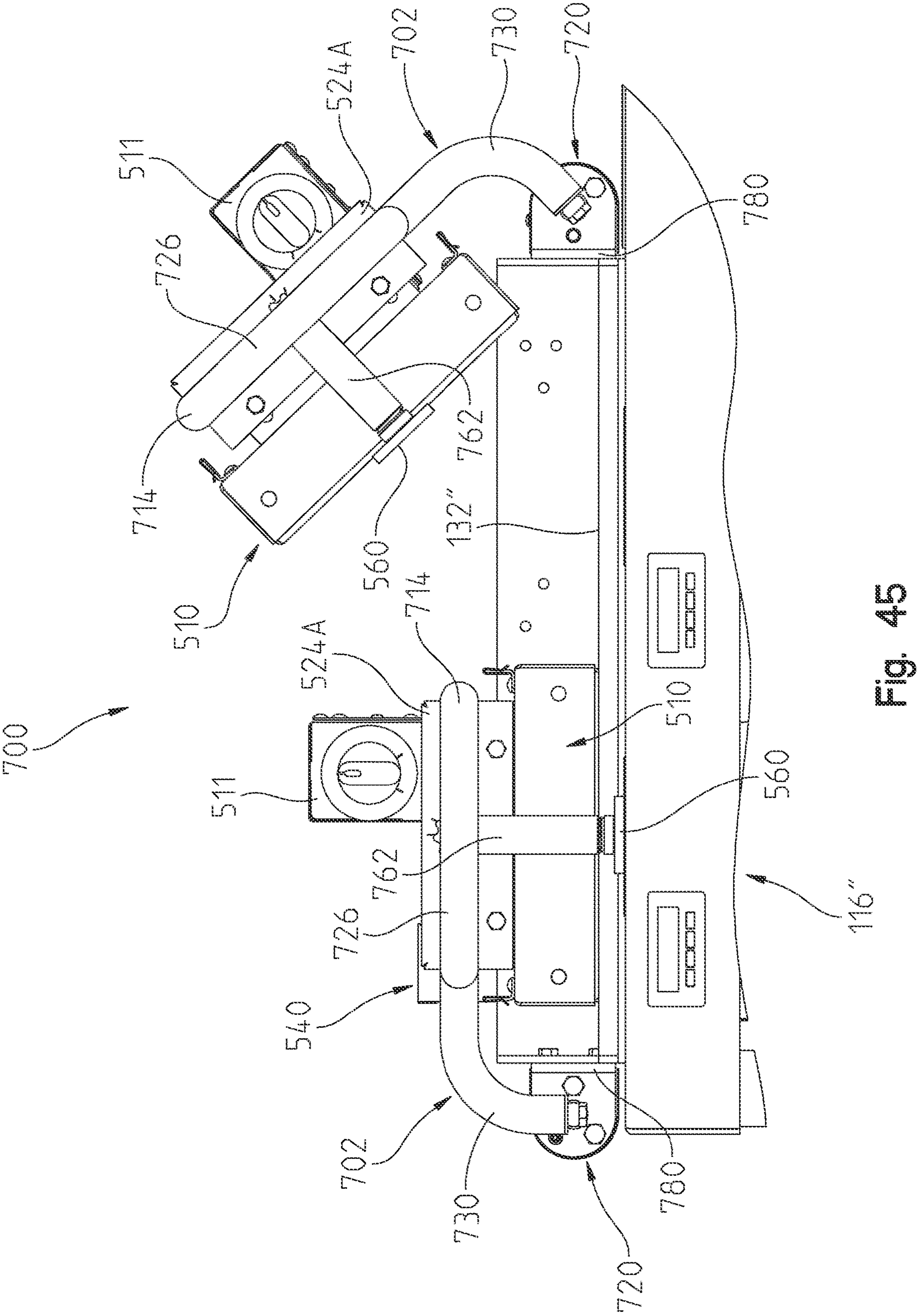
FIG. 45 is a front elevation view of the griddle and side-hinged cooking mechanisms shown in FIG. 44.

Turning now to FIGS. 44 and 45, side-hinged cooking mechanism 700 is illustrated with respect to griddle 116". Griddle 116" is similar to Griddle 116', with corresponding reference numerals being common among corresponding components of the two assemblies. However, griddle 116" includes provisions for yoke assemblies 720 mounted along the sides of cooking surface 132", rather than at the back of cooking surface 132 and 132' as described above with respect to yoke assembly 120. Moreover, yoke assemblies 120 and 720 are generally identical, except the attachment plate 780 of yoke assembly 720 is modified to attach to the side surface of griddle 116" as shown in FIGS. 44 and 45, rather than the back surface as described above with respect to alternative embodiments of the present disclosure.

Side-hinged cooking mechanisms 700 are also generally similar to their rear-hinged counterparts described herein, with corresponding reference numerals pertinent to corresponding parts. In the illustrated embodiment, product press attachment 510 is movably attached to side-hinged frame 702 in the same manner as described above with respect to cooking mechanism 500, with knob 531 used to create vertical adjustment of the cooking surface of press attachment 510 with respect to cooking surface 132". In addition, subframe 762 is provided for attachment of ferrous plate 560 for use in connection with timing switch assembly 550 (FIG. 30).

However, side-hinged frame 702 includes lateral handle extensions 730 which attach to respected sides of yoke assembly 720 as best shown in FIG. 44. Thus, when a lifting force is applied to handle 726 of frame 702, product press attachment 510 pivots upwardly about a proximal-to-distal pivot axis rather than the lateral (i.e., left-to-right) axis associated with rear-hinged arrangements. To facilitate this attachment between frame 702 and yoke assembly 720, lateral handle extensions 730 include a bend, such as about a 90° bend, which extends over the side wall of the guard around cooking surface 132". Lockout switch assembly 540 may also be included in cooking mechanism 700, with bolt 548 moving into and out of registration with the sensor 546 of assembly 540 (FIGS. 32 and 33) as frame 702 is pivoted, but along a different path.

It is contemplated that any of the various features mentioned in this document with respect to a particular embodiment of the disclosure can be combined to arrive at further alternative embodiments of the disclosure.

Cooking attachments such as searing mechanisms 10 and 110, steaming and toasting attachments 210 and 310, and product presses 410A and 410B, are generally constructed of stainless steel components, unless otherwise noted herein.

Turning now to FIGS. 64-73, another exemplary latching cooking mechanism 1700 and various parts thereof are illustrated. Cooking mechanism 1700 is similar to cooking mechanism 1600 described above with respect to FIGS. 43F and 43G (and other figures for its constituent parts and assemblies). Mechanism 1700 is substantially similar to searing mechanism 1600 described above, with reference numerals of mechanism 1700 analogous to the reference numerals used in mechanism 1600, except with 100 added thereto.

However, latching cooking mechanism 1700 includes an adjustable latch receiver 1720 (FIG. 65), adjustable retention plate assembly 1760 for plate 560 (FIG. 69), and improved wire management features in connection with product press attachment 1710 (FIG. 67), as described in turn below.

Figure 64:
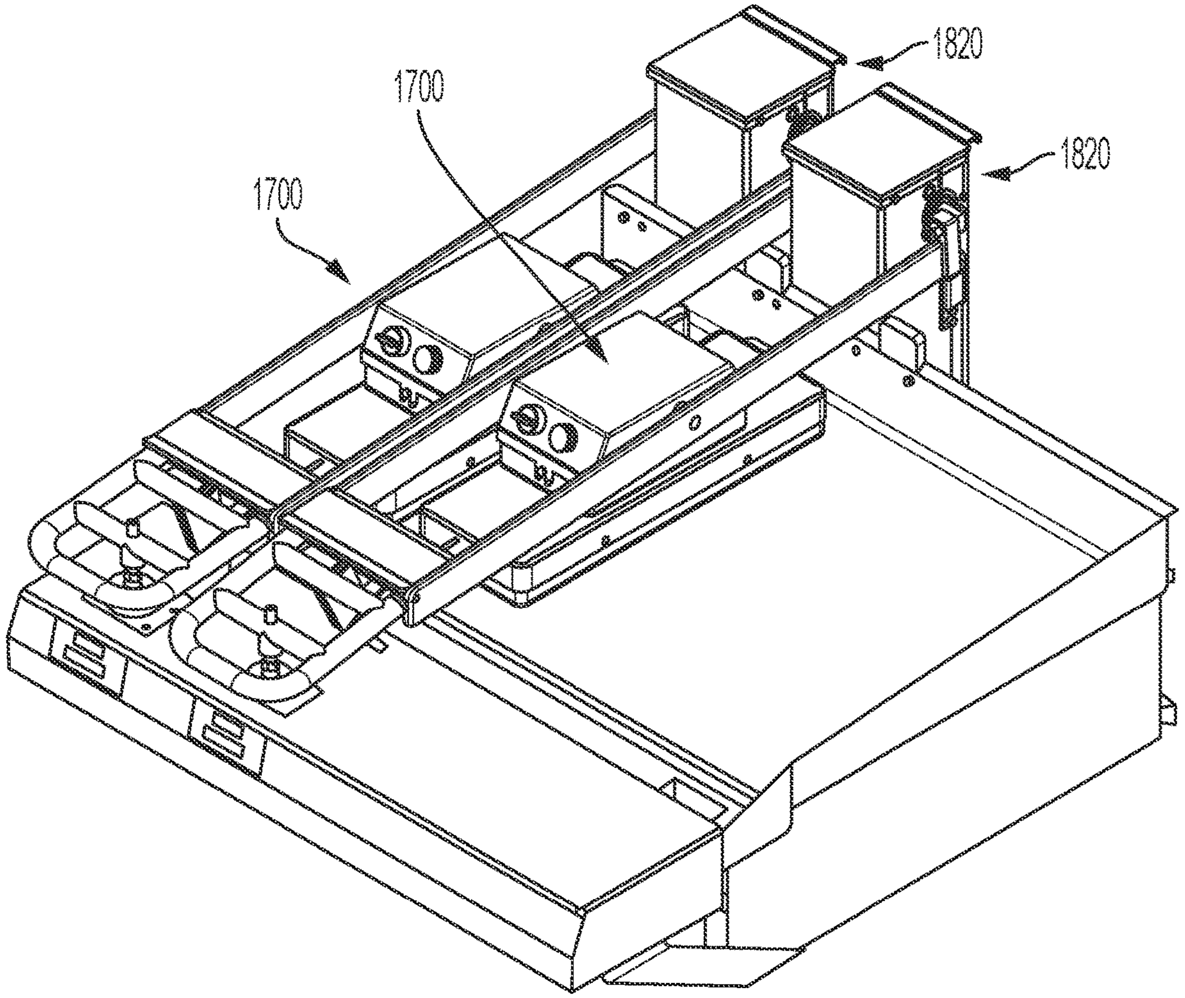
FIG. 64 is a perspective view of a latching cooking mechanism made in accordance with the present disclosure, shown together with a lower platen and with the cooking mechanism in a closed and latched configuration.
Figure 65:
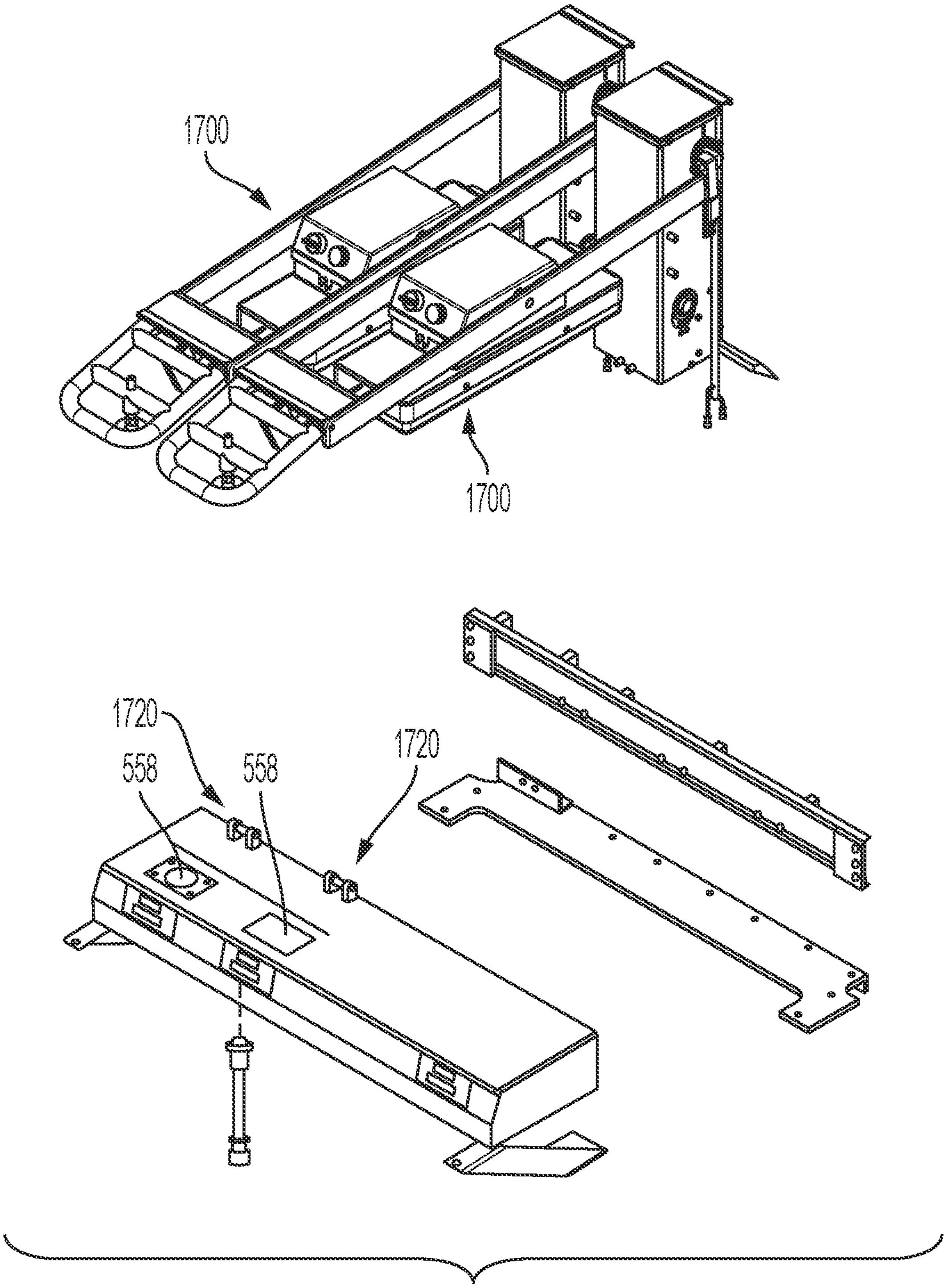
FIG. 65 is a perspective, exploded view of the cooking mechanism of FIG. 64.

FIG. 64 illustrates two latching cooking mechanisms 1700 used in connection with a lower platen, as discussed above with respect to cooking mechanisms 1600. However, cooking mechanisms 1700 are each counterbalanced by a counterbalance assembly 1820, which use an arrangement of springs to adjustably counterbalance the weight of cooking mechanism 1700. Additional details of counterbalance assembly 1820 can be found in U.S. Provisional Patent Application No. 62/966,719 filed Jan. 28, 2020 and entitled GRIDDLE WITH IMPROVED UPPER PLATEN, the entire disclosure of which is hereby expressly incorporated herein by reference. In addition, counterbalance assembly 1820 includes a slot 1830 within which lower shaft 1840 can be adjustably slid. This allows the internal springs, which extend between shaft 1840 and upper shaft 1850 as described in U.S. Provisional Patent Application No. 62/966,719, to be lengthened or shortened by moving shaft 1840 down or up through slot 1830 such that more or less spring preload can be applied to achieve a desired level of counterbalancing force from assembly 1820.

Cooking mechanisms 1700 includes the same latch assembly 1601 used in cooking mechanism 1600, as shown in FIGS. 66, 68, 69 and 73. However, latch assembly 1601 latches to adjustable latch receiver 1720 (FIG. 65) mounted to the lower platen. Adjustable latch receiver 1720, shown in detail in FIGS. 71 and 72, includes a roller 1720A which receives latch plate 1622 of latch assembly 1601, in the same manner shown in FIGS. 43D and 43E and described above. Latch roller 1720A is mounted to carriage 1720G, which is slideably received through a surface of the platen and can be adjusted up or down. Above the lower platen panel, only the upper portion of carriage 1720G and latch roller 1720A are presented for ease of cleaning. The rest of the components are disposed below the lower platen panel.

Carriage 1720G is biased upwardly by biasing elements, such as springs 1720F. Each of two springs 1720F is an extension spring captured between washer 1720H, held in place by nut 1720D threadably received on bolt 1720E, and the adjacent shoulder surface of carriage 1720G. While springs 1720D bias carriage 1720G upwardly toward contact with bearing block 1720B, adjuster screw 1720C bears against a bore formed in bearing block 1720B to limit the upward travel of carriage 1720G.

Adjuster screw 1720C is threadably received through a hole in carriage 1720G. To adjust the height of roller 1720A, screw 1720C can be advanced, drawing carriage 17200 and roller 1720A downwardly against the biasing force of springs 1720F, or retracted, allowing carriage 1720G and roller 1720A to move upwardly under the biasing force of springs 1720F. In an exemplary embodiment, screw 1720C is a set screw with a hex drive aperture formed in an axial end thereof, such that a user can simply slide an allen wrench underneath the lower platen plate (FIG. 70) to make any necessary adjustments to the height of roller 1720A. This adjustability ensures that, upon actuation of handle 1726 (FIG. 73) to engage magnetic plate 560 (FIG. 73) with cover plate 558 as described above with respect to latching mechanism 1600, latch assembly 1601 properly and firmly engages with roller 1720A.

Figure 69:
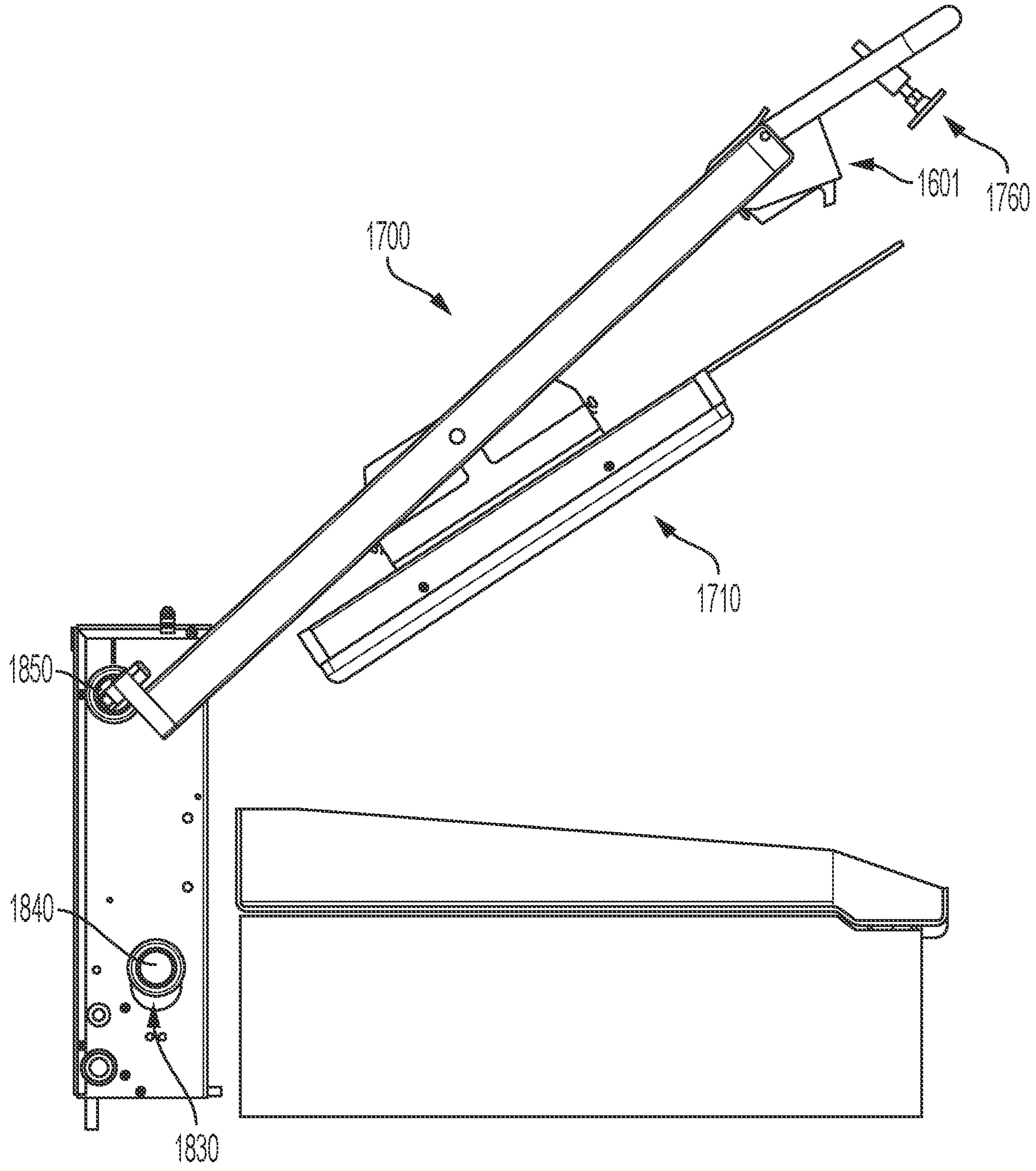
FIG. 69 is a side elevation view of the latching cooking mechanism of FIG. 64, shown in the open and unlatched configuration.
Figure 70:
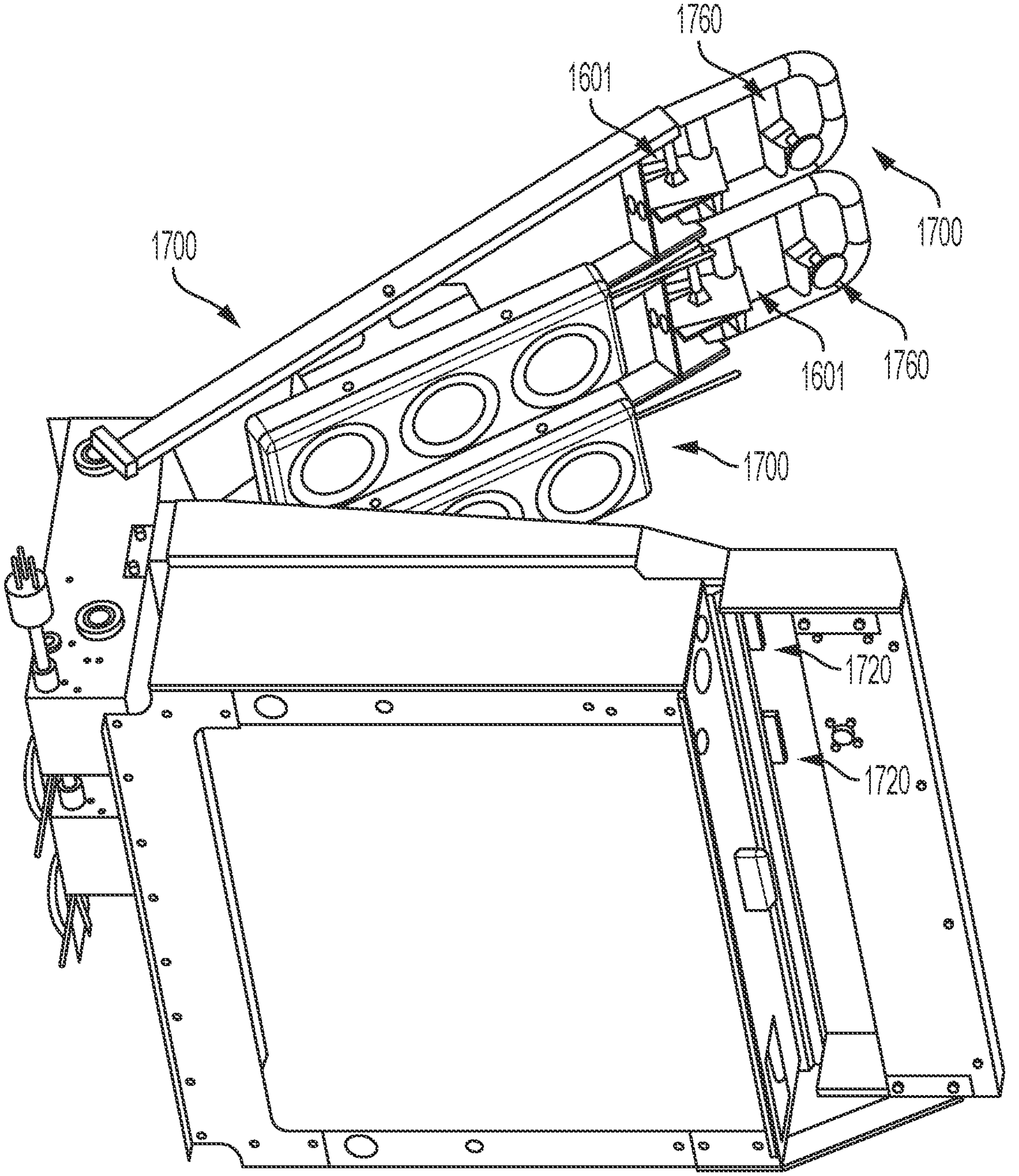
FIG. 70 is a lower, perspective view of the latching cooking mechanism of FIG. 64, shown in the open and unlatched configuration.
Figure 71:
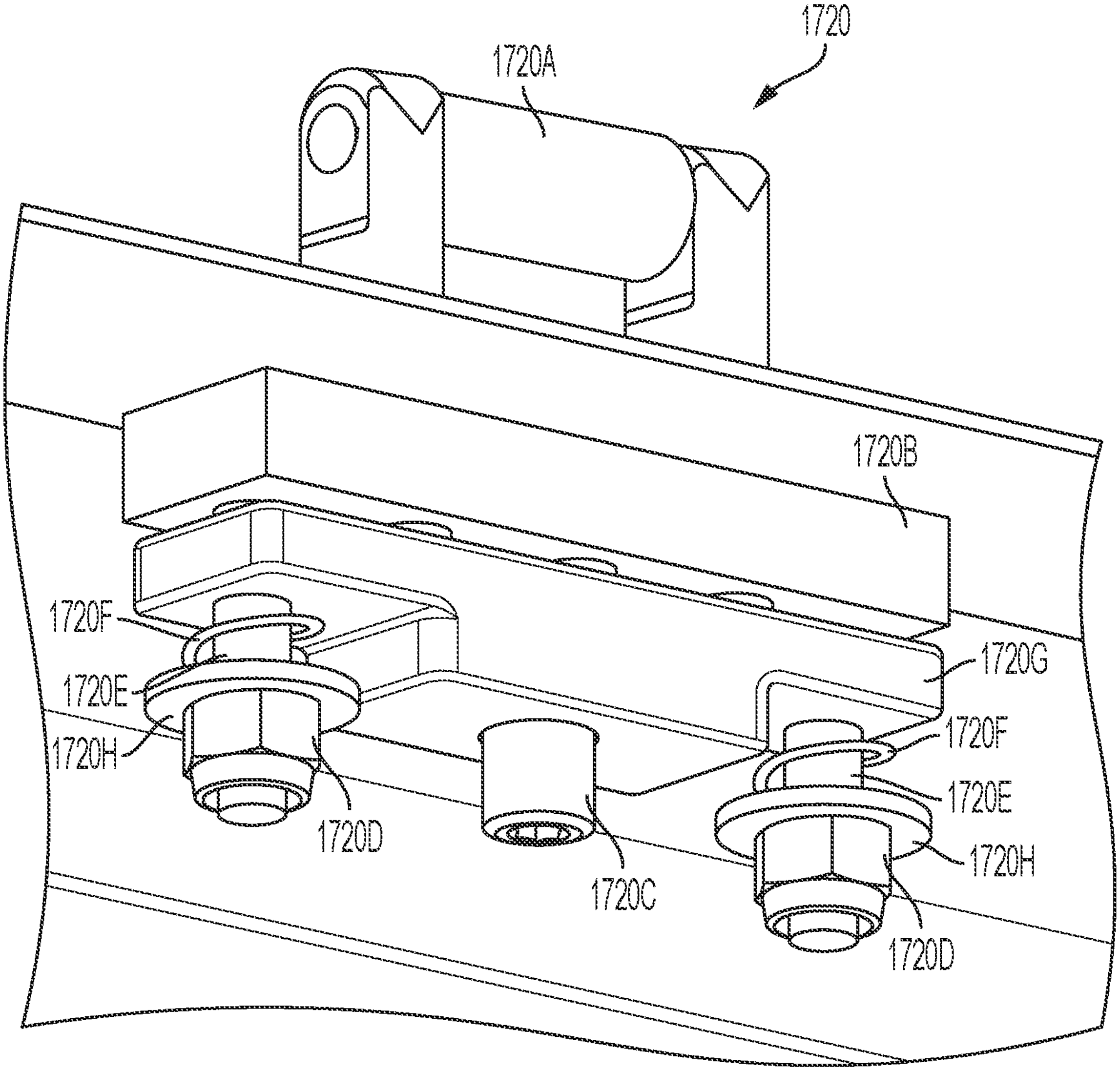
FIG. 71 is perspective view of a latch receiver assembly of the latching cooking mechanism of FIG. 64.
Figure 72:
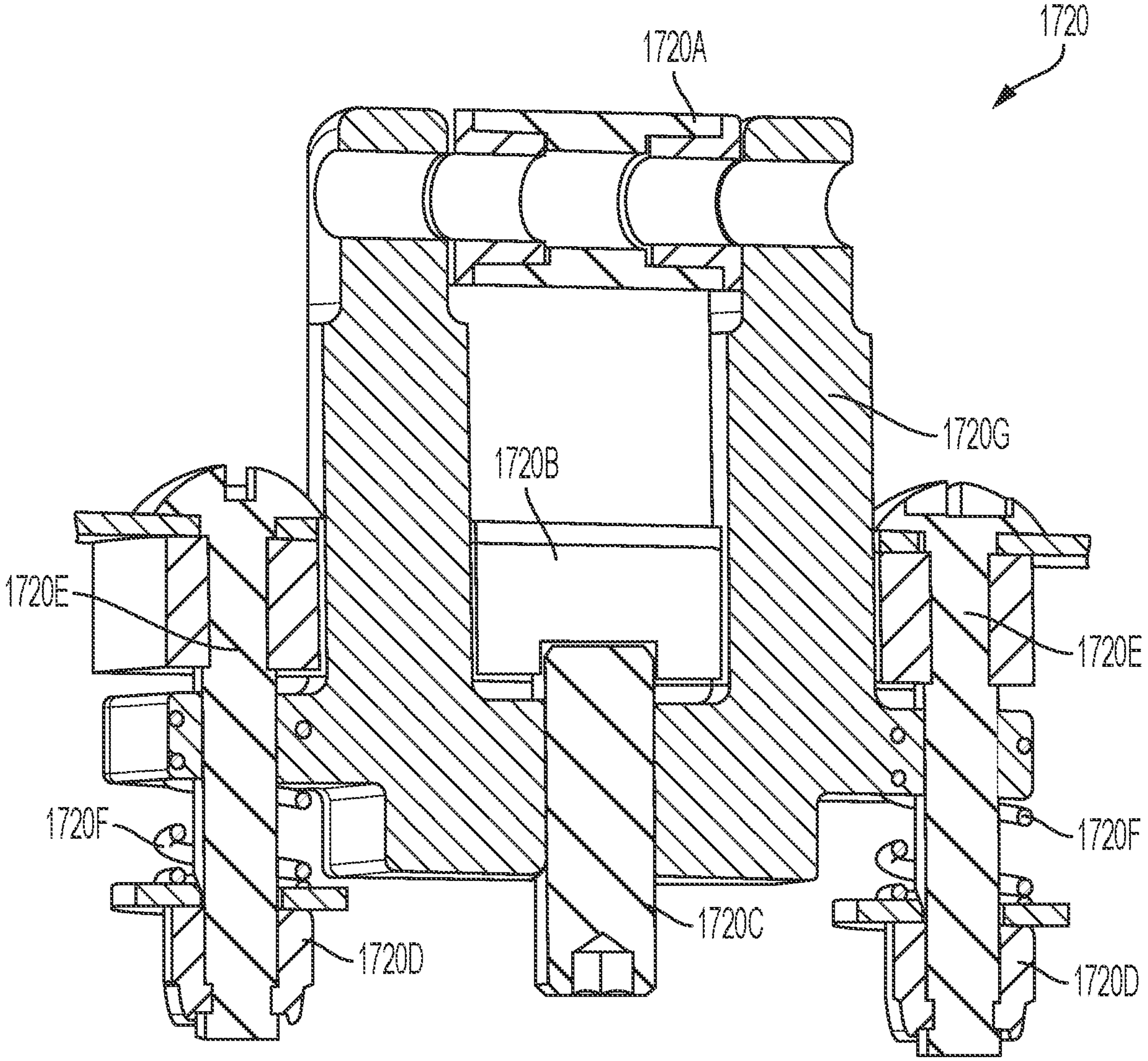
FIG. 72 is section, perspective view of the latch receiver assembly of FIG. 71.
Figure 73:
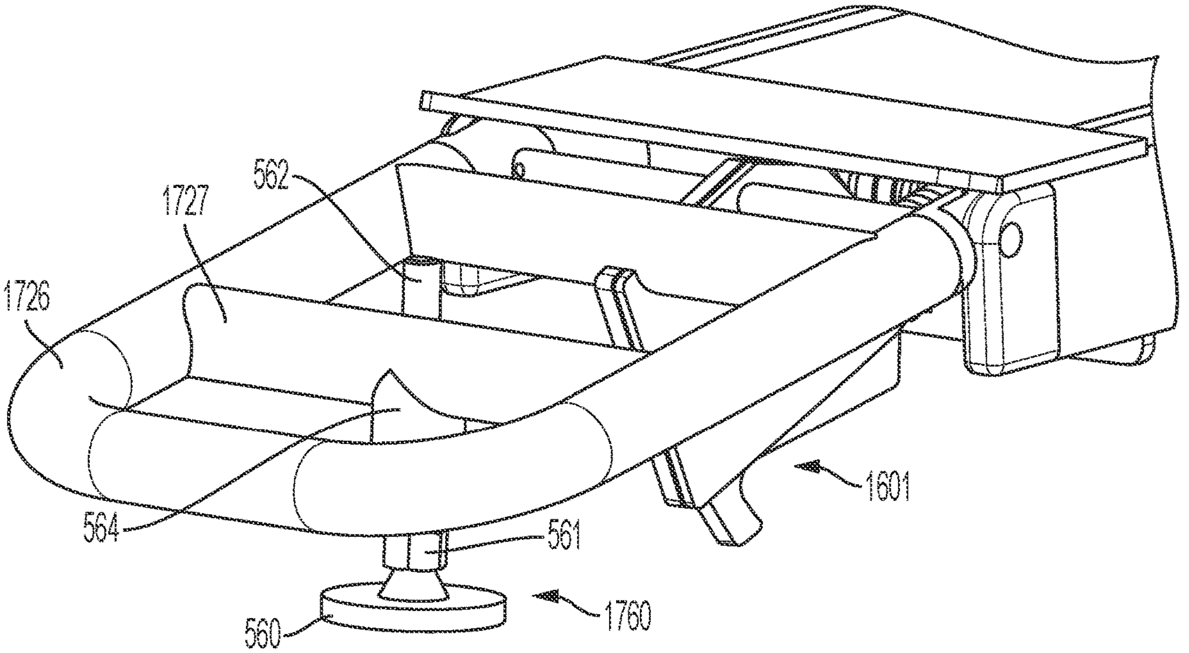
FIG. 73 is perspective view of a proximal portion of the latching cooking mechanism of FIG. 64.

Plate 560 is also vertically adjustable relative to cover plate 558, to ensure proper and firm contact (and magnetic interaction) therebetween. FIGS. 69, 70 and 73 include adjustment assembly 1760 designed to effect such adjustability. Assembly 1760 includes plate 560, which is mounted (e.g., fixed or adjustably coupled to) a threaded shaft 562 (FIG. 73). Threaded shaft is threadably engaged with an internal thread formed in stanchion 564, which is fixed to cross brace 1727. Thus, plate 560 can be adjusted up or down by advancing or retracting threaded shaft 562 within stanchion 564. Nut 561 is threadably engaged upon threaded shaft 562, as shown in FIG. 73, and can be used to lock the position of threaded shaft 562 (and plate 560) by engagement with the lower surface of stanchion 564.

Figure 66:
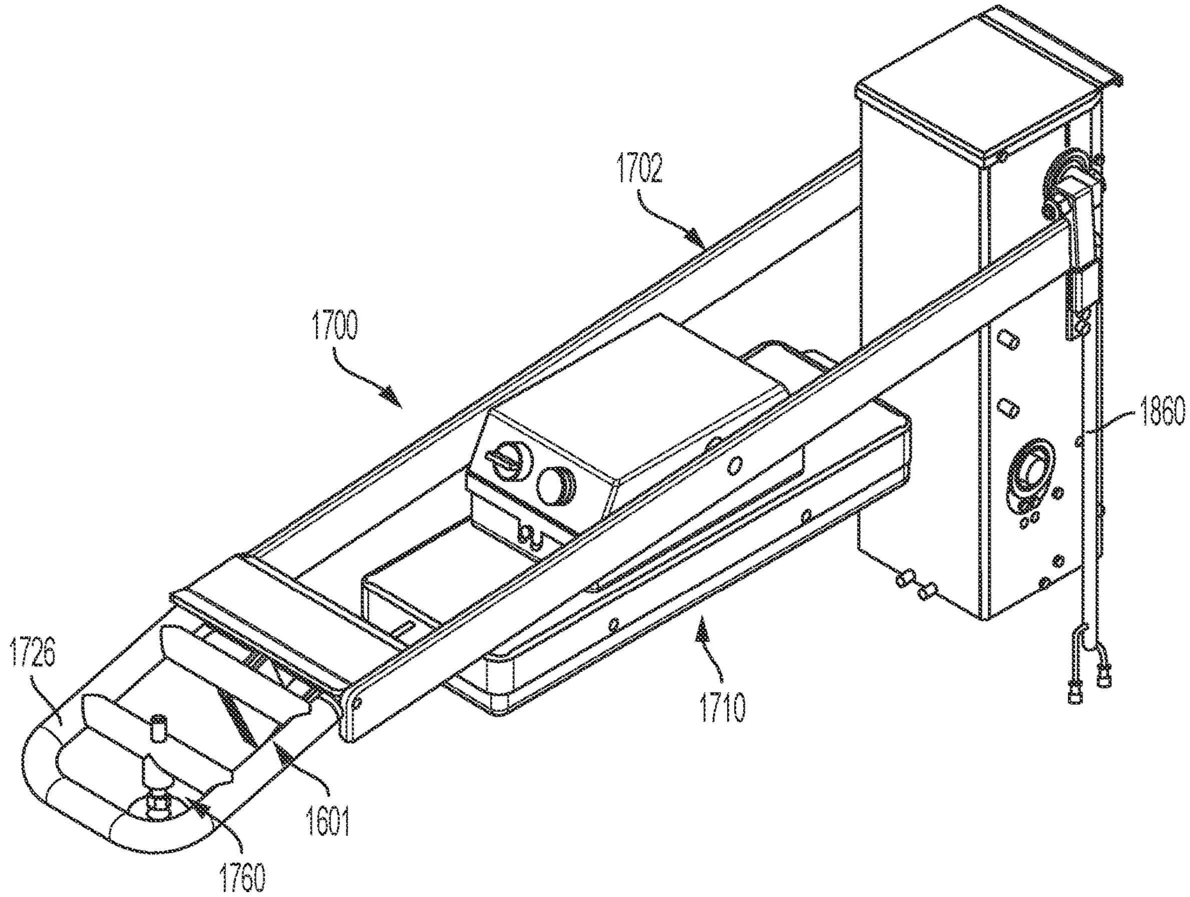
FIG. 66 is another perspective view of the latching cooking mechanism of FIG. 64.
Figure 67:
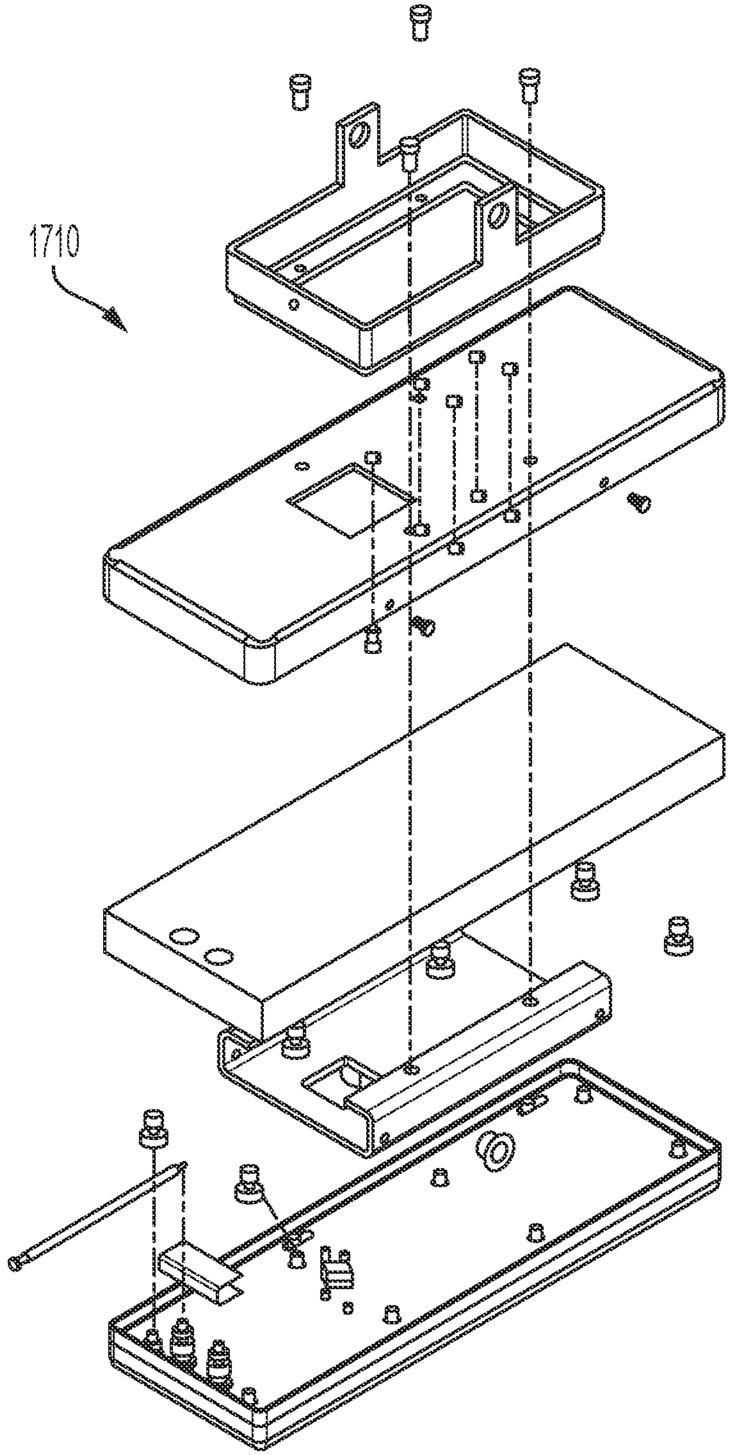
FIG. 67 is a perspective, exploded view of a heated upper platen used with the latching cooking mechanism of FIG. 64.
Figure 68:
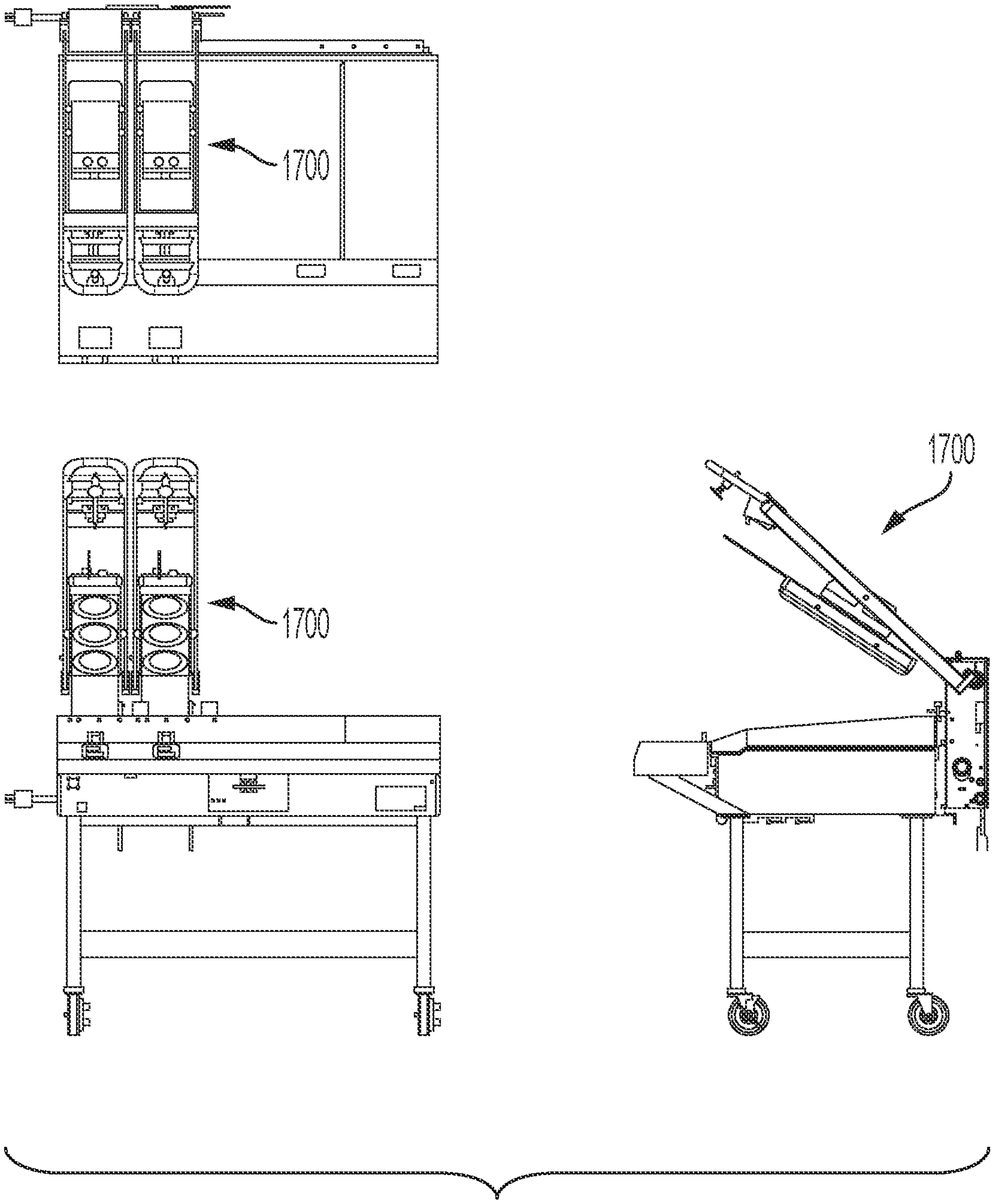
FIG. 68 is a front, top and right-side elevation view of the latching cooking mechanism and lower platen shown in FIG. 64.

Turning now to FIG. 66, a cable 1860 shown is attached to the back of frame 1702 of cooking attachment 1700. Cable 1860 may be used to relay signals from the distal portion of cooking attachment to the proximal portion, and to a controller such as controller 559 (FIG. 34). In the illustrated embodiment, a magnet is attached to the distal end of tubular bars 1706 of frame 1702. A reed switch 1546, shown in FIG. 66, which may be similar or identical to reed switch sensor 546 (FIG. 33), is electrically connected to cable 1860 and is positioned to be placed into an activated position by the concentrated magnetic field of a magnet attached to the distal end of the tubular bars 1706. Cable 1860 may also originate within heated upper platen 1710, where it is connected to the timer located in the electronics enclosure of upper platen 1710. This cable 1860 may emerge from upper platen 1710 and be threaded through one of the tubular bars 1706 (FIG. 66). The cable may then be passed out and down from the distal end of the tube 1706, near the pivot axis at the distal end of the base frame 1702, where it may be terminated to reed switch 1546 similar in form to reed switch 546. Advantageously, this arrangement protects the cable 1860 from damage and excessive wear.

Additionally, a power cable may also emerging from the back of frame 1702 of cooking attachment 1700 in a similar fashion to cable 1860. Such a cable may originate within heated upper platen 1710, where it is connected to the heating element (FIG. 67) to provide electrical power for heating. The power cable may emerge from upper platen 1710 and be threaded through one of the tubular bars forming frame 1702, (FIG. 66), which may be otherwise similar to frame 1602 described above. The cable may then be passed out and down from the distal end of the tube, near the base frame pivot axis and opposite the handle 1736, where it may be connected to a power source. Advantageously, this arrangement protects the power cable from damage and excessive wear.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A griddle assembly comprising:

a griddle base having a cooking surface;

a cooking attachment connected to the cooking surface and movable between an open configuration and a closed configuration;

an electromagnet mounted to the griddle base below the cooking surface; and a ferrous plate adjustably movable relative to the cooking attachment, the ferrous plate positioned into a magnetic field of the electromagnet when the electromagnet is activated and the cooking attachment is in the closed configuration, whereby activation of the electromagnet in the presence of the ferrous plate establishes a magnetic field around the ferrous plate.

2. The griddle assembly of claim 1, wherein the ferrous plate is coupled to a threaded rod which is threadably engaged with the cooking attachment and configured to be rotated to move the ferrous plate up or down.

3. A griddle assembly comprising:

a griddle base having a cooking surface;

a cooking attachment connected to the cooking surface and movable between an open configuration and a closed configuration; and a latch mechanism including a latch mounted to the cooking attachment and a latch receiver adjustably movable relative to the griddle base, the latch engageable with the latch receiver to lock the cooking attachment into the closed configuration.

4. The griddle assembly of claim 3, wherein the latch receiver comprises:

a latch roller;

a carriage having the latch roller rotatably mounted thereto, the carriage slideably coupled to the griddle base;

a biasing element configured to bias the carriage upwardly; and an adjuster moveably connected to the carriage and positioned to limit upward travel of the carriage.

5. The griddle assembly of claim 4, wherein the latch receiver further comprises:

a bearing block fixed to an undersurface of the griddle base, the bearing block positioned to be abutted by an upper end of the adjuster, the carriage including at least one flange with a downwardly facing surface engaged by an upper end of the biasing element, a bolt passing through the griddle base and the flange, the bolt having a washer engaged by a lower end of the biasing element.

6. The griddle assembly of claim 3, further comprising:

an electromagnet mounted to the griddle base; and a ferrous plate mounted to the cooking attachment, the ferrous plate positioned into a magnetic field of the electromagnet when the electromagnet is activated and the cooking attachment is in the closed configuration, whereby activation of the electromagnet in the presence of the ferrous plate establishes an electric field around the ferrous plate.

7. A griddle assembly comprising:

a griddle having a cooking surface;

a cooking attachment connected to the cooking surface and movable between an open configuration and a closed configuration, the cooking attachment including a frame assembly comprising:

a distal frame pivotably connected to the griddle at a distal frame pivot between the open configuration and the closed configuration; and a proximal frame pivotably connected to the distal frame at a proximal frame pivot, the proximal frame movable between a closed-locked configuration and a closed-unlocked configuration when the distal frame is in the closed configuration; and a latch mechanism including a latch mounted to the proximal frame and a latch receiver adjustably movable relative to the griddle, the latch engageable with the latch receiver when the proximal frame is pivoted into the closed-locked configuration to lock the cooking attachment into the closed configuration.

8. The griddle assembly of claim 7, wherein the latch receiver comprises:

a latch roller;

a carriage having the latch roller rotatably mounted thereto, the carriage slideably coupled to the griddle;

a biasing element configured to bias the carriage upwardly; and an adjuster moveably connected to the carriage and positioned to limit upward travel of the carriage.

9. The griddle assembly of claim 7, wherein the latch mechanism comprises a latch plate pivotable about a latch plate pivot distal of the proximal frame pivot.

10. The griddle assembly of claim 9, wherein the latch plate is pivotably mounted to at least one latch frame plate fixed to the proximal frame at a point proximal of the latch plate pivot and the proximal frame pivot, whereby a mechanical advantage is conferred on the latch plate.

11. The griddle assembly of claim 10, further comprising a spring retained by the latch plate and positioned to bias the latch plate downwardly toward the latch receiver.

12. The griddle assembly of claim 7, further comprising a handle retention assembly comprising:

a cross brace fixed to the distal frame, the cross brace having a detent;

a bearing sized to be received in the detent; and at least one spring having a first end anchored to the proximal frame and a second end biasing the bearing distally into the detent when the proximal frame and the distal frame are aligned, the at least one spring configured to retain the bearing within the detent until a threshold force is applied to the proximal frame which is sufficient to compress the at least one spring and dislodge the bearing from the detent.

13. The griddle assembly of claim 12, further comprising a bearing pin having the bearing mounted to the bearing pin, the second end of the spring bearing on the bearing via the bearing pin.

14. The griddle assembly of claim 13, further comprising a pivot arm rotatably fixed to the proximal frame at a first end thereof, and having the bearing pin passing therethrough at a second end thereof.

15. The griddle assembly of claim 14, wherein:

the latch mechanism comprises a latch plate pivotable about a latch plate pivot distal of the proximal frame pivot, and a latch frame plate fixed to the proximal frame at a point proximal of the latch plate pivot and the proximal frame pivot;

the first end of the at least one spring is anchored to the proximal frame via at least one bracket fixed to the proximal frame; and the first end of the pivot arm is rotatably fixed to the proximal frame at the latch plate pivot.

16. The griddle assembly of claim 12, wherein the at least one spring is a compression spring.

17. The griddle assembly of claim 7, wherein the latch mechanism comprises a latch hook pivotable about a latch hook pivot coaxial with the proximal frame pivot.

* * * * *